United States Patent
Miyake et al.

(10) Patent No.: US 7,401,204 B1
(45) Date of Patent: Jul. 15, 2008

(54) PARALLEL PROCESSOR EFFICIENTLY EXECUTING VARIABLE INSTRUCTION WORD

(75) Inventors: Hideo Miyake, Kawasaki (JP); Atsuhiro Suga, Kawasaki (JP); Yasuki Nakamura, Kawasaki (JP); Yoshimasa Takebe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 205 days.

(21) Appl. No.: 09/654,527

(22) Filed: Sep. 1, 2000

(30) Foreign Application Priority Data

Oct. 1, 1999 (JP) ................................. 11-281957

(51) Int. Cl.
*G06F 15/00* (2006.01)

(52) U.S. Cl. ..................... 712/22; 712/24; 712/208; 712/215; 712/224; 712/226; 717/136

(58) Field of Classification Search .............. 712/2, 712/215, 208, 22, 228, 223, 204, 24, 21, 712/224, 226, 214; 717/136
See application file for complete search history.

(56) References Cited

U.S. PATENT DOCUMENTS

| | | | | |
|---|---|---|---|---|
| 5,214,763 A | * | 5/1993 | Blaner et al. | 712/212 |
| 5,497,496 A | | 3/1996 | Ando | |
| 5,758,114 A | * | 5/1998 | Johnson et al. | 712/204 |
| 5,761,470 A | | 6/1998 | Yoshida | |
| 5,787,302 A | * | 7/1998 | Hampapuram et al. | 712/24 |
| 5,787,303 A | | 7/1998 | Ishikawa | |
| 5,881,307 A | * | 3/1999 | Park et al. | 712/23 |
| 5,930,508 A | | 7/1999 | Faraboschi et al. | |
| 5,941,980 A | * | 8/1999 | Shang et al. | 712/204 |
| 6,151,668 A | * | 11/2000 | Pechanek et al. | 712/24 |
| 6,467,036 B1 | * | 10/2002 | Pechanek et al. | 712/24 |
| 6,738,892 B1 | * | 5/2004 | Coon et al. | 712/24 |

FOREIGN PATENT DOCUMENTS

| | | |
|---|---|---|
| JP | 04-040525 | 2/1992 |
| JP | 05-197547 | 8/1993 |
| JP | 08-234978 | 9/1996 |
| JP | 8-234978 | 9/1996 |
| JP | 10-074145 | 3/1998 |
| JP | 10-232779 | 9/1998 |
| JP | 11-282674 | 10/1999 |

OTHER PUBLICATIONS

Nair, Ravi, et al., "Exploiting Instruction Level Parallelism in Processors by Caching Scheduled Groups", Computer Architecture News, US, Association for Computer Machinery, vol. 25, No. 2, May 1, 1997, pp. 13-25.

* cited by examiner

*Primary Examiner*—Tonia L. M. Dollinger
(74) *Attorney, Agent, or Firm*—Staas & Halsey LLP

(57) ABSTRACT

A parallel processor performs efficient parallel processing of one or more basic instructions contained in each of a plurality of instruction words delimited by instruction delimiting information. The processor includes: a plurality of instruction execution units performing processes in accordance with corresponding, supplied basic instructions in parallel; an instruction fetch unit fetching the instruction words one by one in accordance with the instruction delimiting information; and an instruction issue unit recognizing and, in accordance therewith, selecting each of the basic instructions contained in each of the instruction words fetched by the instruction fetch unit to a corresponding instruction execution unit to execute the basic instruction.

12 Claims, 39 Drawing Sheets

FIG.2

| NOP | NOP | NOP | NOP |
|-----|-----|-----|-----|
| E1  | NOP | NOP | NOP |
| NOP | E1  | NOP | NOP |
| NOP | NOP | E1  | NOP |
| NOP | NOP | NOP | E1  |
| E1  | E1  | NOP | NOP |
| E1  | NOP | E1  | NOP |
| E1  | NOP | NOP | E1  |
| NOP | E1  | E1  | NOP |
| NOP | E1  | NOP | E1  |
| NOP | NOP | E1  | E1  |
| E1  | E1  | E1  | NOP |
| E1  | E1  | NOP | E1  |
| E1  | NOP | E1  | E1  |
| NOP | E1  | E1  | E1  |
| E1  | E1  | E1  | E1  |

FIG. 5

| 0 | EI | 1 | EI |
|---|----|---|----|
| 1 | EI |   |    |

PARALLEL PROCESSOR EFFICIENTLY EXECUTING VARIABLE INSTRUCTION WORD

BACKGROUND OF THE INVENTION

1. Field of the Invention

The present invention generally relates to processors, and, more particularly, to a parallel processor that executes a plurality of basic instructions in parallel.

2. Description of the Related Art

Generally, in a conventional computer system, a plurality of basic instructions are executed in parallel by pipeline processing, thereby improving its performance. Conventionally, a plurality of basic instructions constitute a fixed-length instruction word, and a very-long instruction word (VLIW) technique is employed as a method for executing a plurality of basic instructions contained in one instruction word in parallel. Also, a super scalar technique may be employed. In accordance with the super scalar technique, basic instructions are executed in parallel depending on the number of basic instructions contained in each instruction word.

FIG. 1 shows the structure of a conventional parallel processor 10. This parallel processor 10 comprises an instruction fetch unit 1 connected to a memory 7, an instruction issue unit 3 connected to the instruction fetch unit 1, instruction execution units EU0 to EUn each connected to the instruction issue unit 3, and a register unit 5 connected to each of the instruction execution units EU0 to EUn.

The instruction fetch unit 1 fetches an instruction word from the memory 7, and supplies the instruction word to the instruction issue unit 3. The instruction issue unit 3 issues the basic instructions contained in the supplied instruction word to the instruction execution units EU0 to EUn. If the instruction execution units EU0 to EUn are still executing previous basic instructions at this point, the instruction issue unit 3 waits for the end of the execution. When the execution ends, the instruction issue unit 3 supplies the basic instructions to the instruction execution units EU0 to EUn.

The instruction execution units EU0 to EUn execute the basic instructions, and notify the instruction issue unit 3 of the end of the execution. The register unit 5 supplies data to the instruction execution units EU0 to EUn, if necessary, and holds the execution results of the instruction execution units EU0 to EUn. The externally connected memory 7 stores an instruction word string to be executed in the parallel processor 10. The memory 7 also stores necessary data for the execution units EU0 to EUn to execute instructions, and data as the execution results.

FIG. 2 shows the formats of instruction words to be supplied to a parallel processor having four instruction execution units EU0 to EU3. As shown in FIG. 2, each instruction word is made up of a basic instruction EI and a do-nothing instruction NOP. If the number of basic instructions contained in one instruction word to be executed in parallel is smaller than the number of the instruction execution units EU0 to EU3, the proportion of do-nothing instructions is large.

In the conventional parallel processing method of executing a plurality of basic instructions by the VLIW technique, each instruction word has a fixed length. Therefore, if the number of basic instructions to be executed in parallel is smaller than a predetermined number, do-nothing instructions are added to comply with the predetermined length. Because of that, in a program having a small number of basic instructions in total, the proportion of do-nothing instructions is large, and the amount of instruction code increases accordingly, resulting in problems such as poor usage efficiency of memory, a decrease of the hit ratio of cache memory, and an increase of the load on the instruction fetch mechanism.

With the super scalar technique, there is also a problem that a large-scale circuit is needed to increase the number of instructions to be executed in parallel.

SUMMARY OF THE INVENTION

A general object of the present invention is to provide parallel processors in which the above disadvantages are eliminated.

A more specific object of the present invention is to provide a parallel processor that is capable of performing highly efficient parallel processing.

The above objects of the present invention are achieved by a parallel processor that performs parallel processing of one or more basic instructions contained in each of instruction words delimited by instruction delimiting information, the parallel processor comprising:

a plurality of instruction execution units that perform processes corresponding to the supplied basic instructions in parallel;

an instruction fetch unit that fetches the instruction words one by one in accordance with the instruction delimiting information; and an instruction issue unit that selectively issues each of the basic instructions supplied from the instruction fetch unit to one of the instruction execution units to execute the basic instruction.

With the parallel processor having the above structure, the instruction fetch unit makes each instruction word length variable, so that the instruction words can be fetched one by one in accordance with the instruction delimiting information. Also, the instruction execution units can efficiently execute the instruction words, because each of the basic instructions is selectively issued to a corresponding one of the instruction execution units.

The above and other objects and features of the present invention will become more apparent from the following description taken in conjunction with the accompanying drawings.

BRIEF DESCRIPTION OF THE DRAWINGS

FIG. 2 shows the formats of instruction words to be supplied to a conventional parallel processor having four instruction execution units;

FIG. 5 shows the formats of instruction words to be supplied to the parallel processor of the first embodiment of the present invention;

DESCRIPTION OF THE PREFERRED EMBODIMENTS

The following is a description of embodiments of the present invention, with reference to the accompanying drawings.

Embodiment 1

Figure 1:
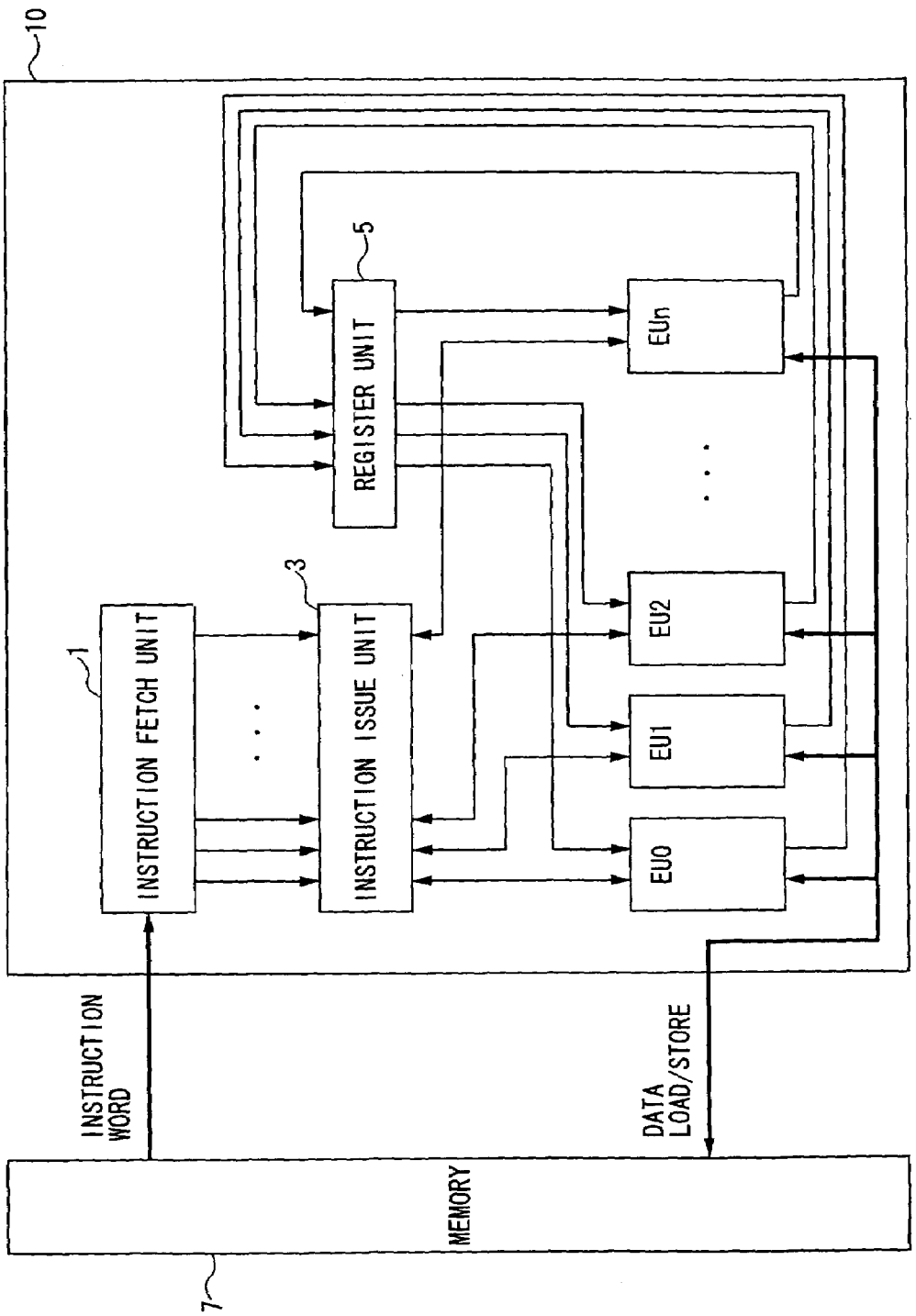
FIG. 1 shows the structure of a conventional parallel processor.
Figure 3:
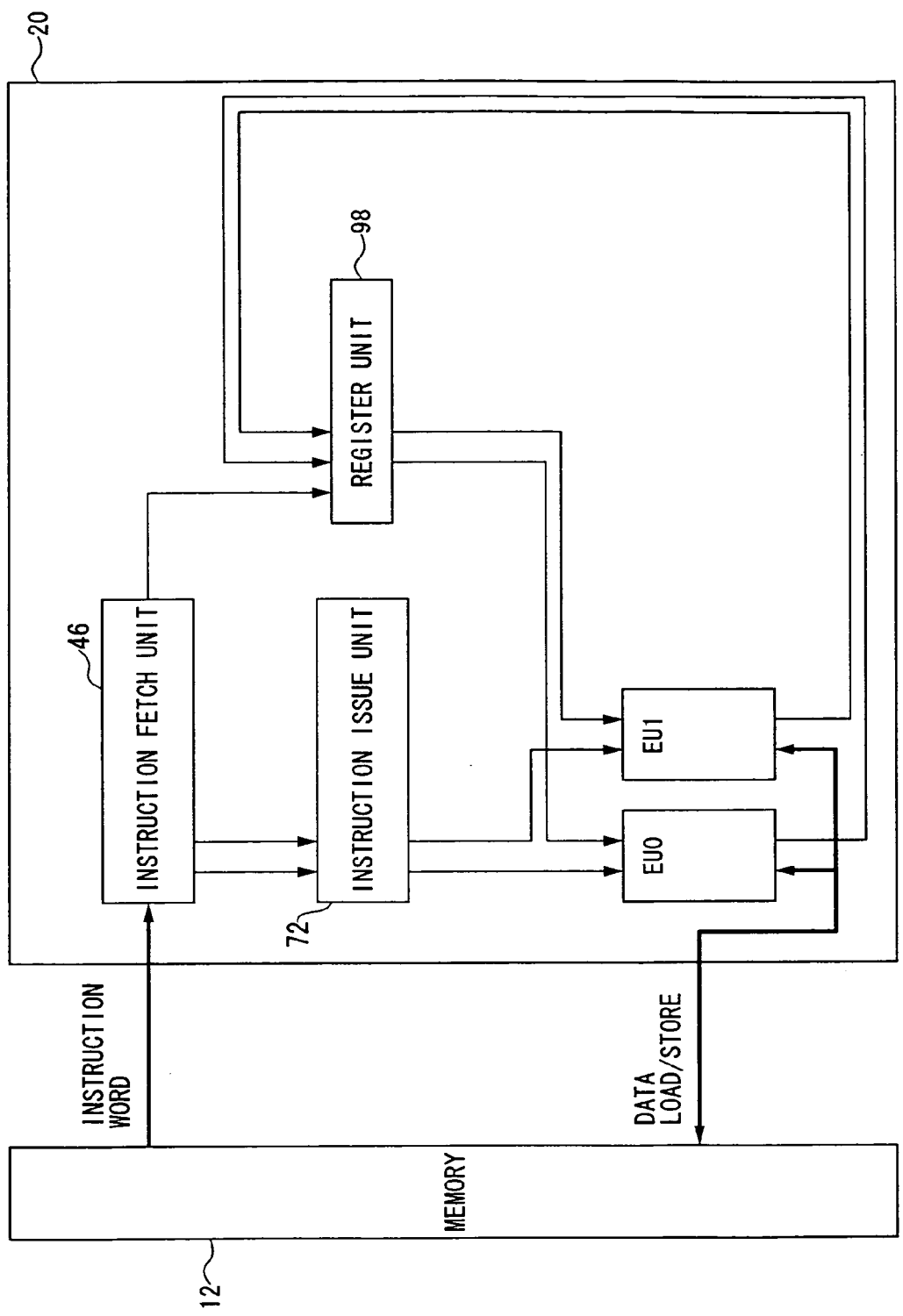
FIG. 3 shows the structure of a first example of a parallel processor in accordance with a first embodiment of the present invention.
Figure 6:
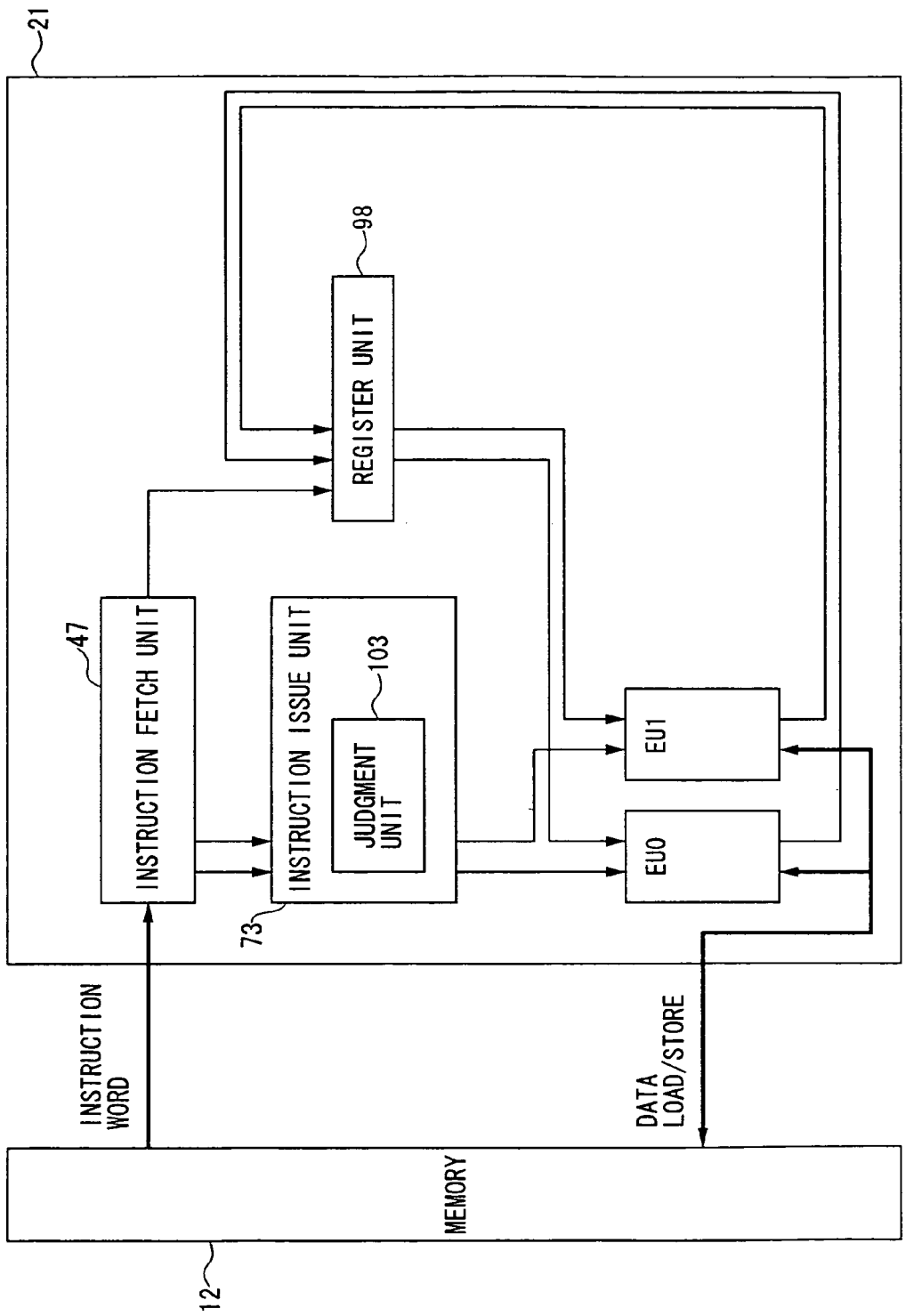
FIG. 6 shows the structure of a second example of the parallel processor in accordance with the first embodiment of the present invention.

FIGS. 3 and 6 show parallel processors 20 and 21 in accordance with a first embodiment of the present invention. The parallel processor 20 comprises an instruction fetch unit 46 connected to a memory 12, an instruction issue unit 72 connected to the instruction fetch unit 46, two instruction execution units EU0 and EU1 having the same structure and connected to the instruction issue unit 72, and a register unit 98 connected to each of the instruction execution units EU0 and EU1. Likewise, the parallel processor 21 comprises an instruction fetch unit 47 connected to a memory 12, an instruction issue unit 73 connected to the instruction fetch unit 47, two instruction execution units EU0 and EU1 having the same structure and connected to the instruction issue unit 73, and a register unit 98 connected to each of the instruction execution units EU0 and EU1.

It should be noted that, in the following description, the maximum basic instruction length of one instruction word is 2. However, the parallel processor in accordance with the first embodiment should operate in the same manner in a case where the maximum basic instruction length in one instruction word is 3 or greater.

Example 1

Figure 4:
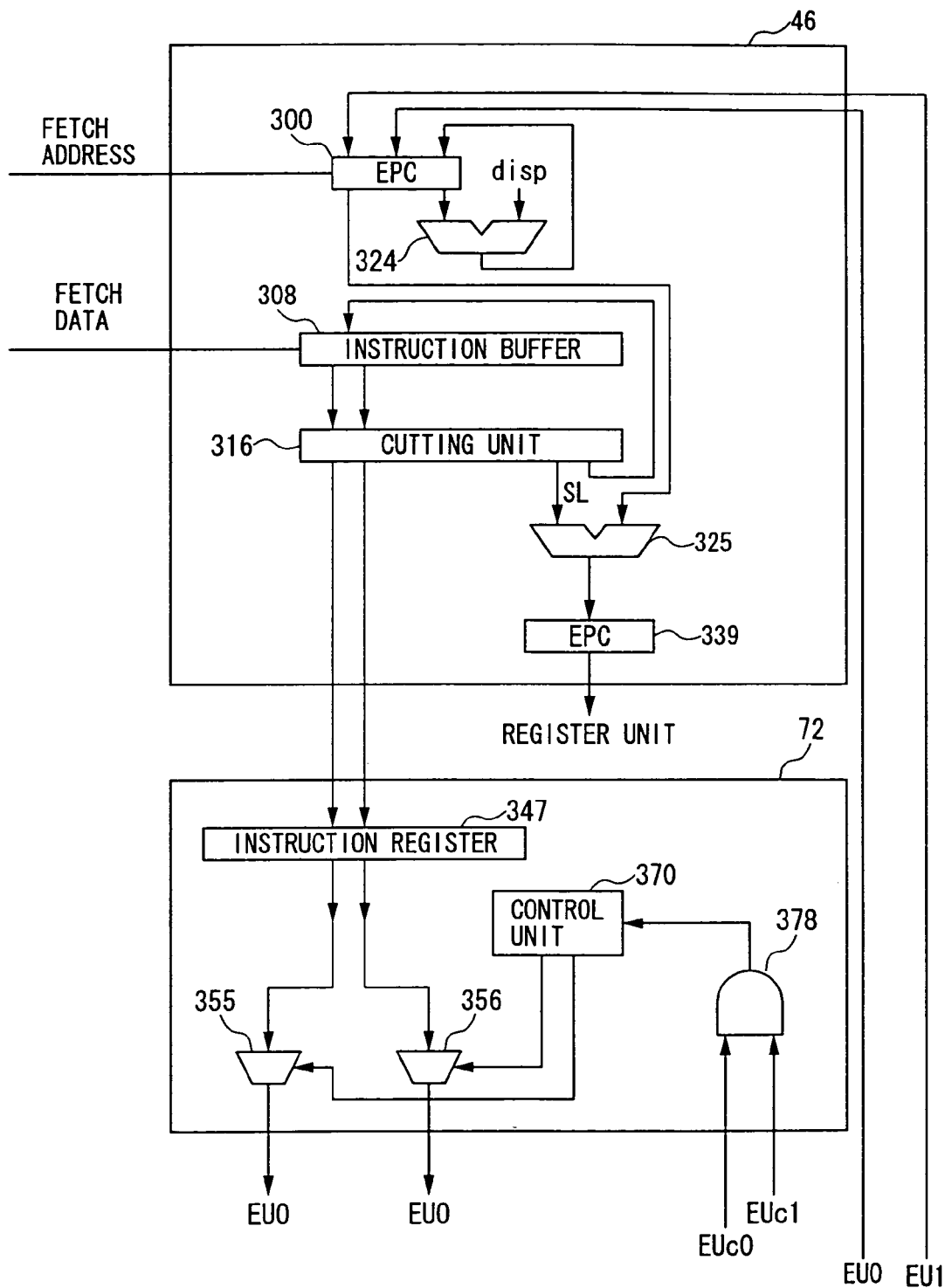
FIG. 4 shows the structures of an instruction fetch unit and an instruction issue unit of the parallel processor shown in FIG. 3.

FIG. 4 shows the structure of the instruction fetch unit 46 and the instruction issue unit 72. The instruction fetch unit 46 comprises a fetch program counter (FPC) 300, adders 324 and 325, an instruction buffer 308, a cutting unit 316, and an execution program counter (EPC) 339.

The FPC 300 is connected to the memory 12 and the instruction execution units EU0 and EU1. The adder 324 is connected to the FPC 300. The instruction buffer 308 is connected to the memory 12, and the cutting unit 316 is connected to the instruction buffer 308. The adder 325 is connected to the cutting unit 316, and the EPC 339 is connected to the adder 325 and the register unit 98. The FPC 300 receives a fetch address contained in an instruction word from the memory 12, and the instruction buffer 308 receives fetch data contained in the instruction word from the memory 12. The FPC 300 further receives a branch destination address corresponding to a branch instruction from the instruction execution units EU0 and EU1.

On the other hand, the instruction issue unit 72 comprises an instruction register 347, selectors 355 and 356, a control unit 370, and an AND gate 378. Here, the instruction register 347 is connected to the cutting unit 316. The selectors 355 and 356 are both connected to the instruction register 347. The selector 355 is connected to the instruction execution unit EU0, while the selector 356 is connected to the instruction execution unit EU1. The control unit 370 is connected to the AND gate 378 and the selectors 355 and 356. The AND gate is connected to the instruction execution units EU0 and EU1. In this structure, the instruction execution units EU0 and EU1 transmit execution complete signals EUc0 and EUc1, respectively, to the AND gate 378.

Figure 5:
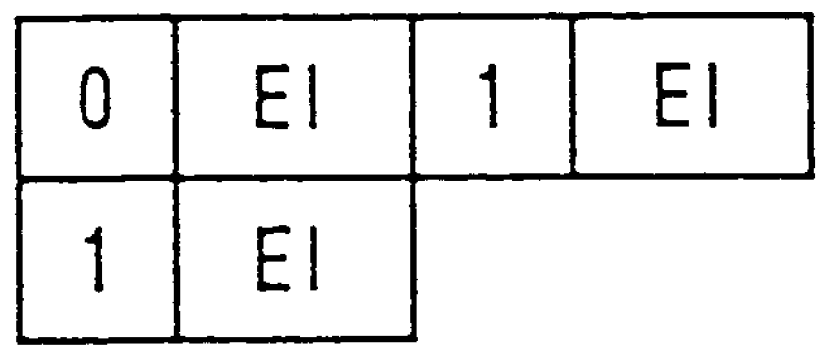

FIG. 5 shows the formats of instruction words to be supplied to the parallel processors of the first embodiment. Each instruction word is made up of one or more basic instructions EI and at least one of instruction word delimiting fields 0 and 1. The basic instruction word length is either 1 or 2. The upper row of FIG. 5 indicates an instruction word having a basic instruction word length of 2, consisting of a basic instruction word made up of an instruction word delimiting field 0 and a basic instruction EI, and another basic instruction word made up of an instruction word delimiting field 1 and a basic instruction EI. The lower row of FIG. 5 indicates an instruction word having a basic instruction word length of 1, consisting of an instruction word delimiting field 1 and a basic instruction EI.

The above instruction words are stored in the memory 12 in advance. The adder 324 in the instruction fetch unit 46 of the parallel processor 20 increments the address by a fixed length DISP, so that the instruction words can be fetched from the memory 12 in order. When the cutting unit 316 in the instruction fetch unit 46 fetches the instruction word of the upper row of FIG. 5, for instance, it recognizes the instruction word delimiting field and the following basic instruction EI as one instruction word. The cutting unit 316 then cuts the instruction word from the instruction word string, and stores it in the instruction fetch unit 46. The adder 325 calculates the address corresponding to the basic instruction EI to be executed in accordance with an instruction word length signal SL supplied from the cutting unit 316. The calculated address is temporarily stored in the EPC 339. A return address for rerunning the basic instruction EI that is stored in the EPC 339 is supplied to the register unit 98.

Based on the instruction word delimiting fields 0 and 1 contained in the instruction words supplied from the cutting unit 316, the instruction issue unit 72 recognizes each basic instruction EI, and issues each basic instruction EI selectively to one of the instruction execution units EU0 and EU1 via the selectors 355 and 356. Accordingly, if a basic instruction EI following an instruction word delimiting field 0 is issued to the instruction execution unit EU0, a basic instruction EI following an instruction word delimiting field 1 is issued to the instruction execution unit EU1. The selectors 355 and 356 are controlled by the control unit 370. When the execution of one instruction word is completed, the corresponding basic instruction EI is supplied to the instruction execution units EU0 and EU1 via the selectors 355 and 356.

Likewise, in a case where the instruction fetch unit 46 fetches and then supplies the instruction word having the basic instruction word length of 1 to the instruction buffer unit 308, the cutting unit 316 cuts the basic instruction EI that follows the instruction word delimiting field 1 from the rest of the instruction word. The instruction register 347 then issues the basic instruction EI to one of the instruction execution units EU0 and EU1.

The instruction word delimiting fields 0 and 1 are both represented by one bit, but any sort of data can be written in those fields as long as they can function to delimit the instruction words. In this example, the two instruction execution units EU0 and EU1 having the same structure are employed, but it is also possible to employ three or more instruction execution units.

As described so far, in the parallel processor 20 of this example, the instruction fetch unit 46 fetches instruction words one by one in accordance with the instruction word delimiting fields 0 and 1, so that the length of each of the instruction words can be made variable. The instruction issue unit 72 then issues a basic instruction EI to a corresponding one of the instruction execution units EU0 and EU1. Accordingly, there is no need to include do-nothing instructions NOP in any instruction word, and basic instructions EI can be efficiently included in each instruction word. By executing the basic instructions EI in the instruction words, the parallel processing performance of the parallel processor can be improved.

Example 2

FIG. 6 shows the structure of a second example of the parallel processor 21 in accordance with the first embodiment of the present invention. As shown in FIG. 6, the parallel processor 21 has the same structure as the parallel processor 20 shown in FIG. 3, except for a judgment unit 103 that determines whether or not each basic instruction EI supplied to the instruction issue unit 73 has data dependence or control dependence with a basic instruction EI being executed by one of the instruction execution units EU0 and EU1, and whether or not each basic instruction EI shares one resource with another basic instruction EI being executed by one of the instruction execution units EU0 and EU1.

The judgment unit 103 compares a destination register number (write register number) defined in a basic instruction EI in execution with a source register number (read register number) defined in a basic instruction EI to be issued to one of the instruction execution units EU0 and EU1. If the destination register number coincides with the source register number, it is confirmed that there is data dependence between the two basic instructions EI. If the destination register number does not coincide with the source register number, it is confirmed that there is no data dependence between the two basic instructions EI, and the operation can proceed.

The judgment unit 103 also determines whether or not the basic instruction EI in execution contains a branch instruction, and whether or not the basic instruction EI has a possibility of starting an irregular process such as a division by 0. If the basic instruction EI in execution contains a branch instruction or has a possibility of an irregular process, there is control dependence between the basic instruction EI in execution and the basic instruction EI to be issued to the instruction execution unit EU0 or EU1. If the basic instruction EI in execution neither contains a branch instruction nor has a possibility of an irregular process, it is confirmed that there is no control dependency between the two basic instructions EI.

Based on the contents of each basic instruction EI, the judgment unit 103 also compares the resource (the instruction execution units EU0 and EU1, for instance) required by the basic instruction EI in execution with the resource required by the basic instruction EI to be issued. If the resource required by the basic instruction EI in execution is the same as the resource required by the basic instruction EI to be issued, there is resource sharing between the two basic instructions EI. If the resources are different, it is confirmed that there is no resource sharing between the two basic instructions EI.

If the basic instruction EI to be issued has neither data dependency nor control dependency, and causes no resource sharing with the basic instruction EI being executed by the instruction execution units EU0 and EU1, the instruction issue unit 73 issues the basic instruction EI to a corresponding one of the instruction execution units EU0 and EU1 before the end of the execution. Here, the instruction issuance by the instruction issue unit 73 and the instruction execution by the instruction execution units EU0 and EU1 are processed by time-sharing parallel processing.

On the other hand, if the basic instruction EI to be issued has data dependency and/or control dependency, and/or causes resource sharing with the basic instruction EI being executed by the instruction execution units EU0 and EU1, the basic instruction EI is issued to a corresponding one of the instruction execution units EU0 and EU1 after the end of the execution.

Although the two instruction execution units EU0 and EU1 having the same structure are employed in this example, it is also possible to employ three or more instruction execution units.

As described so far, the parallel processor 21 of this example can have the same effects as the parallel processor 20 of Example 1, and efficiently and accurately performs the parallel processing of the basic instructions EI. Thus, more reliable operations can be achieved.

Second Embodiment

FIGS. 7, 12, 14, 16, 18, and 20 show parallel processors 22 to 27 in accordance with a second embodiment of the present invention. Each of the parallel processors 22-27 comprises an instruction fetch unit 48-53 connected to a memory 12, an instruction issue unit 74-79 connected to the instruction fetch unit 48-53, instruction execution units LU0, IU0, IU1, FU0, FU1, and BU0 connected to the instruction issue unit 74-79, and a register unit 99 connected to all the instruction execution units LU0, IU0, IU1, FU0, FU1, and BU0.

The instruction execution unit LU0 is a load store instruction execution unit that executes a load instruction and a store instruction. After the execution of these instructions, the instruction execution unit LU0 notifies the instruction issue unit 74-79 of the end of the execution. The instruction execution units IU0 and IU1 are integer arithmetic instruction execution units that execute integer arithmetic instructions. When the execution of the integer arithmetic instructions is completed, the instruction execution units IU0 and IU1 notify the instruction issue unit 74-79 of the end of the execution.

The instruction execution units FU0 and FU1 are floating-point arithmetic instruction execution units that execute floating-point arithmetic instructions. When the execution of the floating-point arithmetic instructions is completed, the instruction execution units FU0 and FU1 notify the instruction issue unit 74-79 of the end of the execution. The instruction execution unit BU0 is a branch instruction execution unit that executes a branch instruction. When the execution of the branch instruction is completed, the instruction execution unit BU0 notifies the instruction issue unit 74-79 of the end of the execution.

In the following examples, the maximum basic instruction word length contained in one instruction word is 2, but the same effects can be expected in a case where the maximum basic instruction word length is 3 or greater.

Example 1

Figure 7:
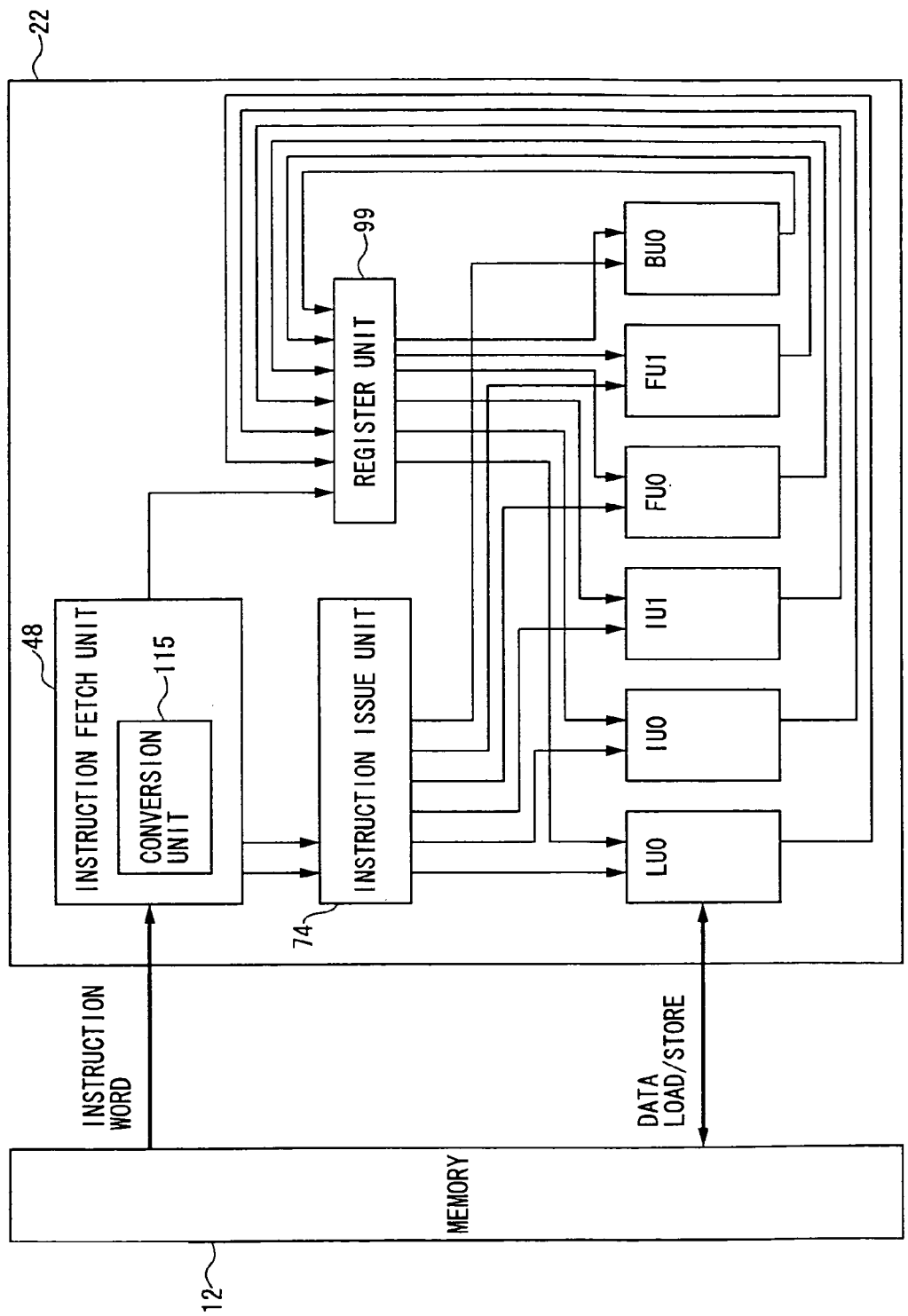
FIG. 7 shows the structure of a first example of a parallel processor in accordance with a second embodiment of the present invention.

FIG. 7 shows the structure of a first example of the parallel processor in accordance with the second embodiment of the present invention. As shown in FIG. 7, the parallel processor 22 comprises a conversion unit 115 in the instruction fetch unit 48. The conversion unit 115 rearranges basic instructions contained in one fetched instruction word in accordance with the structure of the instruction execution units LU0, IU0, IU1, FU0, FU1, and BU0, and then supplies the rearranged basic instructions to the instruction issue unit 74. This rearrangement by the conversion unit 115 facilitates the issuance of the basic instructions of the instruction issue unit 74.

More specifically, the parallel processor of the present invention is embodied on a printed board or an LSI circuit. The components are arranged on a two-dimensional surface and connected by wires. At this point, the wires might cross each other. However, a printed board and an LSI circuit have a plurality of wiring layers, so that any two wires that might cross each other can be arranged on two different wiring layers. Logically, it is possible to place wires in any desired arrangement. In view of the operation speed of the circuit, however, the above alternate wiring (arranging wires on different wiring layers) requires longer wires, which will decrease the operation speed. Therefore, it is preferable to have less alternate wiring. Shorter wires will facilitate the issuance of the basic instruction of the instruction issue unit 74, and increase the operation speed.

Figure 8:
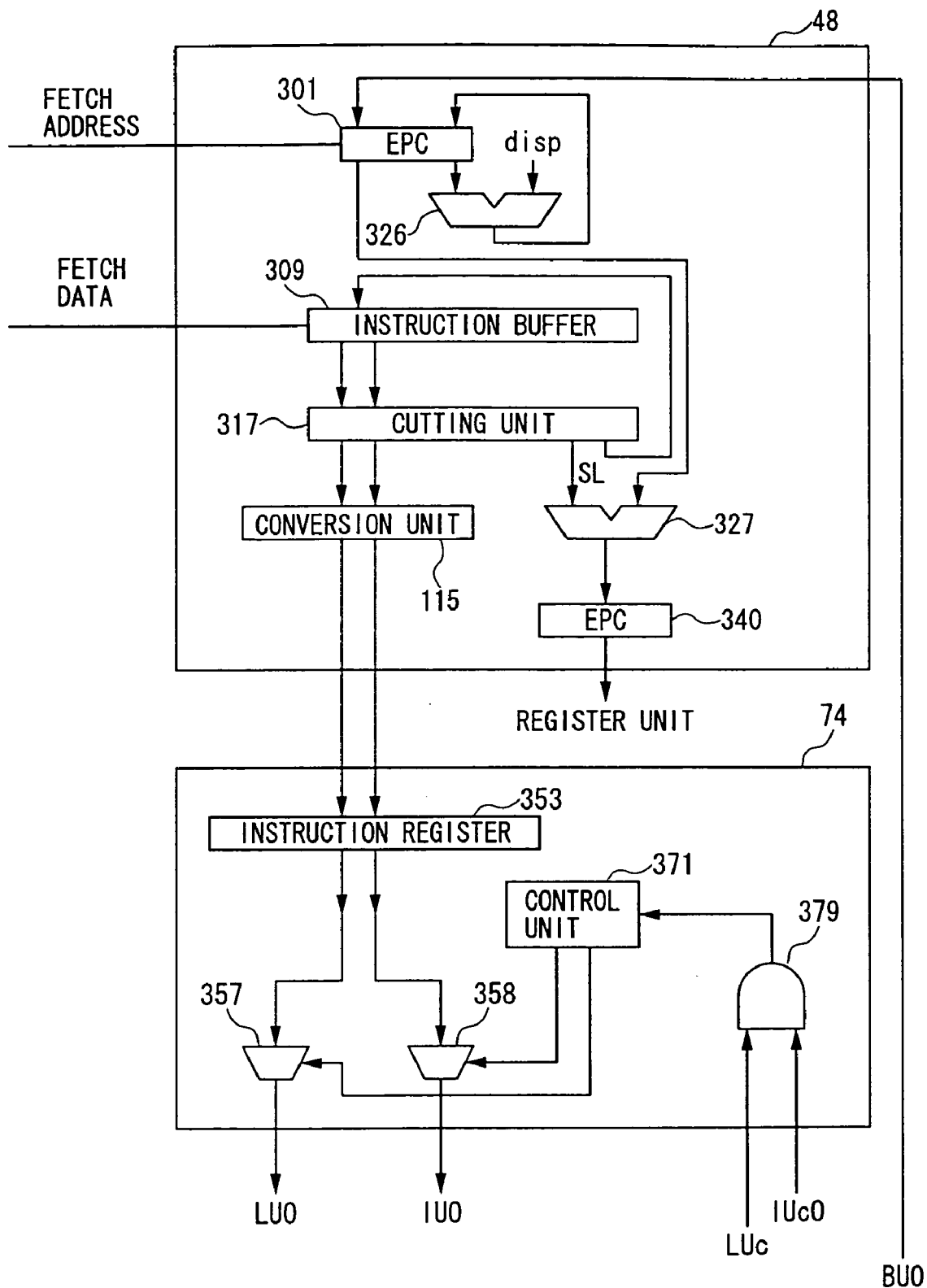
FIG. 8 shows the structures of an instruction fetch unit and an instruction issue unit of the parallel processor shown in FIG. 7.

FIG. 8 shows the structures of the instruction fetch unit 48 and the instruction issue unit 74 of the parallel processor 22 shown in FIG. 7. The instruction fetch unit 48 and the instruction issue unit 74 have the same structures as the instruction fetch unit 46 and the instruction issue unit 72 shown in FIG. 4, except that the instruction fetch unit 48 includes the conversion unit 115 connected to a cutting unit 317. The instruction execution unit BU0 supplies information, such as a branch destination address corresponding to a branch instruction, to a FPC 301.

For simplification of the drawing, only two instruction passages from an instruction register 348 to the two instruction execution units LU0 and IU0 are shown in FIG. 8. However, it should be understood that there are the other instruction passages to the instruction execution units IU1, FU0, FU1, and BU0, as shown in FIG. 7.

Figure 9:
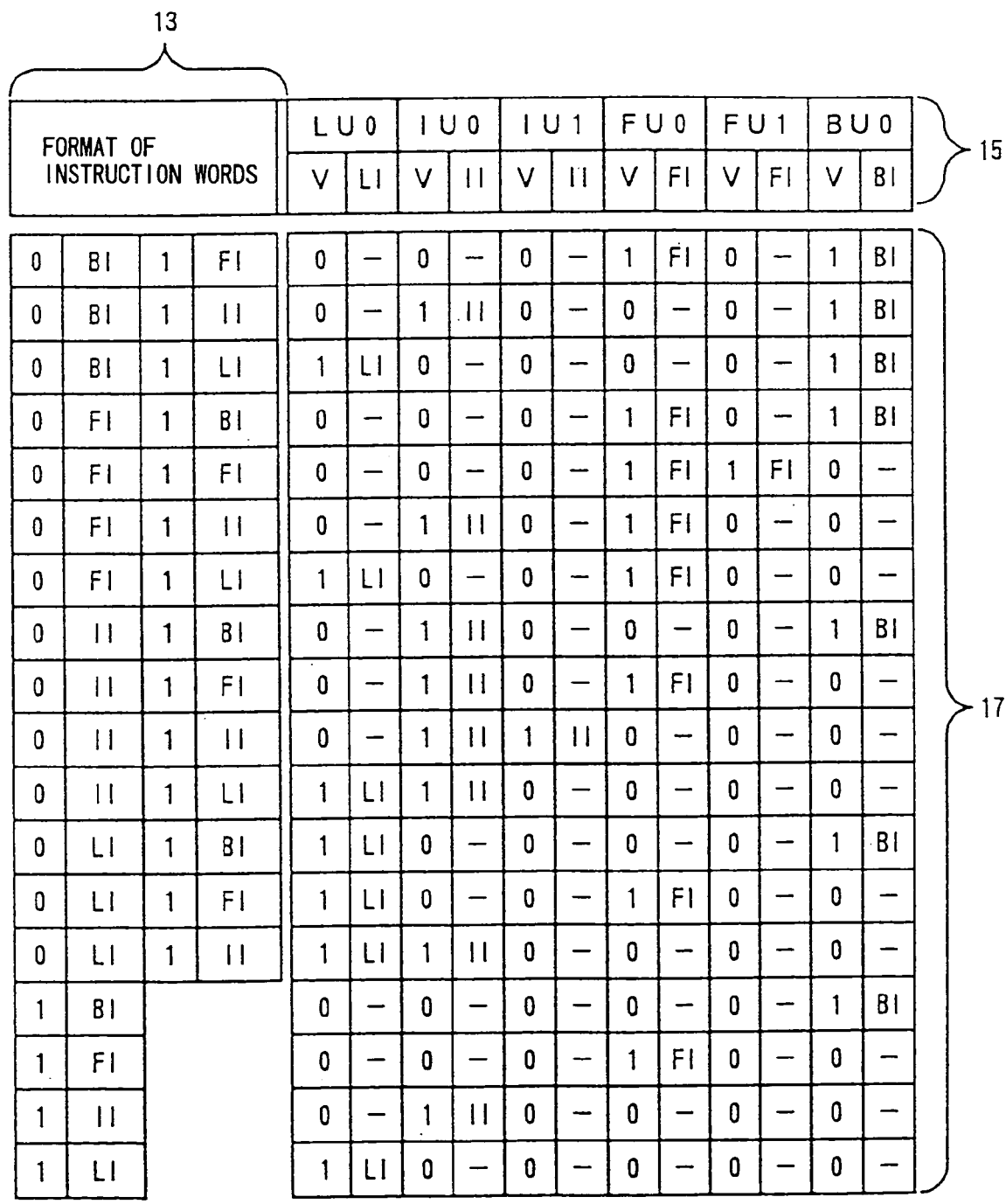
FIG. 9 illustrates basic instruction rearrangement in the parallel processor of the second embodiment of the present invention.

The parallel processor 22 of this example operates in the following manner. First, the cutting unit 317 of the instruction fetch unit 48 fetches instruction words one by one. The formats 13 of the instruction words to be supplied to the instruction fetch unit 48 are shown in FIG. 9. As shown in FIG. 9, each of the instruction words includes an instruction word delimiting field 0 and/or an instruction word delimiting field 1 and one or two instructions selected from the group consisting of an integer arithmetic instruction II, a floating-point arithmetic instruction FI, a load store instruction LI, and a branch instruction BI.

An interface 15 for the instruction execution units LU0, IU0, IU1, FU0, FU1 and BU0, includes effective bits V, information II required for executing an integer arithmetic instruction, information FI required for executing a floating-point arithmetic instruction, information LI required for executing a load store instruction, and information BI required for executing a branch instruction. The interface 15 supplies the effective bit V and the information LI from the instruction issue unit 74 to the instruction execution unit LU0, the effective bit V and the information II to the instruction execution units IU0 and IU1, the effective bit V and the information FI to the instruction execution units FU0 and FU1, and the effective bit V and the information BI to the instruction execution unit BU0.

When the effective bit V is 0, no basic instruction is issued, and when the effective bit 1, a basic instruction is issued. Each effective bit V is coupled with the information II, FI, LI, or BI, and is then allocated to each corresponding instruction execution unit.

As shown in FIG. 9, the instruction word formats 13 are rearranged and converted into instruction word formats 17 by the conversion unit 115 in the instruction fetch unit 48. The instruction word formats 17 correspond to the instruction execution units LU0, IU0, IU1, FU0, FU1, and BU0, and are supplied to the instruction register 348 in the instruction issue unit 74. The instruction register 348 issues basic instructions each having the effective bit V of 1 to corresponding instruction execution units. For instance, when the instruction word on the uppermost row of the instruction word format 17 is supplied to the instruction issue unit 74, the instruction issue unit 74 issues the floating-point arithmetic instruction FI provided with "1" as the effective bit V to the instruction execution unit FU0, and the branch instruction BI also provided with "1" as the effective bit V to the instruction execution unit BU0.

As a result, the instruction execution unit FU0 executes the floating-point arithmetic instruction FI, and the instruction execution unit BU0 executes the branch instruction BI. In this case, no basic instructions are executed by the other instruction execution units LU0, IU0, IU1, and FU1.

Figure 10:
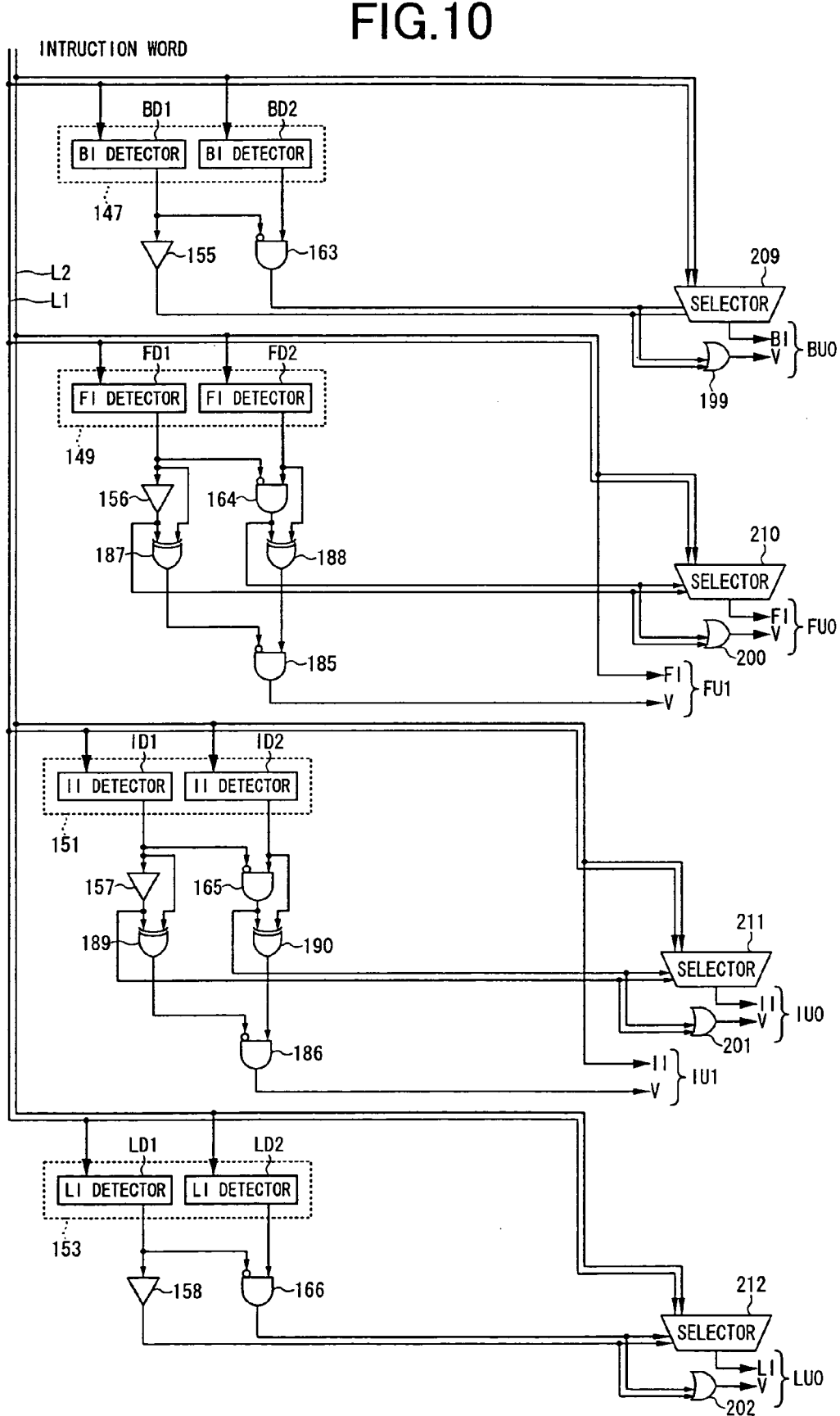
FIG. 10 is a circuit diagram of a conversion unit in the parallel processor shown in FIG. 7.

FIG. 10 is a circuit diagram of the conversion unit 115 shown in FIG. 8. As shown in FIG. 10, the conversion unit 115 comprises transmission lines L1 and L2, BI detectors BD1 and BD2, FI detectors FD1 and FD2, II detectors ID1 and ID2, LI detectors LD1 and LD2, buffers 155 to 158, AND gates 163 to 166, 185, and 186, exclusive OR gates 187 to 190, selectors 209 to 212, and OR gates 199 to 202.

The transmission line L1 transmits the first basic instruction contained in each instruction word, and the transmission line L2 transmits the second basic instruction contained in each instruction word. The BI detector BD1 is connected to the transmission line L1, and the BI detector BD2 is connected to the transmission line L2. The buffer 155 is connected to the BI detector BD1, and the AND gate 163 is connected to the BI detectors BD1 and BD2. The selector 209 is connected to the transmission lines L1 and L2, the buffer 155, and the AND gate 163. The OR gate 199 is connected to the buffer 155 and the AND gate 163.

The FI detector FD1 is connected to the transmission line L1, and the FI detector FD2 is connected to the transmission line L2. The buffer 156 is connected to the FI detector FD1, and the AND gate 164 is connected to the FI detectors FD1 and FD2. The two input terminals of the exclusive OR gate 187 are connected to the input node and the output node, respectively, of the buffer 156. The two input terminals of the exclusive OR gate 188 are connected to the output node of the AND gate 164 and the FI detector FD2, respectively. The AND gate 185 is connected to the two exclusive OR gates 187 and 188. The selector 210 is connected to the transmission lines L1 and L2, the buffer 156, and the AND gate 164. The OR gate 200 is connected to the buffer 156 and the AND gate 164.

The II detector ID1 is connected to the transmission line L1, and the II detector ID2 is connected to the transmission line L2. The buffer 157 is connected to the II detector ID1, and the AND gate 165 is connected to the II detectors ID1 and ID2. The two input terminals of the exclusive OR gate 189 are connected to the input node and the output node, respectively, to the buffer 157. The two input terminals of the exclusive OR gate 190 are connected to the output node of the AND gate 165 and the II detector ID2, respectively. The AND gate 186 is connected to the two exclusive OR gates 189 and 190. The selector 211 is connected to the transmission lines L1 and L2, the buffer 157, and the AND gate 165. The OR gate 201 is connected to the buffer 157 and the AND gate 165.

The LI detector LD1 is connected to the transmission line L1, and the LI detector LD2 is connected to the transmission line L2. The buffer 158 is connected to the LI detector LD1, and the AND gate 166 is connected to the LI detectors LD1 and LD2. The selector 212 is connected to the transmission lines L1 and L2, the buffer 158, and the AND gate 166. The OR gate 202 is connected to the buffer 158 and the AND gate 166.

The two BI detectors BD1 and BD2 constitute a BI detector block 147. The two FI detectors FD1 and F2 constitute an FI detector block 149. The two II detectors ID1 and ID2 constitute an II detector block 151. The two LI detectors LD1 and LD2 constitute an LI detector block 153.

In the following, an operation of the conversion unit 115 having the above structure will be described by way of an example case where the instruction word including the basic instructions BI and FI on the uppermost row of the instruction word formats 13 shown in FIG. 9 is supplied to the conversion unit 115. First, the basic instruction BI is transmitted through the transmission line L1. The BI detector BD1 then detects the basic instruction BI and supplies a detection signal of logic 1 to the buffer 155. At this point, the AND gate 163 outputs a logic 0 signal. In accordance with the detection signal supplied from the buffer 155, the selector 209 selects the first basic instruction BI and outputs the first basic instruction BI, that is, an instruction to be executed by the instruction execution unit BU0, to the instruction issue unit 74. At the same time as the output of the basic instruction BI, in accordance with the detection signal supplied from the buffer 155, the OR gate 199 outputs the effective bit V of logic 1. As the first basic instruction BI is detected, the FI detector FD1, the II detector ID1, and the LI detector LD1 output non-detection signals of logic 0. Accordingly, the selectors 210, 211, and 212 do not select the first basic instruction transmitted through the transmission line L1.

Next, the second basic instruction FI in the instruction word is transmitted through the transmission line L2. As in the case of the first basic instruction BI, The FI detector FD2 detects the second basic instruction FI and supplies a detection signal of logic 1 to the AND gate 164. The AND gate 164 in turn outputs a logic 1 signal. In accordance with the logic 1 signal supplied from the AND gate 164, the selector 210 selects the second basic instruction FI and outputs the second basic instruction FI as an instruction to be executed by the instruction execution unit FU0. At the same time as the output of the basic instruction FI, the OR gate 200 outputs the effective bit V of logic 1 in accordance with the detection signal supplied from the AND gate 164.

As the second basic instruction FI is detected, the BI detector BD2, the II detector ID2, and the LI detector LD2 output non-detection signals of logic 0. Accordingly, the selectors 209, 211, and 212 do not select the second basic instruction transmitted through the transmission line L2. Since neither first nor second basic instructions to be execution by the instruction executed units LU0, IU0, IU1, and FU1 are detected, the effective bit V of logic 0 is outputted from each of the OR gates 201 and 202, and the AND gates 185 and 186.

In the above described manner, the conversion unit 115 converts the instruction word formats 13 into the instruction word formats 17, as shown in FIG. 9.

Figure 11:
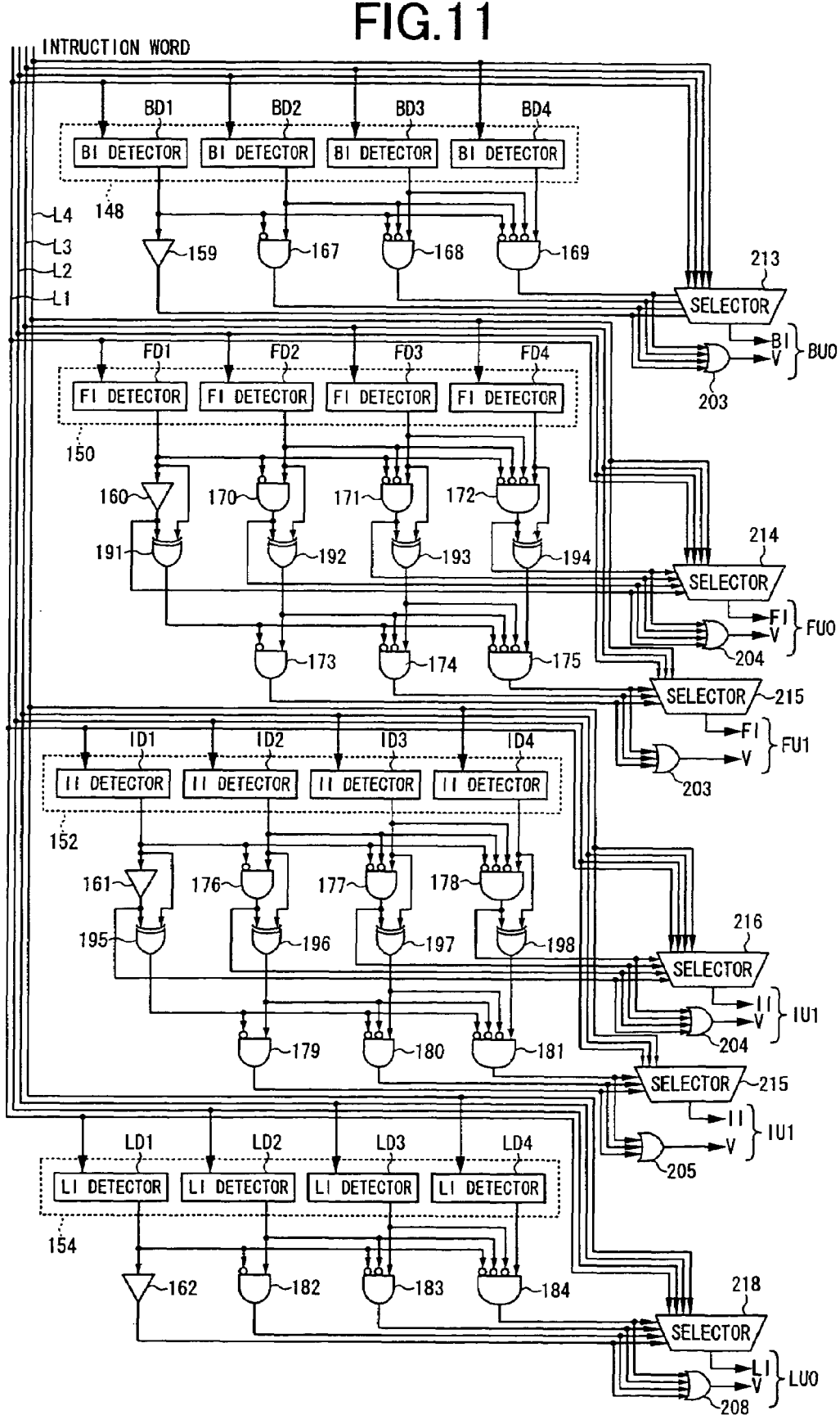
FIG. 11 is a circuit diagram of the conversion unit in a case where the maximum basic instruction word length is 4.

FIG. 11 is a circuit diagram of the conversion unit 115 in a case where the maximum basic instruction word length of one instruction word to be supplied from the memory 12 to the instruction fetch unit 48 is 4. As shown in FIG. 11, the structure of the conversion unit 115 in this case is the same as the structure of the conversion unit 115 shown in FIG. 10, except that the number of transmission lines are 4, the number of BI detectors is 4, the number of FI detectors is 4, the number of II detectors is 4, and the number of LI detectors is 4. Also, two selectors 214 and 215 are provided for a basic instruction FI, and two selectors 216 and 217 are provided for a basic instruction II in this case.

The conversion unit 115 further includes buffers 159 to 162, AND gates 167 to 184, exclusive OR gates 191 to 198, OR gates 203 to 208, and selectors 213 and 218. The four BI detectors BD1 to BD4 constitute a BI detector block 148. The four FI detectors FD1 to FD4 constitute an FI detector block 150. The four II detectors ID1 to ID4 constitute an ID detector block 152. The four LI detectors LD1 to LD4 constitute an LI detector block 154.

The conversion unit 115 having the above structure operates in the same manner as the conversion unit 115 shown in FIG. 10. In the following, an operation of the conversion unit 115 in a case where an instruction word made up of basic instructions BI, FI, FI, and II is supplied to the conversion unit 115 will be described. First, the first basic instruction BI is transmitted through the transmission line L1. The BI detector BD1 then detects the basic instruction BI and supplies a detection signal of logic 1 to the buffer 159. At this point, each of the AND gates 167 to 169 outputs a logic 0 signal. In accordance with the detection signal supplied from the buffer 159, the selector 213 selects the first basic instruction BI and outputs the first basic instruction BI, that is an instruction to be executed by the instruction execution unit BU0, to the instruction issue unit 74. At the same time as the output of the first basic instruction BI, the OR gate 203 outputs the effective bit V of logic 1 in accordance with the detection signal supplied from the buffer 159. As the first basic instruction BI is detected, the FI detector FD1, the II detector ID1, and the LI detector LD1 output non-detection signal of logic 0. Accordingly, the selectors 214, 216, and 218 do not select the first basic instruction BI transmitted through the transmission line L1.

Next, the second basic instruction FI is transmitted on the transmission line L2. The FI detector FD2 then detects the second basic instruction FI and supplies a detection signal of logic 1 to the AND gate 170. The AND gate 170 in turn outputs a logic 1 signal. In accordance with the logic 1 signal supplied from the AND gate 170, the selector 214 selects the second basic instruction FI and outputs the second basic instruction FI as an instruction to be executed by the instruction execution unit FU0. At the same time as the output of the second basic instruction FI, the OR gate 204 outputs the effective bit V of logic 1 in accordance with the detection signal supplied from the AND gate 170.

As the second basic instruction FI is detected, the BI detector BD2, the II detector ID2, and the LI detector LD2 each output a non-detection signal of logic 0. Accordingly, the selectors 213, 216, and 218 do not select the second basic instruction FI transmitted through the transmission line L2.

Next, the third basic instruction FI is transmitted through the transmission line L3. The FI detector FD3 then detects the third basic instruction FI and supplies a detection signal of logic level 1 to the AND gate 171. Since the AND gate 171 has already received a detection signal of logic 1 from the FI detector FD2 at this point, the output of the AND gate 171 is a logic 0 signal. Because of that, the exclusive OR gate 193 outputs a logic 1 signal, and the AND gate 174 also outputs a logic 1 signal. In accordance with the logic 1 signal supplied from the AND gate 174, the selector 215 selects the third basic instruction FI and outputs the third basic instruction FI as an instruction to be executed by the instruction execution unit FU1. At the same time as the output of the third basic instruction FI, the OR gate 205 outputs the effective bit V of logic 1 in accordance with the signal supplied from the AND gate 174.

As the third basic instruction FI is detected, the BI detector BD3, the II detector ID3, and the LI detector LD3 each output a non-detection signal of logic 0. Accordingly, the selectors 213, 216, and 218 do not select the third basic instruction FI transmitted through the transmission line 3.

Next, the fourth basic instruction II of the instruction word is transmitted through the transmission line L4. The II detector ID4 then detects the fourth basic instruction II and supplies a detection signal of logic 1 to the AND gate 178. The AND gate 178 in turn outputs a logic 1 signal. In accordance with the logic 1 signal supplied from the AND gate 178, the selector 216 selects the fourth basic instruction II and outputs the fourth basic instruction II as an instruction to be executed by the instruction execution unit IU0. At the same time as the output of the fourth basic instruction II, the OR gate 206 outputs the effective bit V of logic 1 in accordance with the signal supplied from the AND gate 178.

As described above, in the parallel processor of this example, basic instructions contained in each instruction word supplied to the instruction fetch unit 48 are rearranged in accordance with the arrangement of the instruction execution units, so that the instruction issue unit 74 can smoothly issue the basic instructions to the respective instruction execution units. Thus, the entire operation speed can be increased.

In this example, the instruction fetch unit 48 can also fetch an instruction word containing basic instructions that have already been arranged in accordance with the arrangement of the instruction execution units in advance. In such a case, the basic instructions are arranged in advance so that the circuit size required for rearranging the basic instructions in the instruction fetch unit 48 can be reduced.

More specifically, when there are two instructions for the same function, only one of the two instructions is employed. For instance, the instruction word on the uppermost row and the instruction word on the fourth row from the top of the formats 13 in FIG. 9 are rearranged into the same formats in the formats 17. In this case, only one of the two instruction words should be employed, while the use of the other should be inhibited. Alternatively, an instruction word that will increase the number of alternate wire routes in the instruction fetch unit 48 may be inhibited beforehand. For instance, the instruction words on the upper most row and the fourth row from the top of the formats 13 in FIG. 9 have the basic instructions BI and FI in the opposite orders. Since the circuit components are arranged on a two-dimensional surface, one of the two basic instructions requires more alternate wire routes than the other. Accordingly, the instruction word that requires more alternate wire routes should be inhibited in advance.

As described so far, the circuit size of the parallel processor 22 can be reduced by restricting in advance the arrangement of basic instruction contained in each instruction word to be supplied to the instruction fetch unit 48.

Example 2

Figure 12:
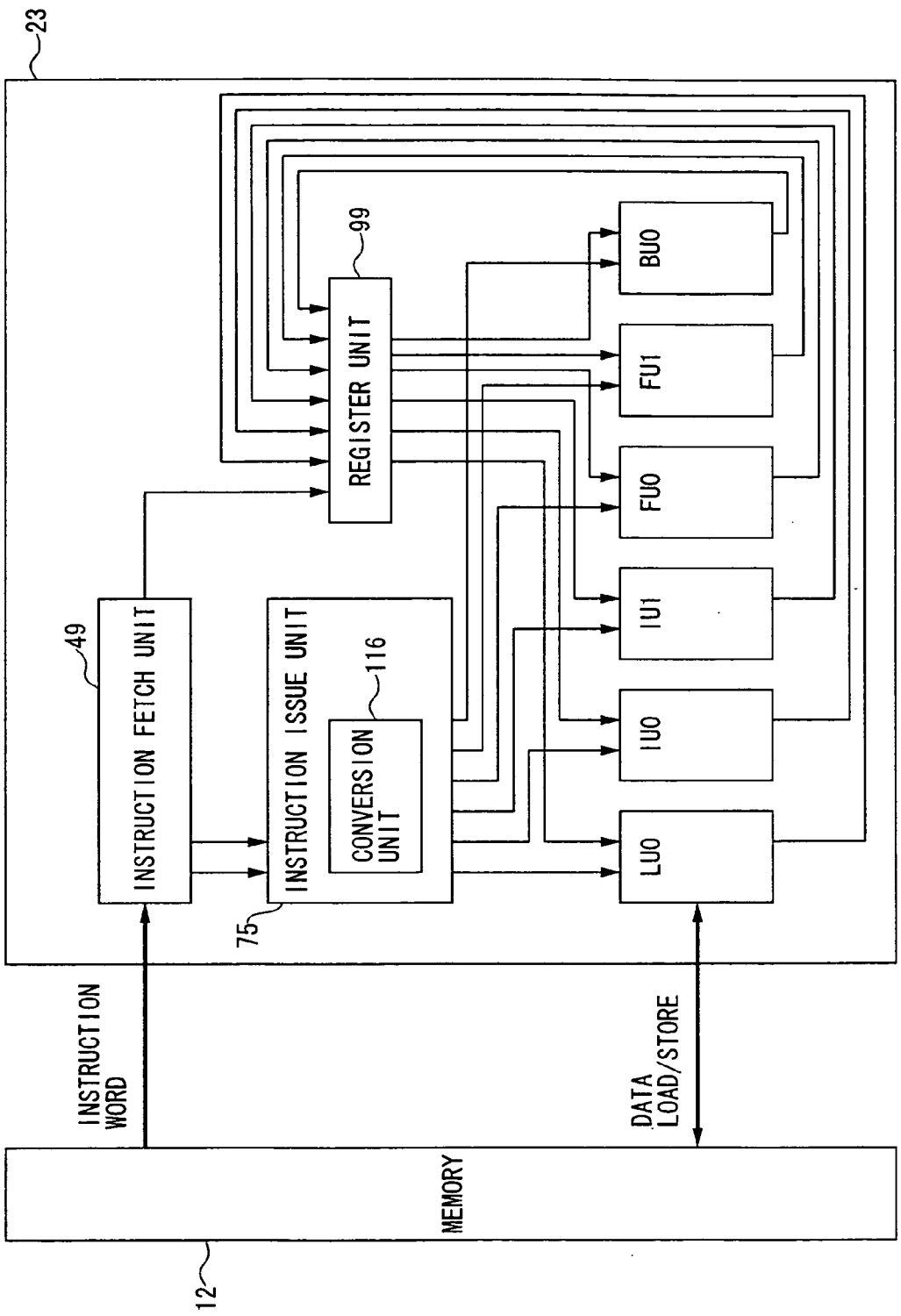
FIG. 12 shows the structure of a second example of the parallel processor in accordance with the second embodiment of the present invention.

FIG. 12 shows the structure of a second example of the parallel processor in accordance with the second embodiment of the present invention. As shown in FIG. 12, the parallel processor 23 of this example has the same structure as the parallel processor 22 of Example 1, except that a conversion unit 116 is included in the instruction issue unit 75. The conversion unit 116 has the same structure and functions as the conversion unit 115 shown in FIGS. 10 and 11.

Figure 13:
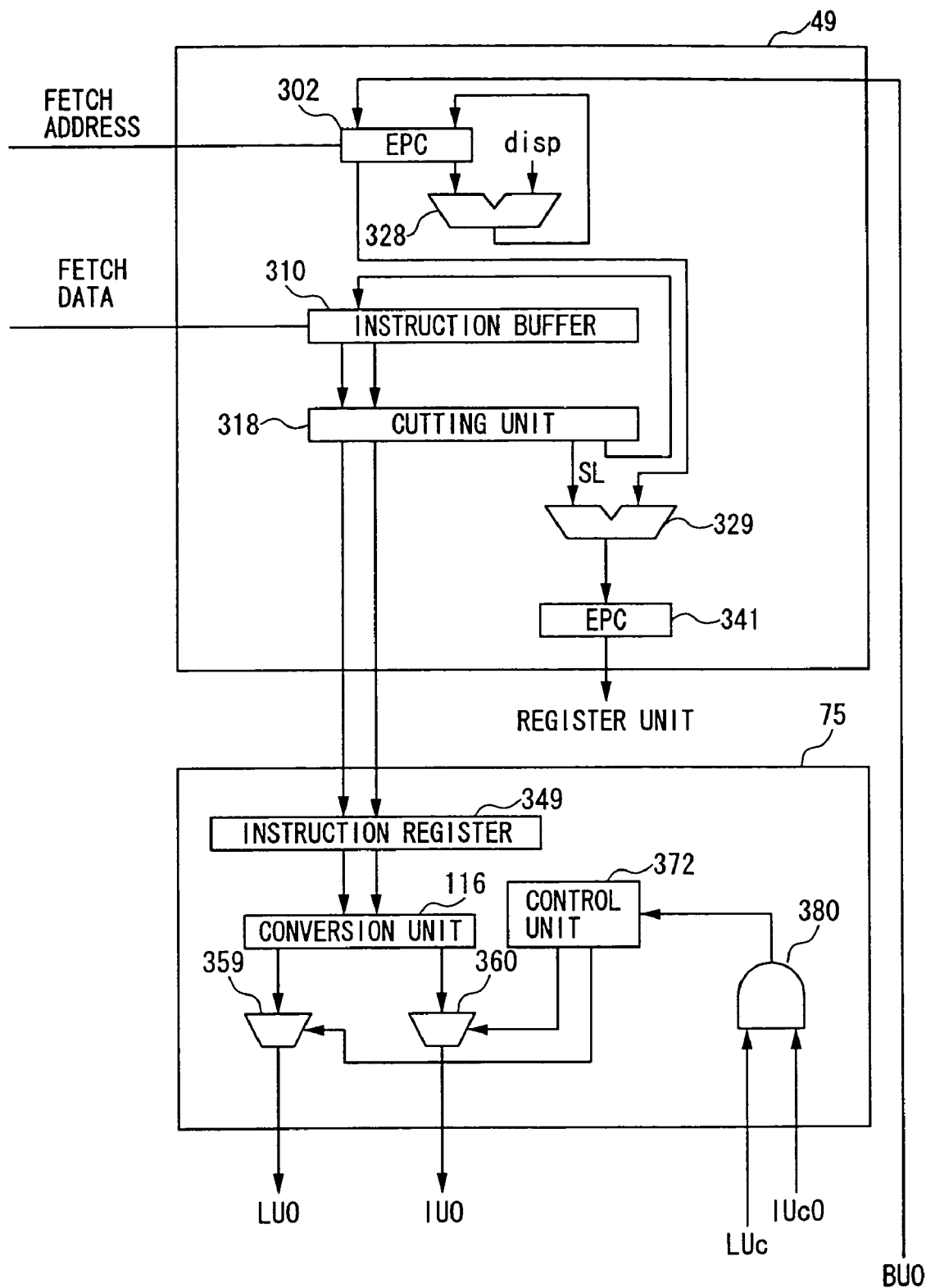
FIG. 13 shows the structures of an instruction fetch unit and an instruction issue unit of the parallel processor shown in FIG. 12.

FIG. 13 shows the structures of the instruction fetch unit 49 and the instruction issue unit 75 of the parallel processor 23 shown in FIG. 12. The instruction fetch unit 49 and the instruction issue unit 75 has the same structures as the instruction fetch unit 46 and the instruction issue unit 72 shown in FIG. 4, except that the instruction issue unit 75 includes the conversion unit 116 connected to an instruction register 349. For simplification of the drawing, only the instruction passages to the two instruction execution units LU0 and IU0 are shown, and the instruction passages to the other instruction execution units IU1, FU0, FU1, and BU0 are omitted in FIG. 13. Also, only two execution complete signals LUc and IUc0 to be supplied to the AND gate 380 are shown, and the other execution complete signals are omitted in FIG. 13.

With the parallel processor of this example, basic instructions contained in each instruction word supplied from the instruction register 349 are rearranged by the conversion unit 116 in accordance with the arrangement of the instruction execution units. The rearranged basic instructions are then issued to the corresponding instruction execution units. Thus, the wires can be shortened as a whole, and the operation speed can be increased.

Also, the arrangement of basic instruction contained in each instruction word to be supplied to the instruction fetch unit 49 can be restricted in advance in the same manner as in Example 1. Thus, the circuit size of the parallel processor 23 can be reduced.

Example 3

Figure 14:
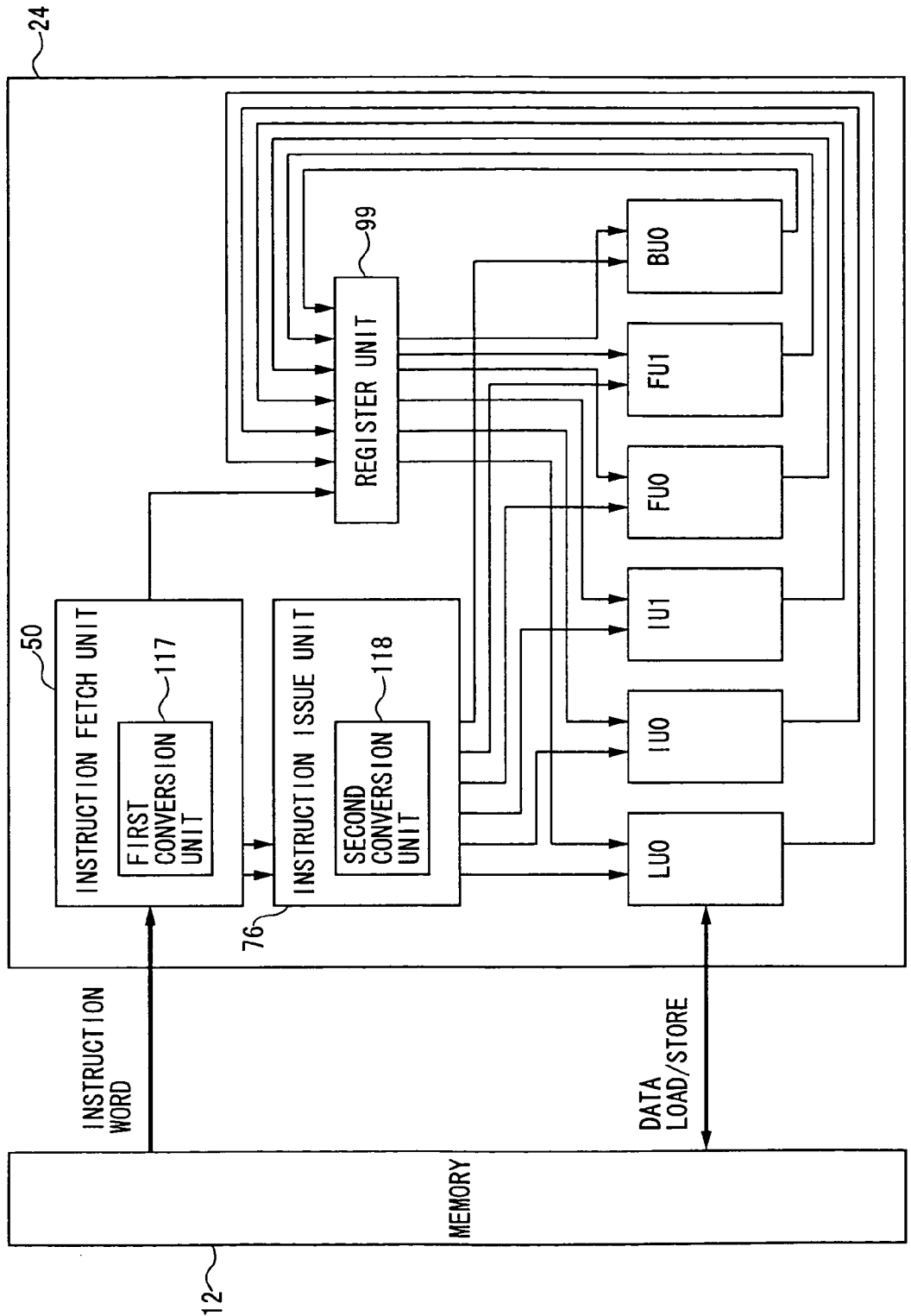
FIG. 14 shows the structure of a third example of the parallel processor in accordance with the second embodiment of the present invention.

FIG. 14 shows the structure of a third example of the parallel processor in accordance with the second embodiment of the present invention. As shown in FIG. 14, the parallel processor 24 has the same structure as the parallel processor 22 of Example 1 shown in FIG. 7, except that the instruction fetch unit 50 includes a first conversion unit 117 and the instruction issue unit 76 includes a second conversion unit 118. The first conversion unit 117 rearranges basic instructions contained in each instruction word in accordance with the arrangement of the instruction execution units. The second conversion unit 118 rearranges basic instructions contained in each instruction word in accordance with the arrangement of the instruction execution units.

Figure 15:
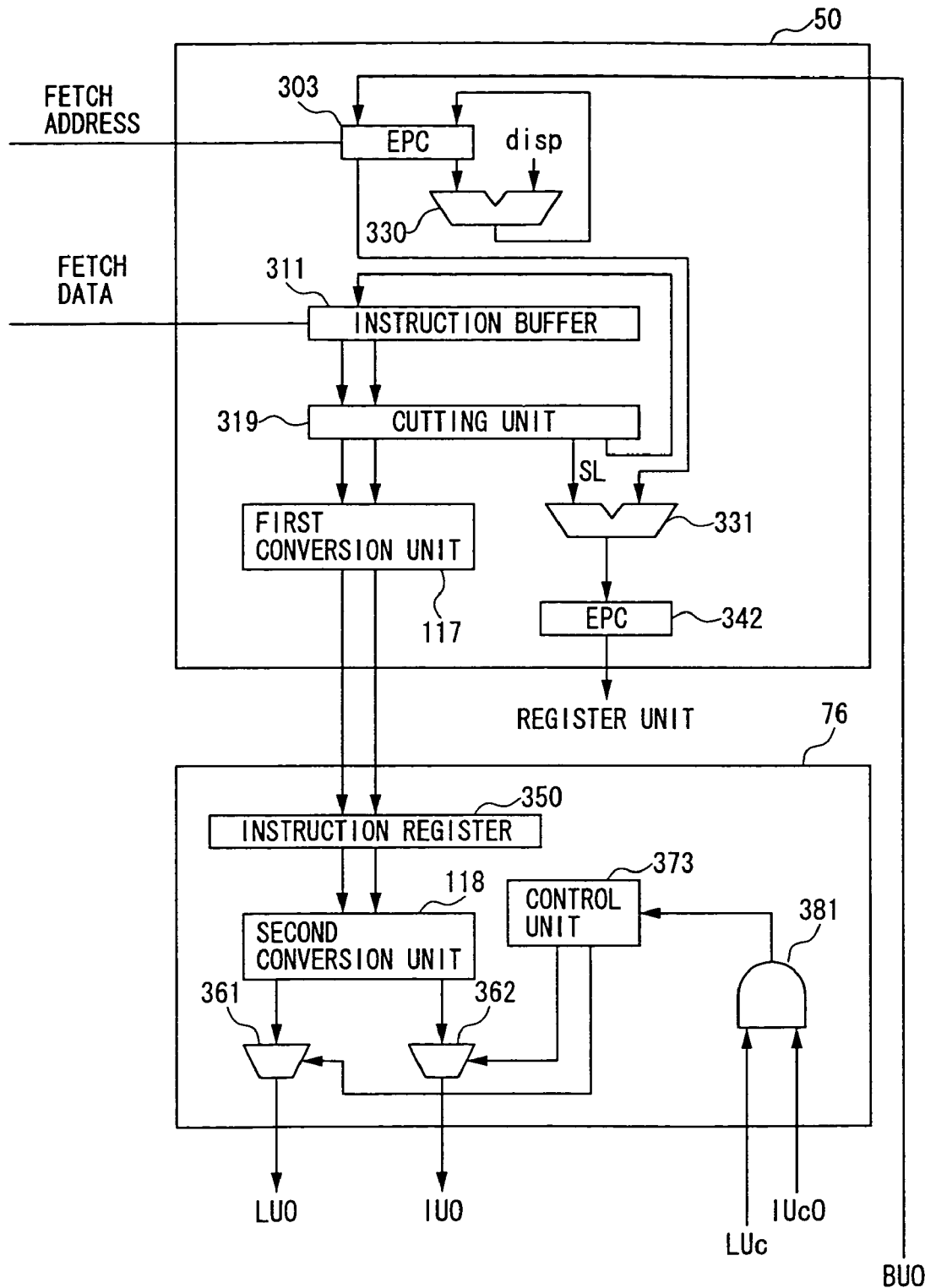
FIG. 15 shows the structures of an instruction fetch unit and an instruction issue unit of the parallel processor shown in FIG. 14.

FIG. 15 shows the structures of the instruction fetch unit 50 and the instruction issue unit 76 of the parallel processor unit 24 shown in FIG. 14. The instruction fetch unit 50 and the instruction issue unit 76 have the same structures as the instruction fetch unit 46 and the instruction issue unit 72 shown in FIG. 4, except that the instruction fetch unit 50 further includes the first conversion unit 117 connected to a cutting unit 319 and the instruction issue unit 76 further includes the second conversion unit 118 connected to an instruction register 350. For simplification of the drawing, only the instruction passages from the second conversion unit 118 to the two instruction execution units LU0 and IU0 are shown, and the instruction passages to the other instruction execution units IU1, FU0, FU1, and BU0 are omitted in FIG. 15. Likewise, only two execution complete signals LUc and IUc0 to be supplied to the AND gate 381 are shown, and the other execution complete signals are omitted in FIG. 15.

The first conversion unit 117 performs "preprocessing" of the rearrangement of basic instructions. The second conversion unit 118 performs "postprocessing" of the rearrangement of basic instructions.

In an actual circuit, the processes performed by the instruction fetch unit 50 and the instruction issue unit 76 are pipelined so as to improve the performance of the parallel processor. Because of that, the difference in processing time between instruction fetch unit 50 and the instruction issue unit 76 should be as small as possible to optimize the pipeline effects. Therefore, the arrangement process is divided into the "preprocessing" and "postprocessing", so that the difference in processing time between the instruction fetch unit 50 and the instruction issue unit 76 is small.

More specifically, the first conversion unit 117 includes circuits that are the counterparts of the BI detector block 147 or 148, the FI detector block 149 or 150, the II detector block 151 or 152, and the LI detector block 153 or 154 shown in FIGS. 10 and 11. The other circuits shown in FIGS. 10 and 11 are included in the second conversion unit 118.

With the parallel processor 24 having the above structure, the wires can be shortened as a whole, and the operation speed can be reduced.

Also, as in Examples 1 and 2, the circuit size of the parallel processor 24 may be reduced by restricting in advance the arrangement of basic instructions contained in each instruction word to be supplied to the instruction fetch unit 50.

Example 4

Figure 16:
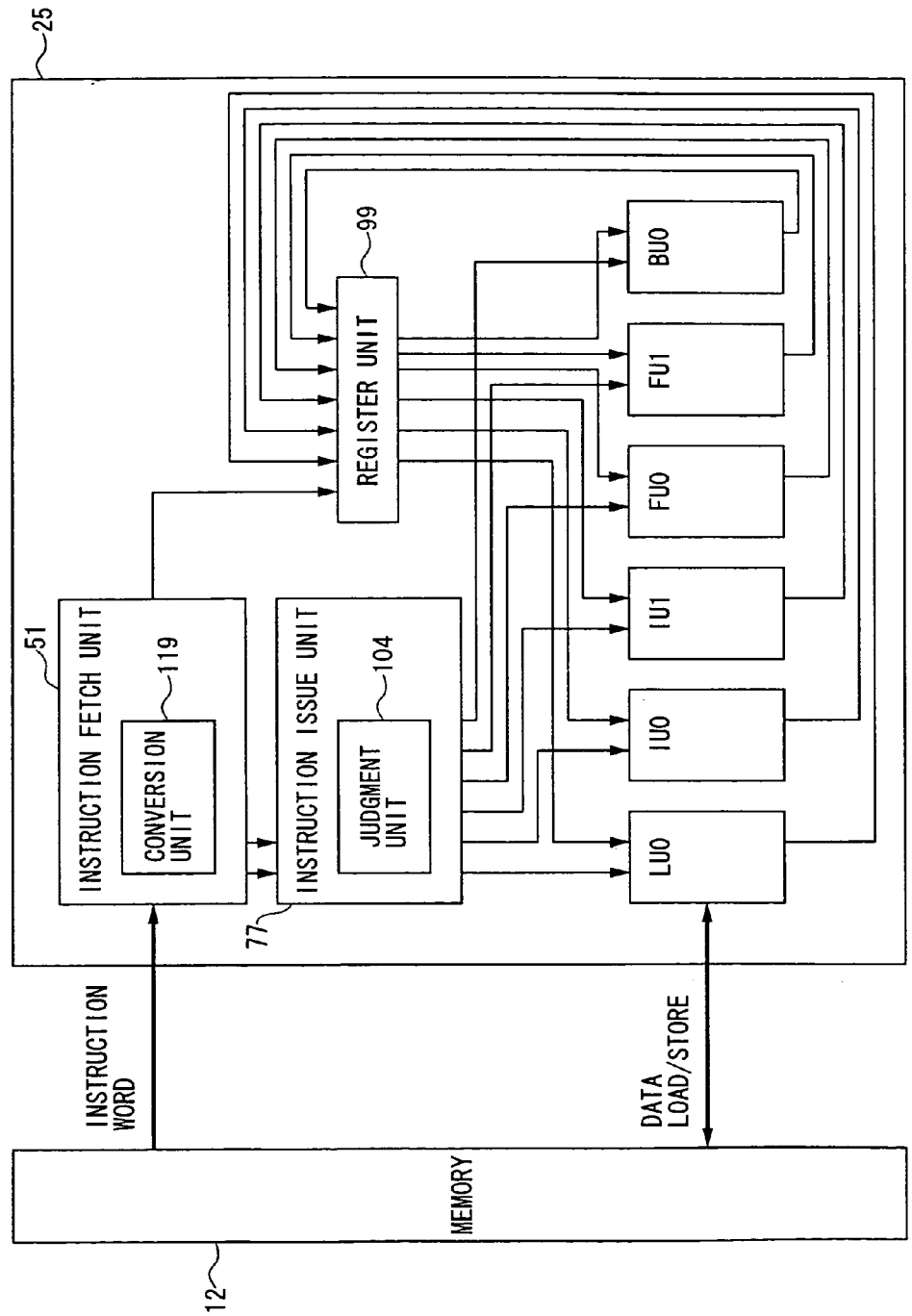
FIG. 16 shows the structure of a fourth example of the parallel processor in accordance with the second embodiment of the present invention.

FIG. 16 shows the structure of a fourth example of the parallel processor in accordance with the second embodiment of the present invention. As shown in FIG. 16, the parallel processor 25 has the same structure as the parallel processor 22 of Example 1 shown in FIG. 7, except that the instruction fetch unit 51 includes a conversion unit 119 and the instruction issue unit 77 includes a judgment unit 104.

Figure 17:
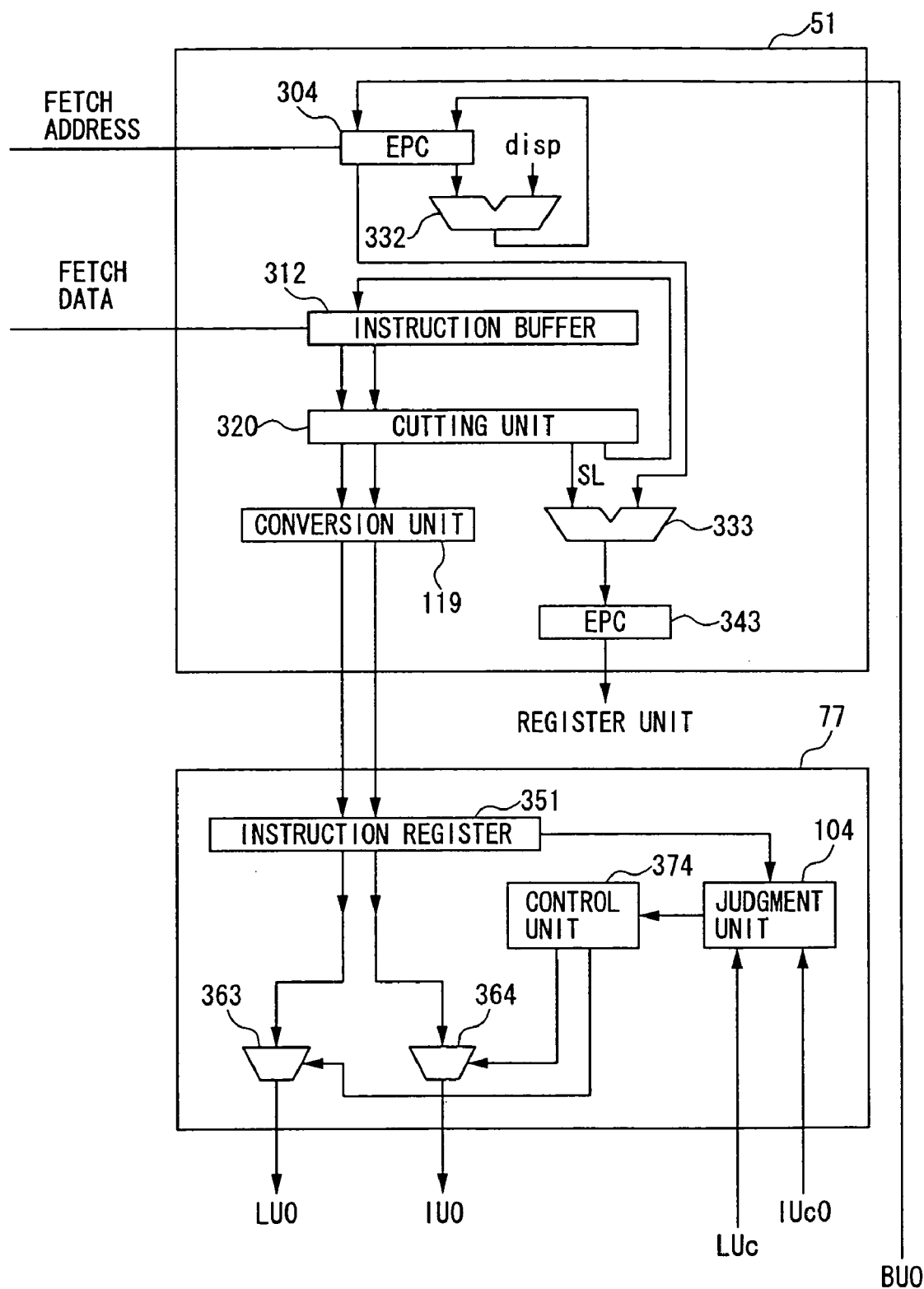
FIG. 17 shows the structures of an instruction fetch unit and an instruction issue unit of the parallel processor shown in FIG. 16.

FIG. 17 shows the structures of the instruction fetch unit 51 and the instruction issue unit 77 of the parallel processor 25 shown in FIG. 16. The instruction fetch unit 51 and the instruction issue unit 77 have the same structures as the instruction fetch unit 48 and the instruction issue unit 74 shown in FIG. 8, except that the instruction issue unit 77 further includes the judgment unit 104. The judgment unit 104 determines whether or not a basic instruction to be issued has data dependency or control dependency with a supplied basic instruction. The judgment unit 104 also determines whether or not the basic instruction to be issued shares resources with the supplied basic instruction. If the basic instruction to be issued has data dependency or control dependency, or shares resources with the supplied basic instruction, the instruction issue unit 77 issues the basic instruction after the execution complete signals LUc and IUc0 are supplied.

For simplification of the drawing, only the instruction passages from an instruction register 351 to the two instruction execution units LU0 and IU0 are shown, and the other instruction passages to the instruction execution units IU1, FU0, FU1, and BU0 are omitted in FIG. 17. Likewise, only the two execution complete signals LUc and IUc0 are shown as signals to be supplied to the judgment unit 104, and the other execution complete signals are omitted in FIG. 17.

The structure and operation of the conversion unit 119 are substantially the same as the structure and operation of the conversion unit 15 shown in FIGS. 10 and 11. The structure and operation of the judgment unit 104 are substantially the same as the structure and operation of the judgment unit 103 shown in FIG. 6.

By the parallel processor of this example having the above structure, the same effects as obtained by the parallel processor of Example 2 of the first embodiment and the parallel processor of Example 1 of the second embodiment can be obtained. In the parallel processor of this example, the instruction issue unit 77, which includes the judgment unit 104, enables accurate and efficient parallel processing of basic instructions, thereby increasing the reliability of the parallel processor. Also, the instruction fetch unit 51, which includes the conversion unit 119, facilitates the basic instruction issuance to the instruction execution units by the instruction issue unit 77, thereby increasing the operation speed.

As in the foregoing examples, the circuit size of the parallel processor 25 may be reduced by restricting in advance the arrangement of basic instructions contained in each instruction word to be supplied to the instruction fetch unit 51.

Example 5

Figure 18:
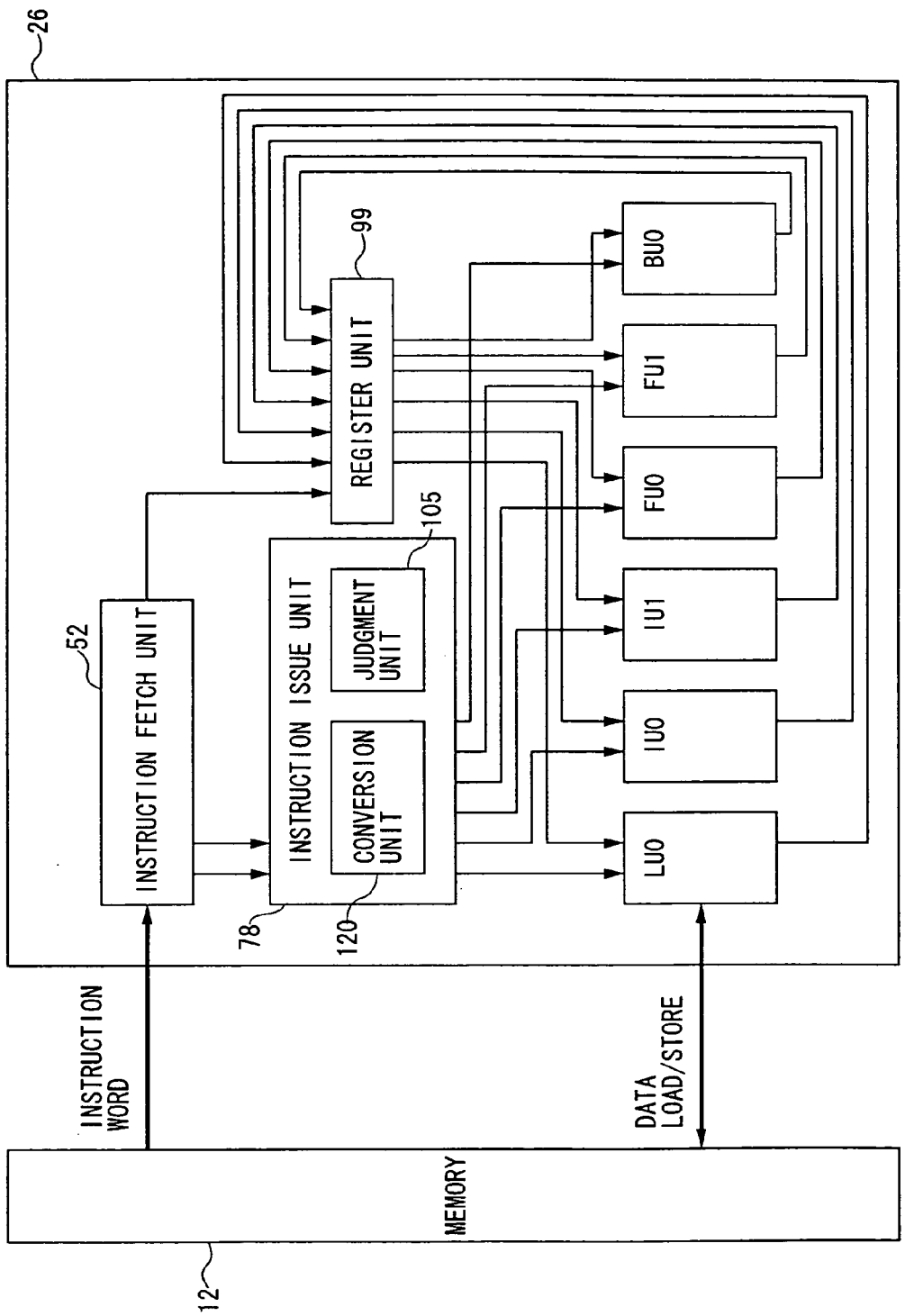
FIG. 18 shows the structure of a fifth example of the parallel processor in accordance with the second embodiment of the present invention.

FIG. 18 shows the structure of a fifth example of the parallel processor in accordance with the second embodiment of the present invention. As shown in FIG. 18, the parallel processor 26 has the same structure as the parallel processor 25 of Example 4, except that the instruction fetch unit 52 includes no conversion unit and the instruction issue unit 78 further includes a conversion unit 120.

Figure 19:
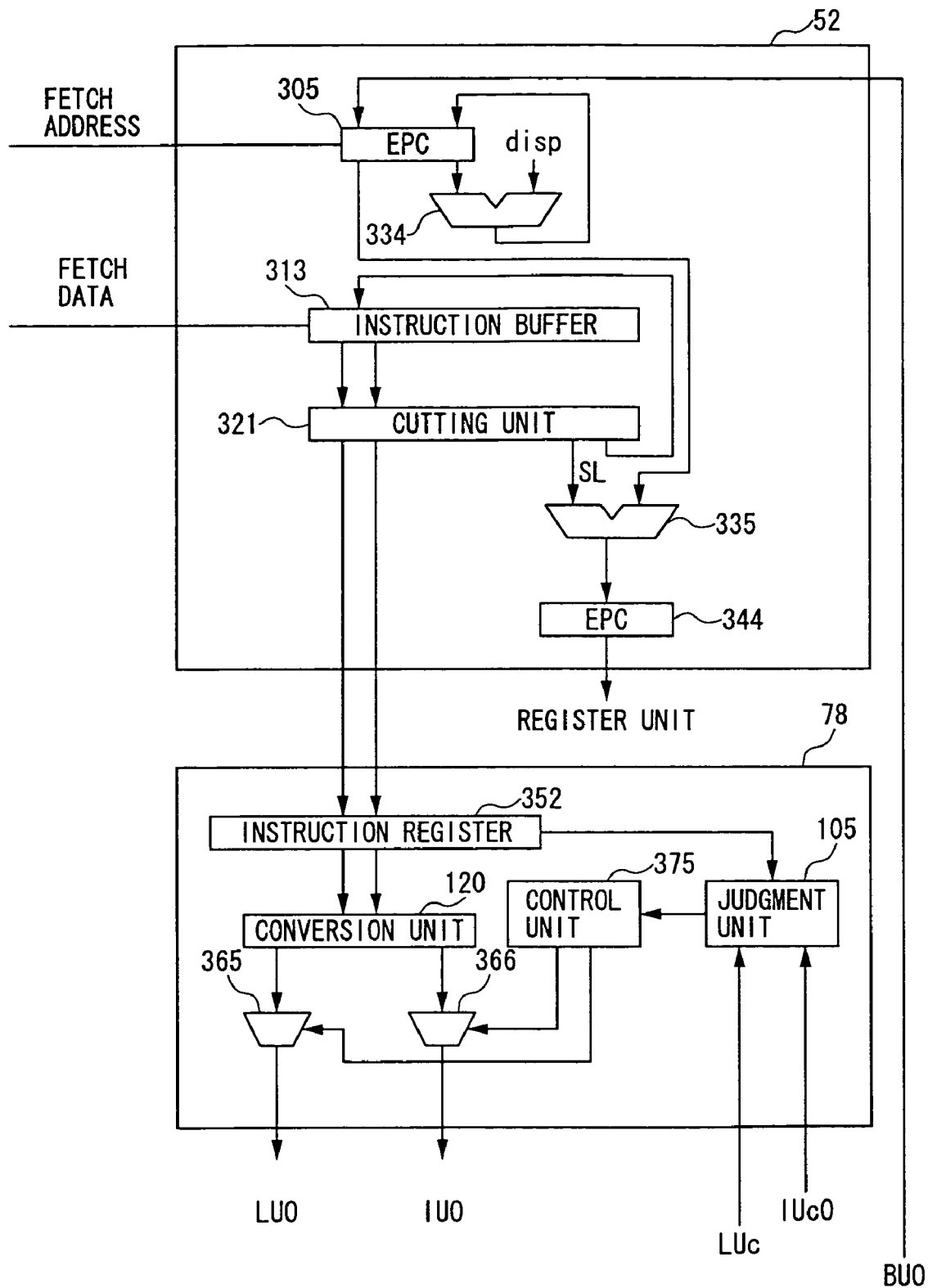
FIG. 19 shows the structures of an instruction fetch unit and an instruction issue unit of the parallel processor shown in FIG. 18.

FIG. 19 shows the structures of the instruction fetch unit 52 and the instruction issue unit 78 of the parallel processor 26 shown in FIG. 18. The instruction fetch unit 52 and the instruction issue unit 78 have the same structures as the instruction fetch unit 49 and the instruction issue unit 75 shown in FIG. 13, except that the instruction issue unit 78 further includes the judgment unit 105 connected between an instruction register 352 and a control unit 375. In accordance with a supplied basic instruction, the judgment unit 105 determines whether or not a basic instruction to be issued has the data dependency or control dependency, and whether or not the basic instruction to be issued will cause resource sharing. The judgment results are reported to the control unit 375. If the basic instruction to be issued has the data dependency or control dependency, or causes resource sharing, the issue instruction unit 78 issues the basic instruction after the supply of the execution complete signals LUc and IUc0.

For simplification of the drawing, only the instruction passages from the instruction register 352 to the two instruction execution units LU0 and IU0 are shown, and the instruction passages to the other instruction execution units are omitted in FIG. 19. Likewise, only the two execution complete signals LUc and IUc0 to be supplied to the judgment unit 105 are shown in FIG. 19.

The structure and operation of the conversion unit 120 are the same as the structure and operation of the conversion unit 115 shown in FIGS. 10 and 11. The structure and operation of the judgment unit 105 are the same as the structure and operation of the judgment unit 104 shown in FIG. 16.

The parallel processor of this example having the above structure achieves the same effects as the parallel processor of Example 4. The instruction issue unit 78 including the judgment unit 105 enables accurate and efficient parallel processing of basic instructions, thereby increasing the reliability of the operation. Also, the instruction issue unit 78, which further includes the conversion unit 120, facilitates the issuance of basic instructions to the instruction execution units.

Additionally, the circuit size of the parallel processor 26 may be reduced by restricting in advance the arrangement of basic instructions contained in each instruction word to be supplied to the instruction fetch unit 52, as in the foregoing examples.

Example 6

Figure 20:
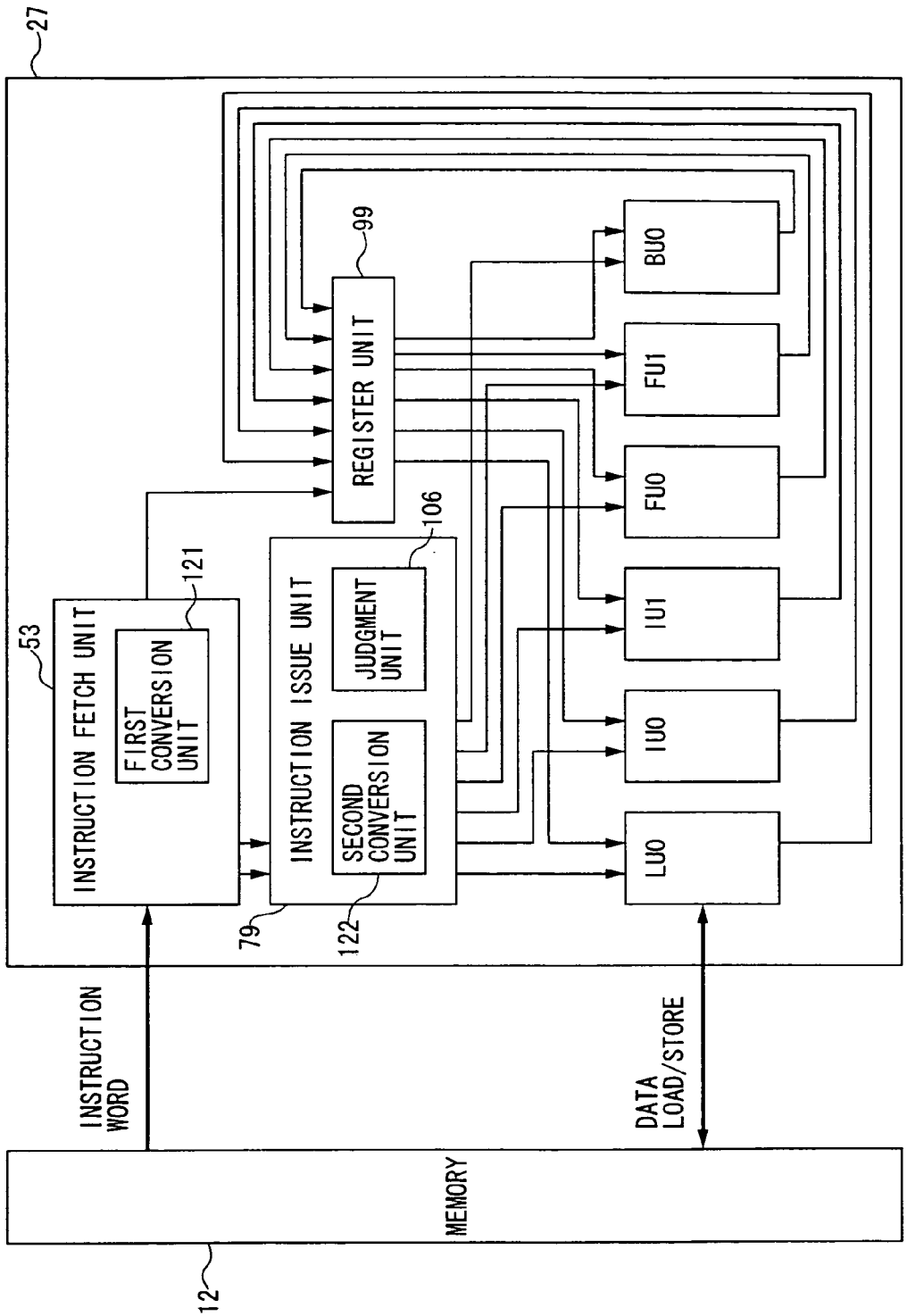
FIG. 20 shows the structure of a sixth example of the parallel processor in accordance with the second embodiment of the present invention.

FIG. 20 shows the structure of a sixth example of the parallel processor in accordance with the second embodiment of the present invention. As shown in FIG. 20, the parallel processor 27 has the same structure as the parallel processor 24 of Example 3 shown in FIG. 14, except that the instruction issue unit 79 further includes a judgment unit 106.

Figure 21:
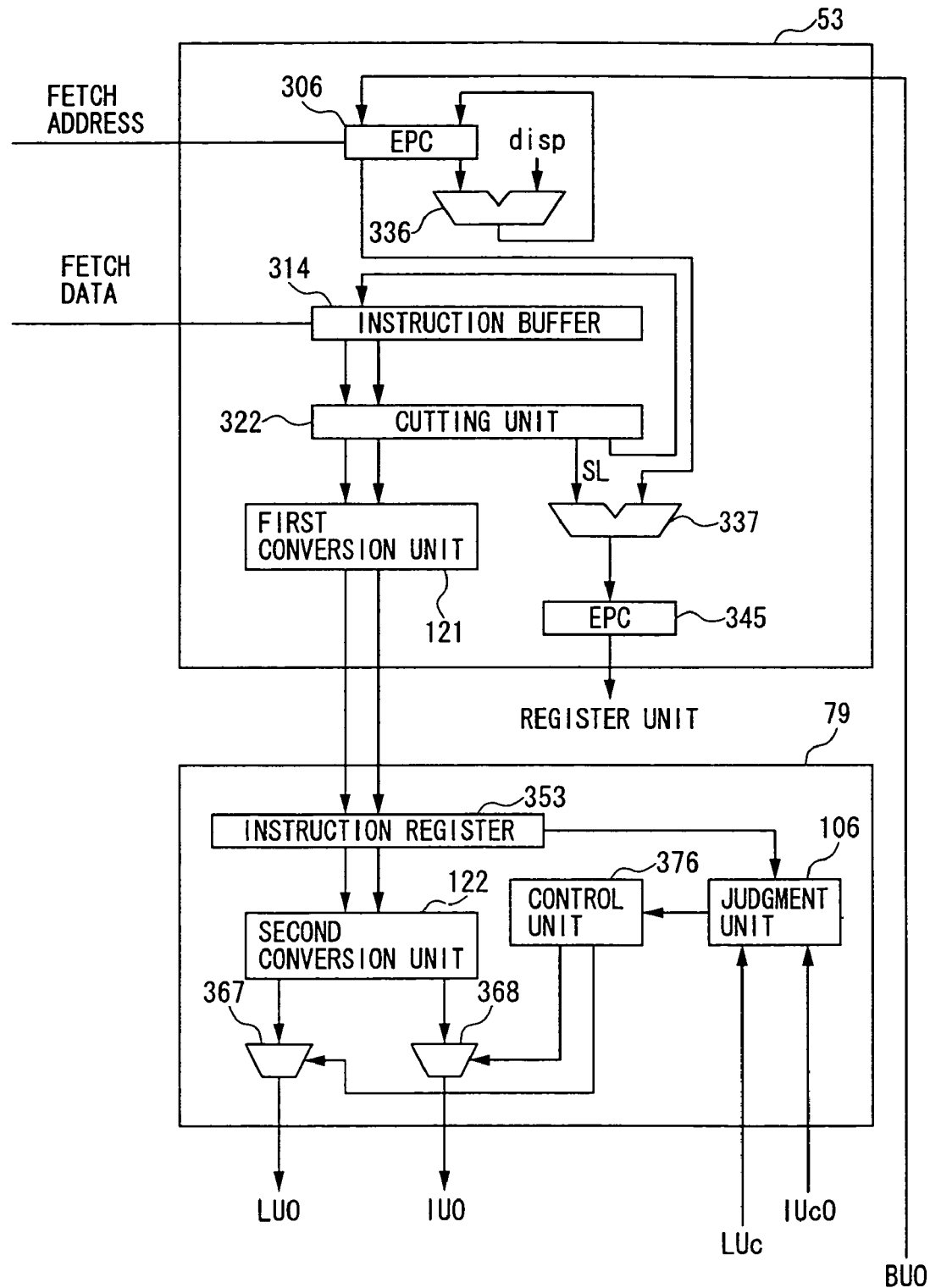
FIG. 21 shows the structures of an instruction fetch unit and an instruction issue unit of the parallel processor shown in FIG. 20.

FIG. 21 shows the structures of the instruction fetch unit 53 and the instruction issue unit 79 of the parallel processor 27 shown in FIG. 20. The instruction fetch unit 53 and the instruction issue unit 79 have the same structures as the instruction fetch unit 50 and the instruction issue unit 76 shown in FIG. 15, except that the instruction issue unit 79 further includes the judgment unit 106 connected between an instruction register 353 and a control unit 376. Based on a supplied basic instruction, the judgment unit 106 determines whether or not a basic instruction to be issued has the data dependency or control dependency, or causes resource sharing. The judgment results are reported to the control unit 376. If the basic instruction to be issued has the data dependency or control dependency, or causes resource sharing, the instruction issue unit 79 issues the basic instruction only after the execution complete signals LUc and IUc0 are supplied.

For simplification of the drawing, only the instruction passages from the instruction register 353 to the two instruction execution units LU0 and IU0 are shown, and the instruction passages to the other instruction execution units IU1, FU0, FU1, and BU0 are omitted in FIG. 21. Likewise, only the two execution complete signals LUc and IUc0 are shown in FIG. 21.

The structures and operations of a first conversion unit 121 and a second conversion unit 122 are the same as the structures and operations of the first conversion unit 117 and the second conversion unit 118. The structure and operation of the judgment unit 106 are the same as the structure and operation of the judgment unit 103 shown in FIG. 6.

The parallel processor 27 of this example having the above structure can achieve both effects of the parallel processor of Example 2 of the first embodiment and the parallel processor of Example 3 of the second embodiment. More specifically, the instruction issue unit 79 including the judgment unit 106 enables accurate and efficient parallel processing of basic instructions, thereby increasing the reliability of the operation. Also, the instruction fetch unit 53 including the first conversion unit 121 and the instruction issue unit 79 including the second conversion unit 122 facilitate the issuance of basic instructions from the instruction issue unit 79 to the instruction execution units.

Additionally, the circuit size of the parallel processor 27 may be reduced by restricting in advance the arrangement of basic instructions contained in each instruction word to be supplied to the instruction fetch unit 53, as in the foregoing examples.

Third Embodiment

As shown in FIGS. 22 to 27, parallel processors 28 to 33 in accordance with a third embodiment of the present invention each comprises an instruction fetch unit 54-59 connected to the memory 12, an instruction issue unit 80-85 connected to the instruction fetch unit 54-59, instruction execution units LU0, IU0, IU1, FU0, FU1, MU0, MU1, and BU0, and a register unit 100 connected to all the instruction execution units. Here, the instruction execution units MU0 and MU1 are special-purpose arithmetic instruction execution units that execute special-purpose arithmetic instructions. When the execution of special-purpose arithmetic instructions is completed, the instruction execution units MU0 and MU0 notify the instruction issue unit 80-85 of the end of the execution.

In the following, the parallel processors in accordance with the third embodiment of the present invention will be described by way of a case where the maximum basic instruction word length contained in one instruction word is 2. It should be understood that the same effects can be obtained in a case where the maximum instruction word length contained in one instruction word is 3 or more.

Example 1

Figure 22:
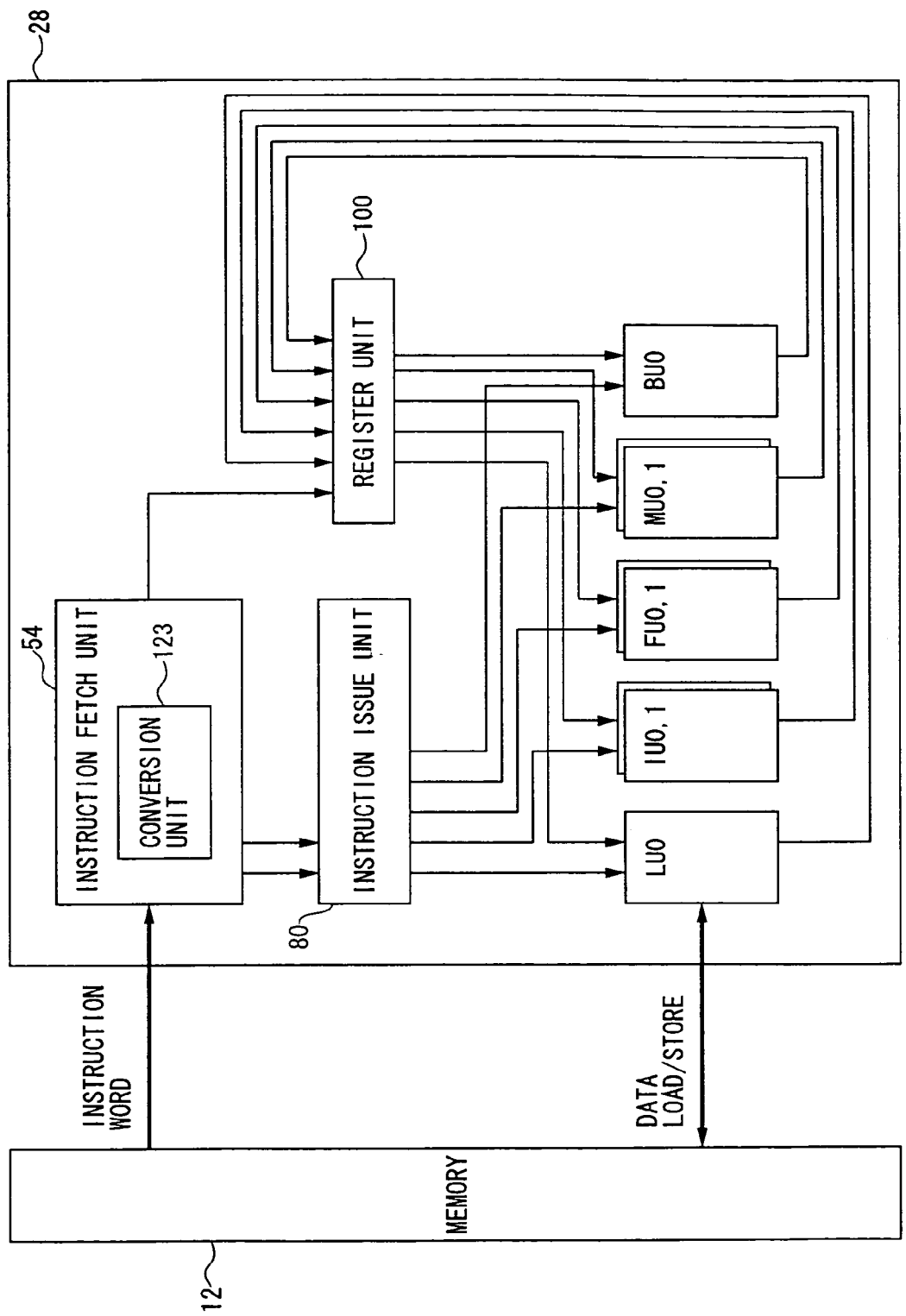
FIG. 22 shows the structure of a first example of a parallel processor in accordance with a third embodiment of the present invention.

FIG. 22 shows the structure of a first example of the parallel processor in accordance with the third embodiment of the present invention. As shown in FIG. 22, the parallel processor 28 comprises a conversion unit 123 in the instruction fetch unit 54. The structure and the operation of the conversion unit 123 are the same as the conversion unit 115 of Example 1 of the second embodiment. More specifically, the conversion unit 123 rearranges basic instructions contained in each instruction word in accordance with the arrangement of the instruction execution units, and then supplies the rearranged basic instructions to the instruction issue unit 80.

The parallel processor 28 having the above structure can achieve the same effects as the parallel processor 22 of Example 1 of the second embodiment. In other words, the issuance of basic instructions from the instruction issue unit 80 to the instruction execution units can be facilitated, and the operation speed can be increased.

Additionally, the circuit size of the parallel processor 28 may be reduced by restricting in advance the arrangement of basic instructions contained in each instruction word to be supplied to the instruction execution units, as in the foregoing examples.

Example 2

Figure 23:
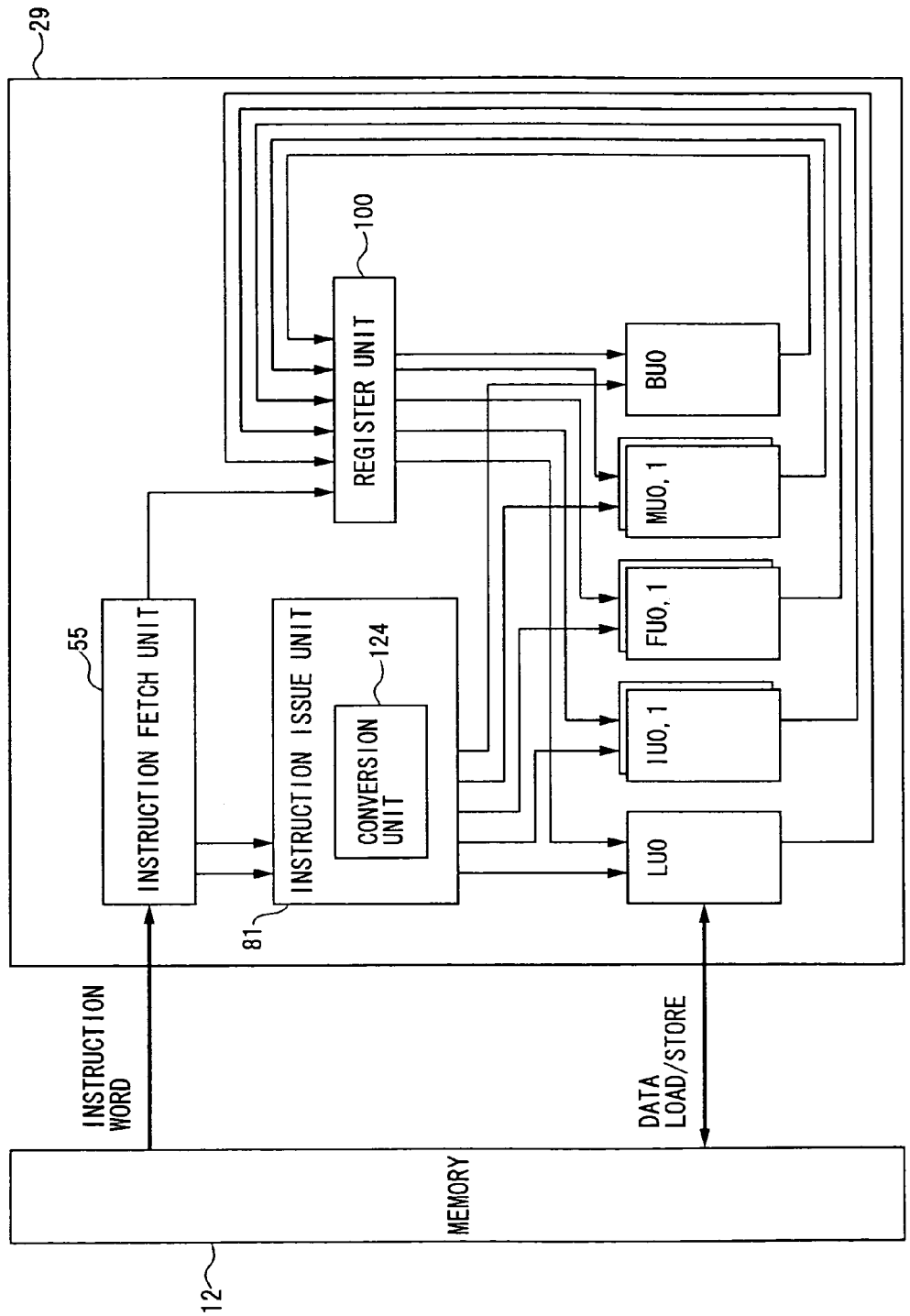
FIG. 23 shows the structure of a second example of the parallel processor in accordance with the third embodiment of the present invention.

FIG. 23 shows the structure of a second example of the parallel processor in accordance with the third embodiment of the present invention. As shown in FIG. 23, the parallel processor 29 has the same structure as the parallel processor 23 shown in FIG. 12, comprising a conversion unit 124 in the instruction issue unit 81. The structure and operation of the conversion unit 124 are the same as the structure and operation of the conversion unit 115 shown in FIGS. 10 and 11.

In the parallel processor 29 of this example, the instruction issue unit 81 issues each basic instruction to the corresponding one of the instruction execution units, only after the conversion unit 124 rearranges the basic instructions, which are contained in each instruction word supplied from the instruction fetch unit 55, in accordance with the arrangement of the instruction execution units. Thus, wires can be shortened as a whole, and the operation speed can be increased.

Additionally, the circuit size of the parallel processor 29 may be reduced by restricting in advance the arrangement of basic instructions contained in each instruction word to be supplied to the instruction fetch unit 55, as in the foregoing examples.

Example 3

Figure 24:
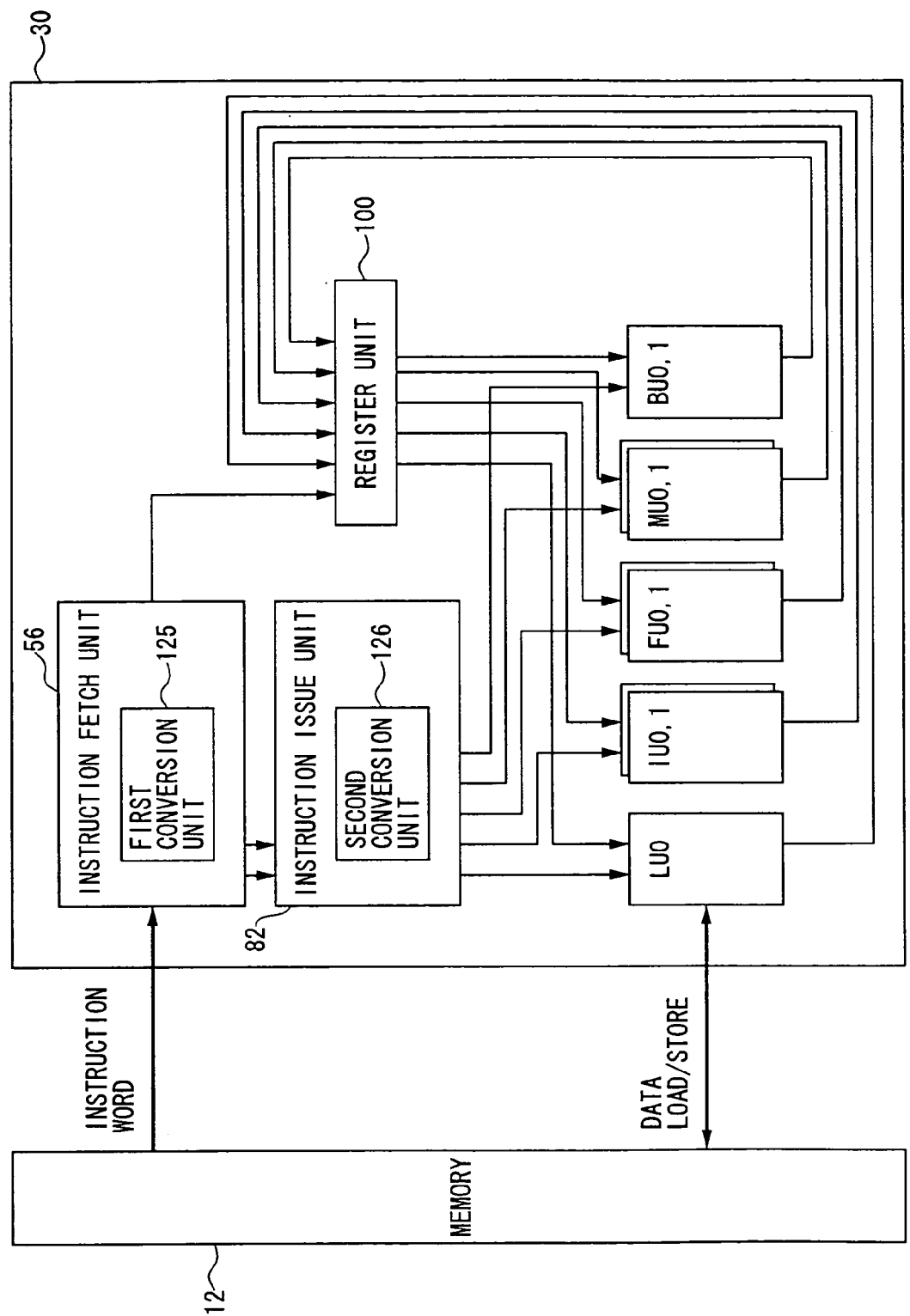
FIG. 24 shows the structure of a third example of the parallel processor in accordance with the third embodiment of the present invention.

FIG. 24 shows the structure of a third example of the parallel processor in accordance with the third embodiment of the present invention. As shown in FIG. 24, the parallel processor 30 has substantially the same structure as the parallel processor 24 shown in FIG. 14. The instruction fetch unit 56 includes a first conversion unit 125 that rearranges basic instructions contained in each fetched instruction word in accordance with the arrangement of the instruction execution units. The instruction issue unit 82 includes a second conversion unit 126 that further rearranges basic instructions contained in each instruction word supplied from the instruction fetch unit 56 in accordance with the arrangement of the instruction execution units.

The first conversion unit 125 performs "preprocessing" of rearrangement of basic instructions, and the second conversion unit 126 performs "postprocessing" of basic instructions.

In an actual circuit, the processes in the instruction fetch unit 56 and the instruction issue unit 82 are pipelined in order to improve the performance of the parallel processor. Because of that, the difference in processing time between instruction fetch unit 56 and the instruction issue unit 82 should be as small as possible to optimize the pipeline effects. Therefore, the arrangement process is divided into the "preprocessing" and "postprocessing", so that the difference in processing time between the instruction fetch unit 56 and the instruction issue unit 82 is small.

By the parallel processor of this example having the above structure, wires can be shortened as a whole, and the operation speed can be increased.

Additionally, the circuit size of the parallel processor 30 may be reduced by restricting in advance the arrangement of basic instructions contained in each instruction word to be supplied to the instruction fetch unit 56, as in the foregoing examples.

Example 4

Figure 25:
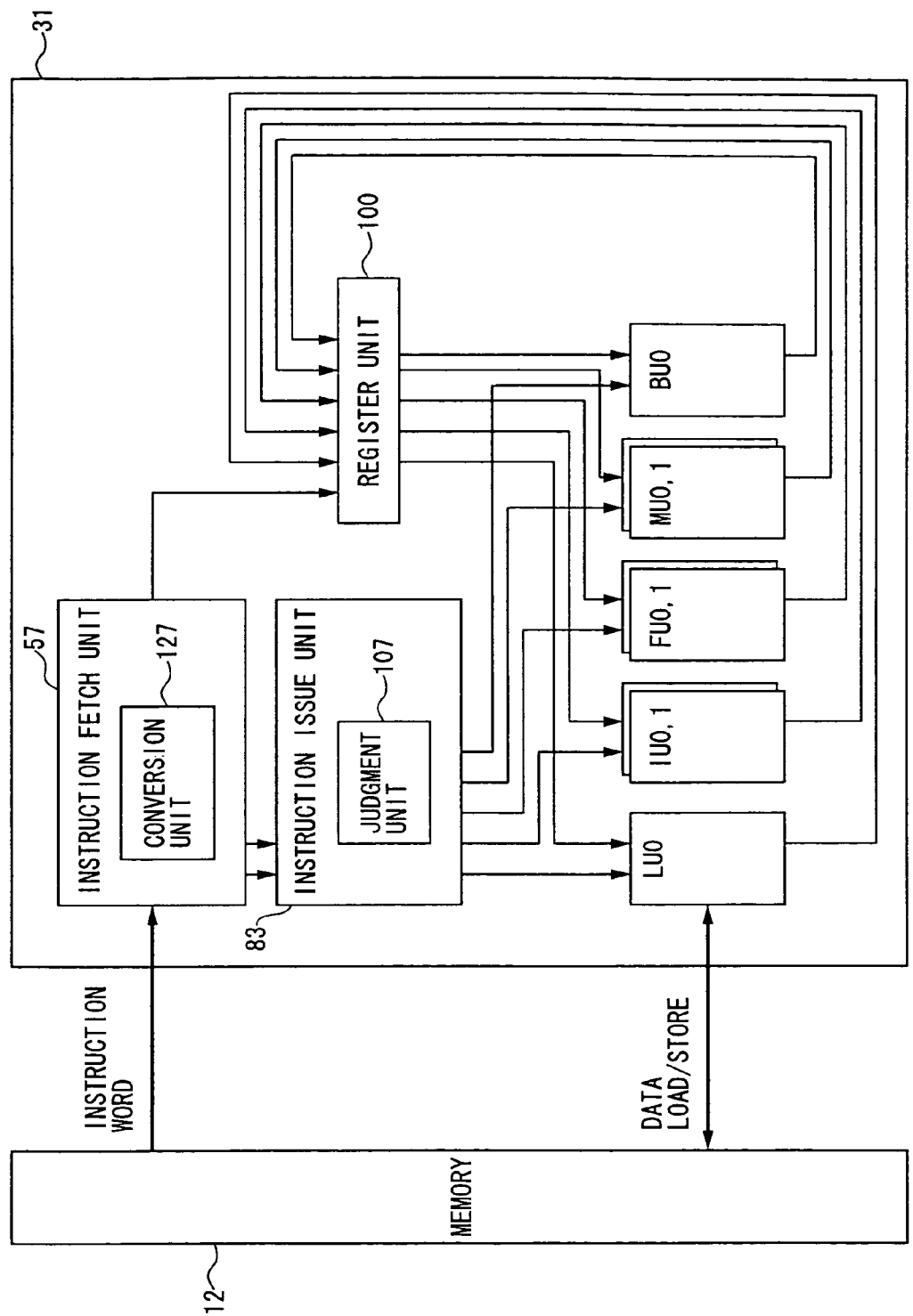
FIG. 25 shows the structure of a fourth example of the parallel processor in accordance with the third embodiment of the present invention.

FIG. 25 shows the structure of a fourth embodiment of the parallel processor in accordance with the third embodiment of the present invention. As shown in FIG. 25, the parallel processor 31 has the same structure as the parallel processor 25 shown in FIG. 16. The instruction fetch unit 57 includes a conversion unit 127, and the instruction issue unit 83 includes a judgment unit 107.

The structure and operation of the conversion unit 127 are the same as the structure and operation of the conversion unit 115 shown in FIGS. 10 and 11. The structure and operation of the judgment unit 107 are the same as the structure and operation of the judgment unit 103 shown in FIG. 6.

By the parallel processor of this example having the above structure, the same effects as the parallel processor of Example 4 of the second embodiment can be obtained. More specifically, the instruction issue unit 83 including the judgment unit 107 enables accurate and efficient parallel processing of basic instructions, thereby increasing the reliability of the operation. The instruction fetch unit 57 including the conversion unit 127 facilitates the issuance of basic instructions to the instruction execution units, thereby increasing the operation speed.

Additionally, the circuit size of the parallel processor 31 may be reduced by restricting in advance the arrangement of basic instructions contained in each instruction word to be supplied to the instruction fetch unit 57, as in the foregoing examples.

Example 5

Figure 26:
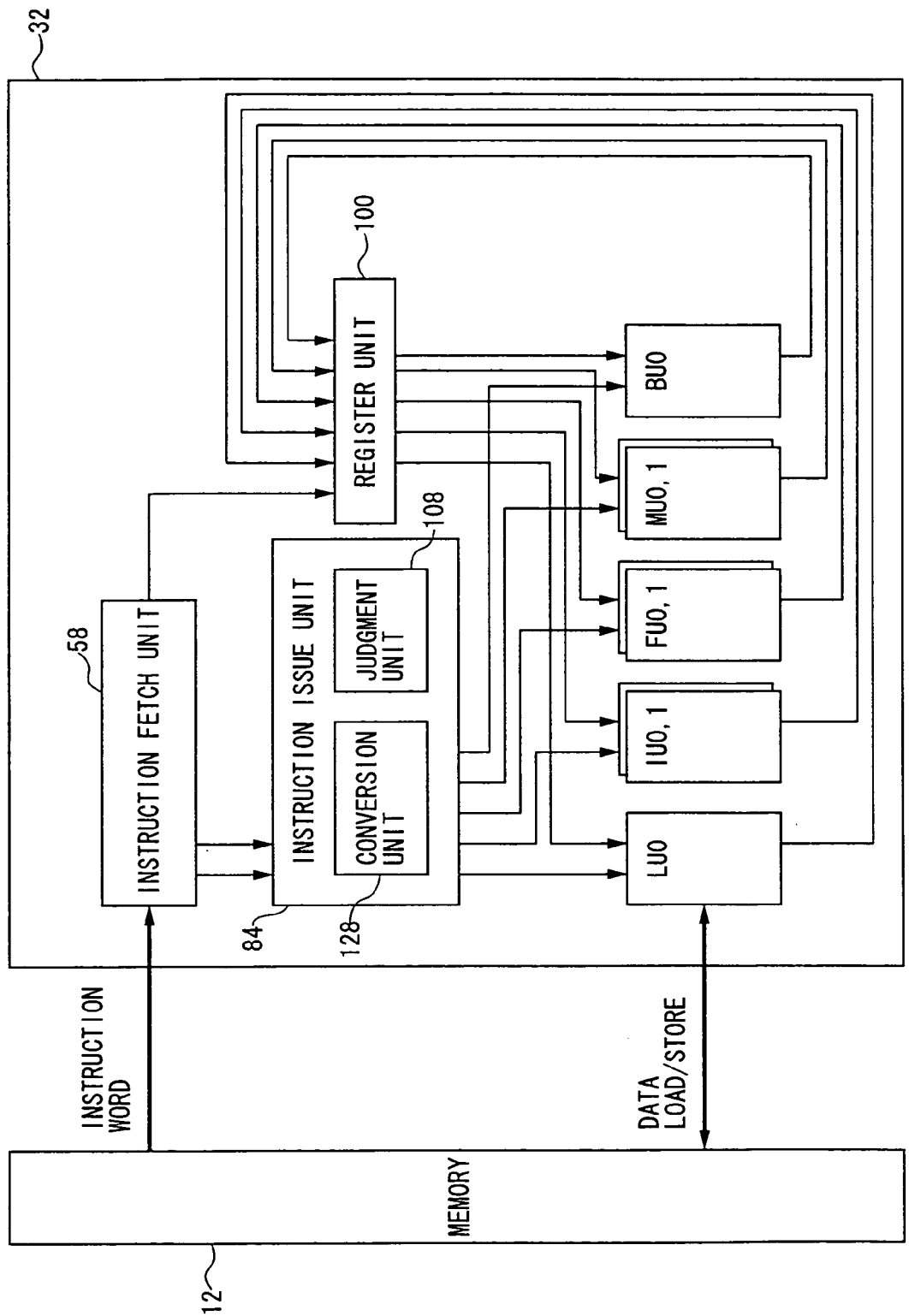
FIG. 26 shows the structure of a fifth example of the parallel processor in accordance with the third embodiment of the present invention.

FIG. 26 shows the structure of a fifth example of the parallel processor in accordance with the third embodiment of the present invention. As shown in FIG. 26, the parallel processor 32 has the same structure as the parallel processor 26 of Example 5 of the second embodiment shown in FIG. 18. The instruction issue unit 84 includes a conversion unit 128 and a judgment unit 108.

The structure and operation of the conversion unit 128 are the same as the structure and operation of the conversion unit 115 shown in FIGS. 10 and 11. The structure and operation of the judgement unit 108 are the same as the structure and operation of the judgment unit 103.

By the parallel processor of this example having the above structure, the same effects as the parallel processor 26 of Example 5 of the second embodiment. More specifically, the instruction issue unit 84 including the judgment unit 108 enables accurate and efficient parallel processing of basic instructions, thereby increasing the reliability of the operation. The instruction issue unit 84 further including the conversion unit 128 facilitates the issuance of basic instructions to the instruction execution units, thereby increasing the operation speed.

Additionally, the circuit size of the parallel processor 32 may be reduced by restricting in advance the arrangement of basic instructions contained in each instruction word to be supplied to the instruction fetch unit 58, as in the foregoing examples.

Example 6

Figure 27:
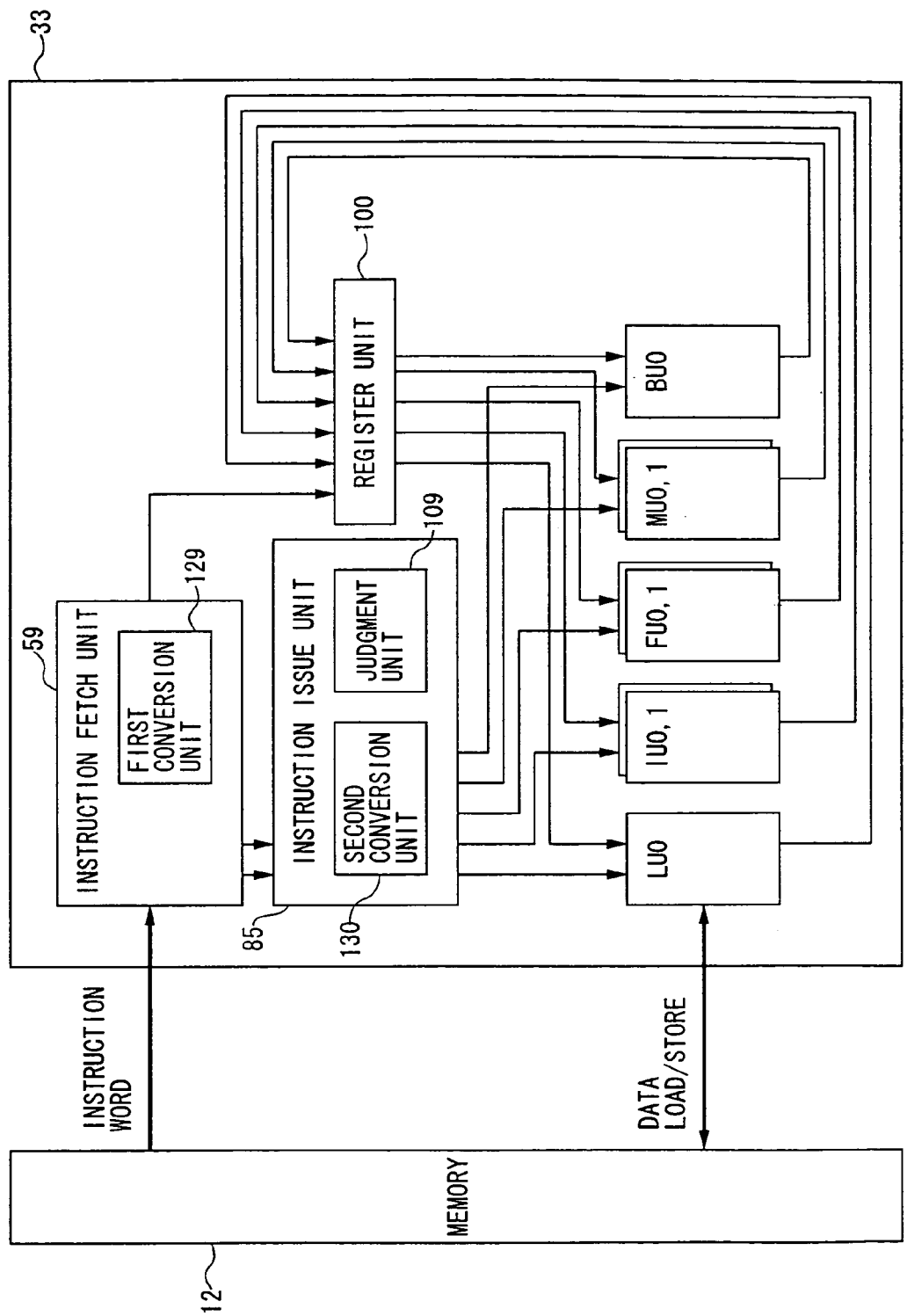
FIG. 27 shows the structure of a sixth example of the parallel processor in accordance with the third embodiment of the present invention.

FIG. 27 shows the structure of a sixth example of the parallel processor in accordance with the third embodiment of the present invention. As shown in FIG. 27, the parallel processor 33 has the same structure as the parallel processor 27 as shown in FIG. 20.

The structures and operations of a first conversion unit 129 and a second conversion unit 130 are the same as the structures and operations of the first conversion unit 117 and the second conversion unit 118 shown in FIG. 14. The structure and operation of a judgment unit 109 are the same as the structure and operation of the judgment unit 103.

By the parallel processor of this example having the above structure, the same effects as obtained by the parallel processor 27 of Example 6 of the second embodiment can be obtained. More specifically, the instruction issue unit 85 including the judgment unit 109 enables accurate and efficient parallel processing of basic instructions, thereby increasing the reliability of the operation. The instruction fetch unit 59 including the first conversion unit 129 and the instruction issue unit 85 including the second conversion unit 130 facilitate the issuance of basic instructions from the instruction issue unit 85 to the instruction execution units, thereby increasing the operation speed.

Additionally, the circuit size of the parallel processor 33 may be reduced by restricting in advance the arrangement of basic instructions contained in each instruction word to be supplied to the instruction fetch unit 59, as in the foregoing examples.

Fourth Embodiment

As shown in FIGS. 28 to 33, a parallel processor 34-39 in accordance with a fourth embodiment of the present invention each comprises an instruction fetch unit 60-65 connected to the memory 12, an instruction issue unit 86-91 connected to the instruction fetch unit 60-65, instruction execution units LU0, LU1, IU0, IU1, FU0, FU1, BU0, and BU1 connected to the instruction issue unit 86-91, and a register unit 101 connected to all the instruction execution units. In this embodiment, the instruction execution unit LU1 is a load store instruction execution unit that executes load instructions and store instructions. The instruction execution unit BU1 is a branch instruction execution unit that executes branch instructions. When the execution is completed, the instruction execution unit BU1 notifies the instruction issue unit 86-91 of the end of the execution.

In the following, the parallel processor in accordance with the fourth embodiment of the present invention will be described by way of examples in which the maximum basic instruction word length contained in each one basic instruction is 4. In FIGS. 28 to 33, the maximum basic instruction word length being 4 is indicated by four arrows from the instruction fetch unit 60-65 to the instruction issue unit 86-91. However, it should be understood that the maximum basic instruction word length in the fourth embodiment is not limited to 4.

Example 1

Figure 28:
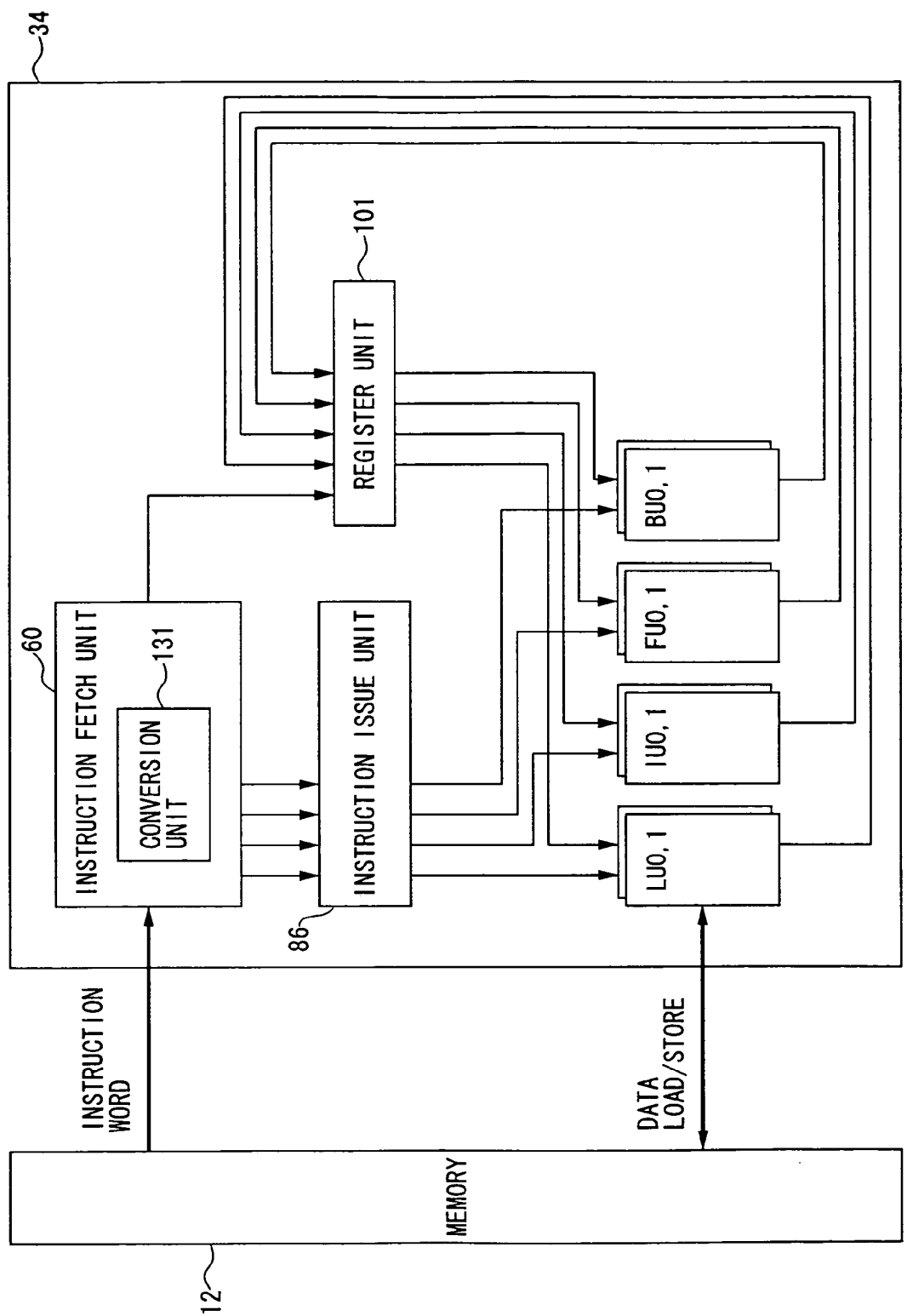
FIG. 28 shows the structure of a first example of a parallel processor in accordance with a fourth embodiment of the present invention.

FIG. 28 shows the structure of a first example of the parallel processor in accordance with the fourth embodiment of the present invention. As shown in FIG. 28, the parallel processor 34 comprises a conversion unit 131 in the instruction fetch unit 60. The structure and operation of the conversion unit 131 are the same as the structure and operation of the conversion unit 115 of Example 1 of the second embodiment. More specifically, the conversion unit 131 rearranges basic instructions contained in each fetched instruction word, in accordance with the arrangement of the instruction execution units, and supplies the rearranged basic instructions to the instruction issue unit 86.

By the parallel processor 34 having the above structure, the same effects as obtained by the parallel processor 22 of Example 1 of the second embodiment can also be obtained. More specifically, the issuance of basic instructions from the instruction issue unit 86 to the instruction execution units can be facilitated, and the operation speed can be increased accordingly.

Additionally, the circuit size of the parallel processor 34 may be reduced by restricting in advance the arrangement of basic instructions contained in each instruction word to be supplied to the instruction fetch unit 60, as in the foregoing embodiments.

Example 2

Figure 29:
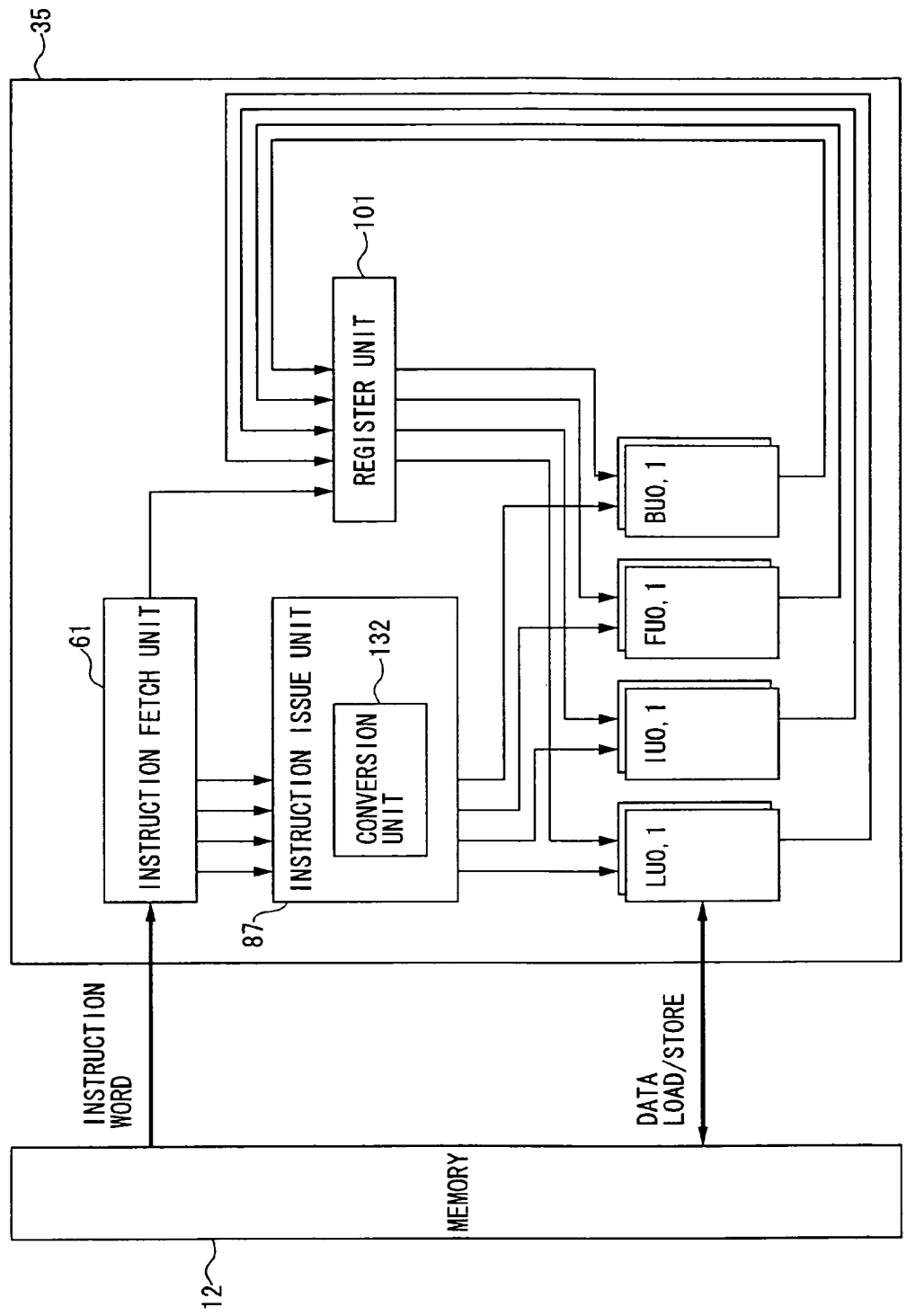
FIG. 29 shows the structure of a second example of the parallel processor in accordance with the fourth embodiment of the present invention.

FIG. 29 shows the structure of a second example of the parallel processor in accordance with the fourth embodiment of the present invention. As shown in FIG. 29, the parallel processor 35 has the same structure as the parallel processor 23 shown in FIG. 12, in that the instruction issue unit 87 includes a conversion unit 132. The structure and operation of the conversion unit 132 are the same as the structure and operation of the conversion unit 115 shown in FIGS. 10 and 11.

In the parallel processor 35 of this example, the instruction issue unit 87 rearranges basic instructions contained in each instruction word supplied to the instruction fetch unit 61, in accordance with the arrangement of the instruction execution unit, and then supplies the rearranged basic instructions to the instruction execution units. Thus, wires can be shortened as a whole, and the operation speed can be increased.

Additionally, the circuit size of the parallel processor 35 may be reduced by restricting in advance the arrangement of basic instructions contained in each instruction word to be supplied to the instruction fetch unit 61, as in the foregoing examples.

Example 3

Figure 30:
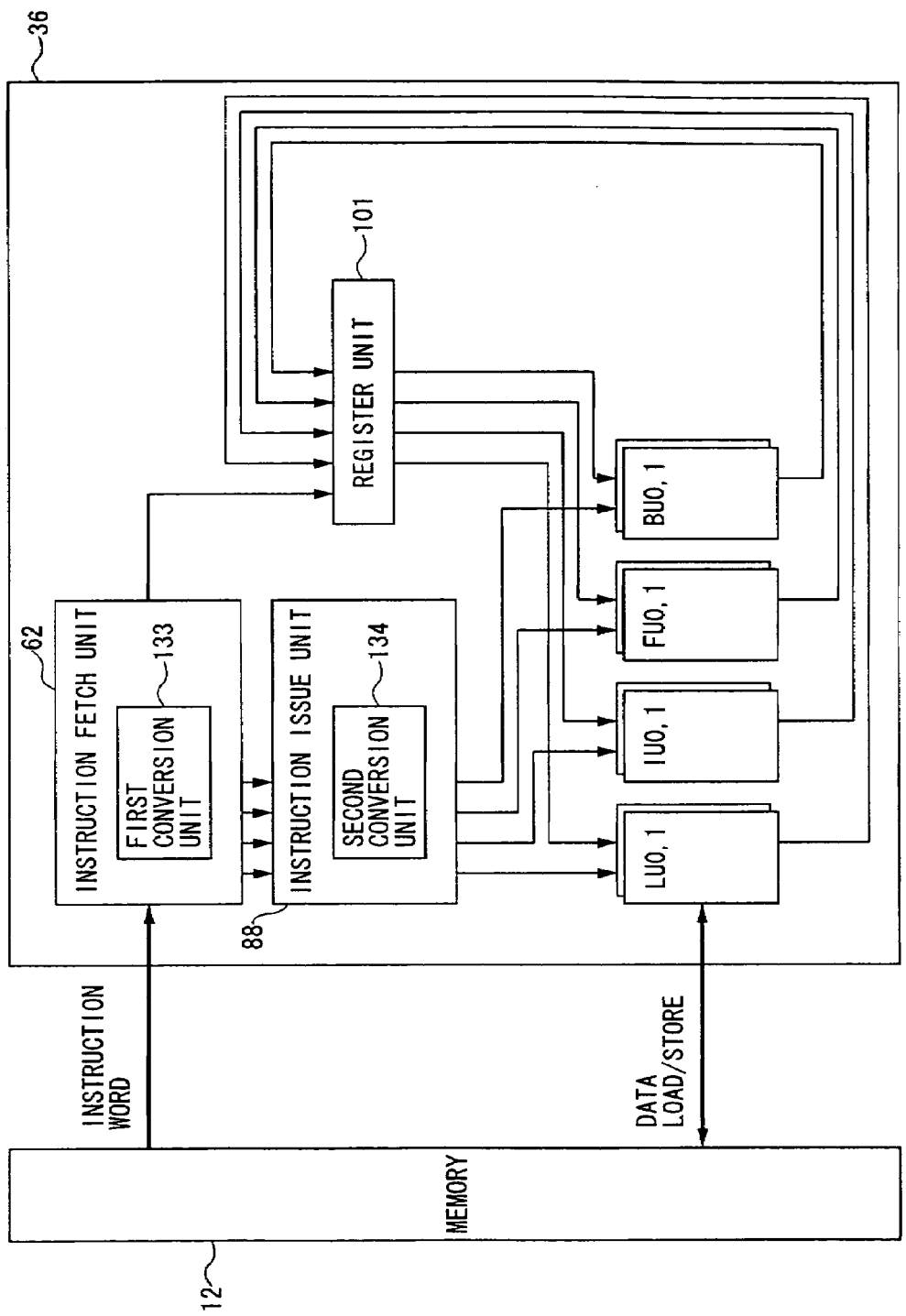
FIG. 30 shows the structure of a third example of the parallel processor in accordance with the fourth embodiment of the present invention.

FIG. 30 shows the structure of a third example of the parallel processor in accordance with the fourth embodiment of the present invention. As shown in FIG. 30, the parallel processor 36 has the same structure as the parallel processor 24 shown in FIG. 14. The instruction fetch unit 62 of this parallel processor 36 includes a first conversion unit 133 that rearranges basic instructions contained in each fetched instruction word, in accordance with the arrangement of the instruction execution units. The instruction issue unit 88 of the parallel processor 36 includes a second conversion unit 134 that further rearranges the basic instructions contained in each instruction word supplied from the instruction fetch unit 62, in accordance with the arrangement of the instruction execution units.

The first conversion unit 133 performs "preprocessing" of the rearrangement of basic instructions, and the second conversion unit 134 performs "postprocessing" of the rearrangement of the basic instructions.

To improve the performance of the parallel processor in an actual circuit, the processes in the instruction fetch unit 62 and the instruction issue unit 88 are pipelined. Because of that, the difference in processing time between instruction fetch unit 62 and the instruction issue unit 88 should be as small as possible to optimize the pipeline effects. Therefore, the arrangement process is divided into the "preprocessing" and "postprocessing", so that the difference in processing time between the instruction fetch unit 62 and the instruction issue unit 88 is small.

By the parallel processor 36 of this example having the above structure, wires can be shortened as a whole, and the operation speed can be increased.

Additionally, the circuit size of the parallel processor 36 may be reduced by restricting in advance the arrangement of basic instructions contained in each instruction word to be supplied to the instruction fetch unit 62, as in the foregoing examples.

Example 4

Figure 31:
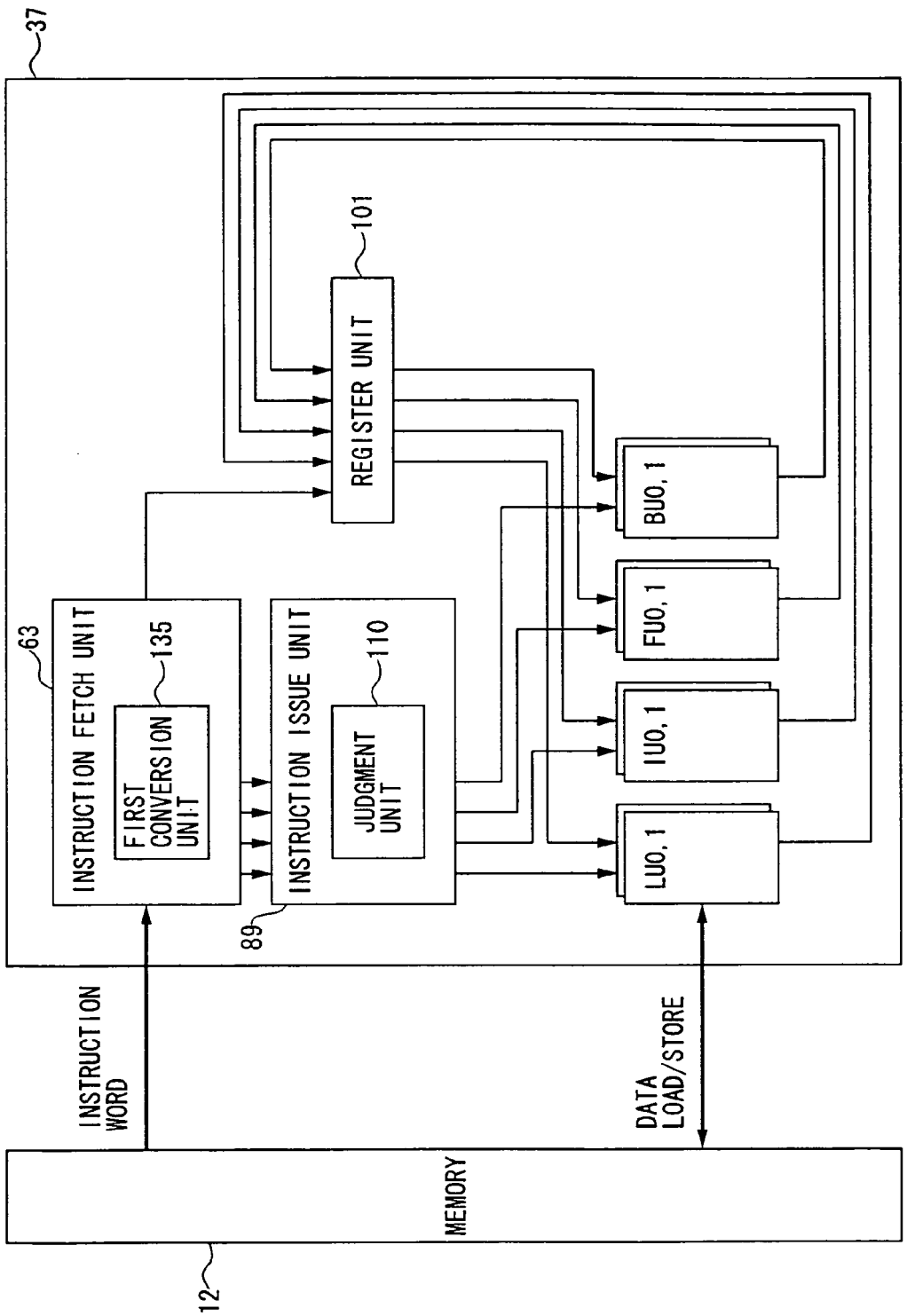
FIG. 31 shows the structure of a fourth example of the parallel processor in accordance with the fourth embodiment of the present invention.

FIG. 31 shows the structure of a fourth example of the parallel processor in accordance with the fourth embodiment of the present invention. As shown in FIG. 31, the parallel processor 37 has the same structure as the parallel processor 25 shown in FIG. 16, in that the instruction fetch unit 63 includes a conversion unit 135 and the instruction issue unit 89 includes a judgment unit 110.

The structure and operation of the conversion unit 135 are the same as the structure and operation of the conversion unit 115 shown in FIGS. 10 and 11. On the other hand, the structure and operation of the judgment unit 110 are the same as the judgment unit 103 shown in FIG. 6.

By the parallel processor 37 of this example having the above structure, the same effects as obtained by the parallel processor 25 of Example 4 of the second embodiment can be obtained. More specifically, the instruction issue unit 89 including the judgment unit 110 enables accurate and efficient parallel processing of basic instructions, thereby increasing the reliability of the operation. The instruction fetch unit 63 including the conversion unit 135 facilitates the issuance of basic instructions from the instruction issue unit 89 to the instruction execution units, thereby increasing the operation speed.

Additionally, the circuit size of the parallel processor 37 may be reduced by restricting in advance the arrangement of basic instructions contained in each instruction word to be supplied to the instruction fetch unit 63, as in the foregoing examples.

Example 5

Figure 32:
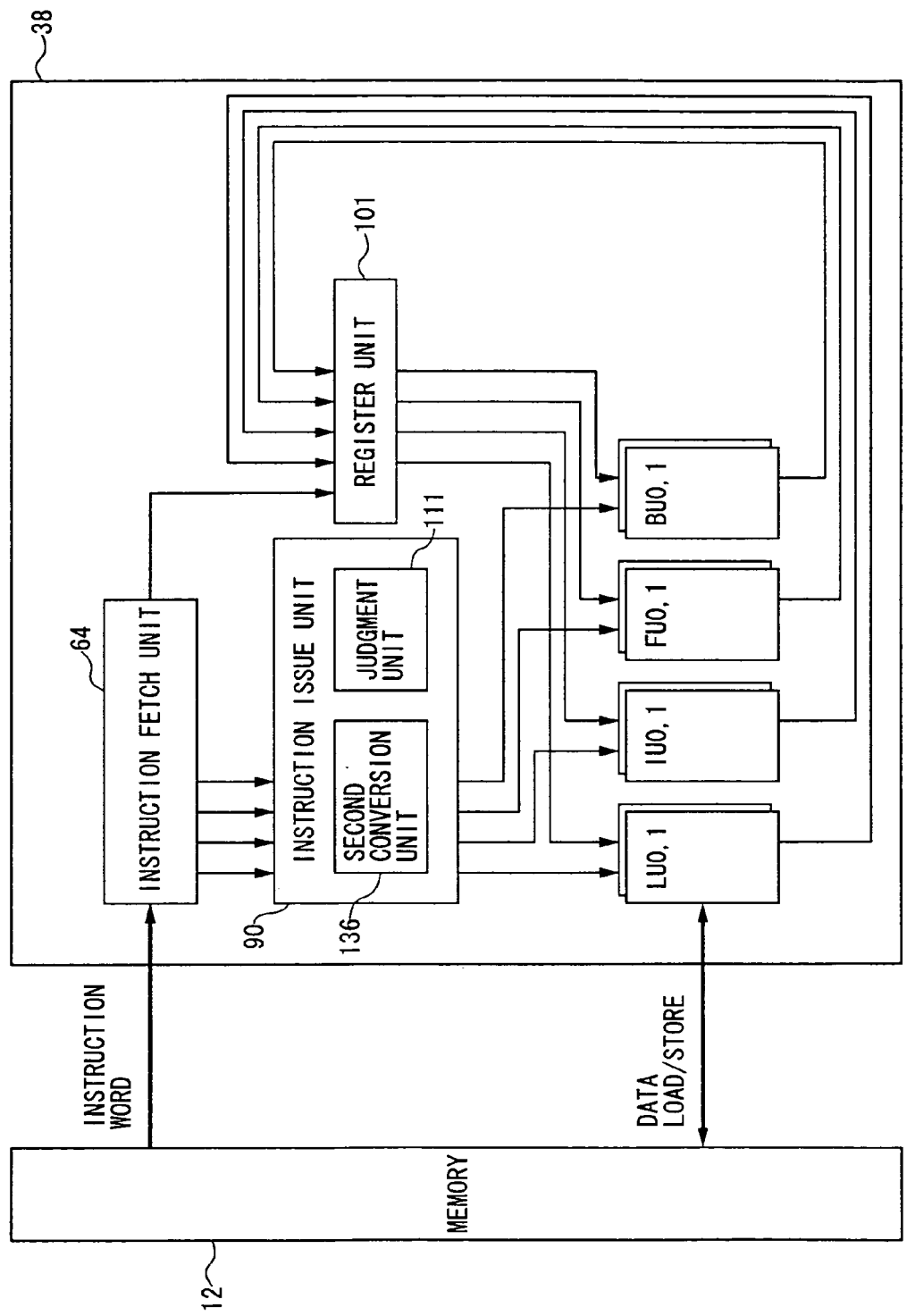
FIG. 32 shows the structure of a fifth example of the parallel processor in accordance with the fourth embodiment of the present invention.

FIG. 32 shows the structure of a fifth example of the parallel processor in accordance with the fourth embodiment of the present invention. As shown in FIG. 32, the parallel processor 38 has the same structure as the parallel processor 26 of Example 5 of the second embodiment shown in FIG. 18, in that the instruction issue unit 90 includes a conversion unit 136 and a judgment unit 111.

The structure and operation of the conversion unit 136 are the same as the structure and operation of the conversion unit 115 shown in FIGS. 10 and 11. On the other hand, the structure and operation of the judgment unit 111 are the same as the structure and operation of the judgment unit 103 shown in FIG. 6.

By the parallel processor of this example having the above structure, the same effects as obtained by the parallel processor 26 of Example 5 of the second embodiment can be obtained. More specifically, the instruction issue unit 90 including the judgment unit 111 enables accurate and efficient parallel processing of basic instructions, thereby increasing the reliability of the operation. The instruction issue unit 90 further including the conversion unit 136 facilitates the issuance of basic instruction to the instruction execution units, thereby increasing the operation speed.

Additionally, the circuit size of the parallel processor 38 may be reduced by restricting in advance the arrangement of basic instructions contained in each instruction word to be supplied to the instruction fetch unit 64, as in the foregoing examples.

Example 6

Figure 33:
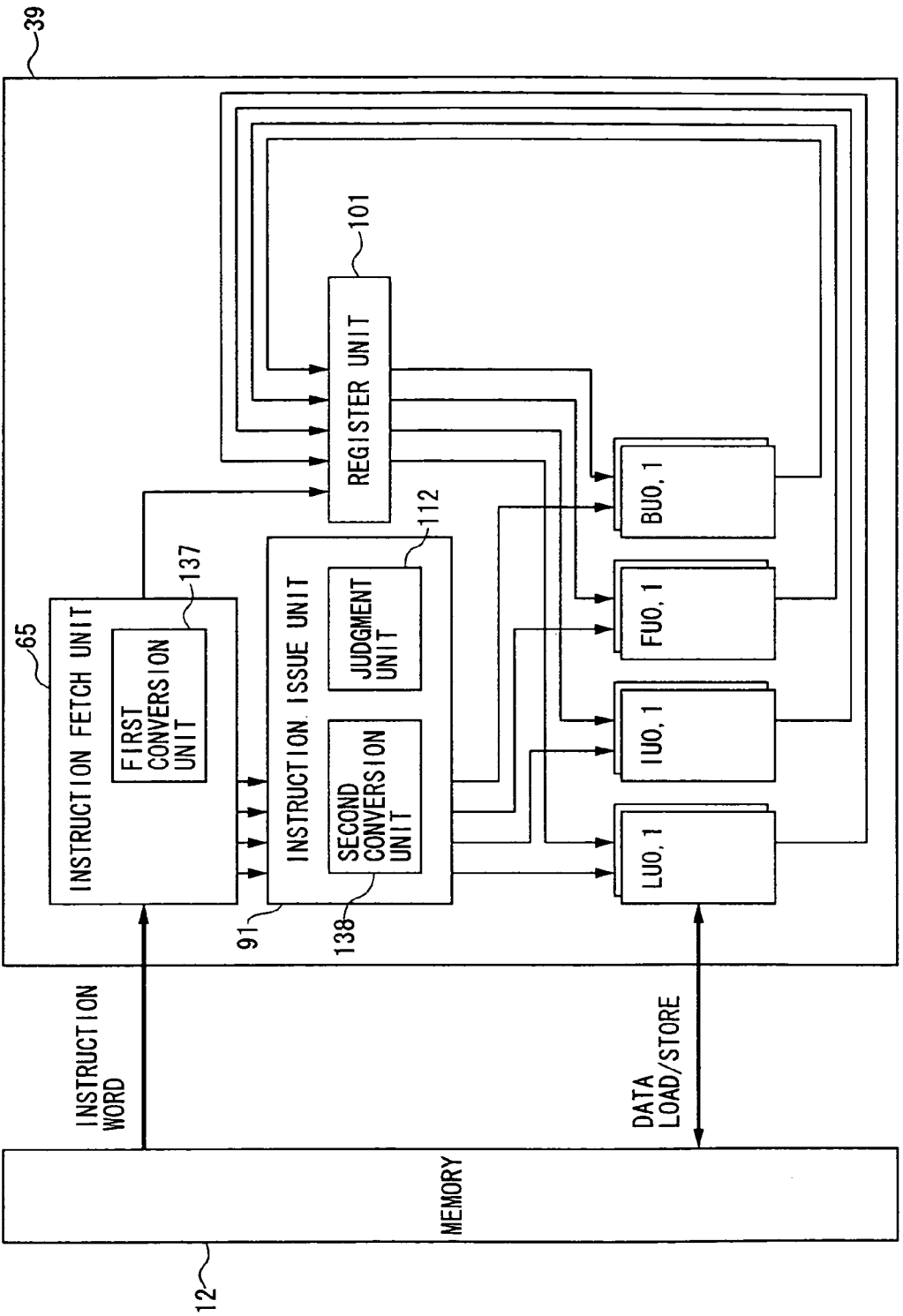
FIG. 33 shows the structure of a sixth example of the parallel processor in accordance with the fourth embodiment of the present invention.

FIG. 33 shows the structure of a sixth example of the parallel processor in accordance with the fourth embodiment of the present invention. As shown in FIG. 33, the parallel processor 39 has the a) same structure as the parallel processor 27 shown in FIG. 20.

The structures and operations of a first conversion unit 137 and a second conversion unit 138 are the same as the structures and operations of the first conversion unit 117 and the second conversion unit 118 shown in FIG. 14. On the other hand, the structure and operation of the judgment unit 112 are the same as the structure and operation of the judgment unit 103 shown in FIG. 6.

By the parallel processor 39 of this example having the above structure, the same effects as obtained by the parallel processor of Example 6 of the second embodiment can be obtained. More specifically, the instruction issue unit 91 including the judgment unit 112 enables accurate and efficient parallel processing of basic instructions, thereby increasing the reliability of the operation. The instruction fetch unit 65 including the first conversion unit 137 and the instruction issue unit 91 further including the second conversion unit 138 facilitate the issuance of basic instructions from the instruction issue unit 91 to the instruction execution units, thereby increasing the operation speed.

Additionally, the circuit size of the parallel processor 39 may be reduced by restricting in advance the arrangement of basic instructions contained in each instruction word to be supplied to the instruction fetch unit 65, as in the foregoing examples.

Fifth Embodiment

As shown in FIGS. 34 to 39, parallel processors 40 to 45 in accordance with a fifth embodiment of the present invention each comprise an instruction fetch unit 66-71 connected to the memory 12, an instruction issue unit 92-97 connected to the instruction fetch unit 66-71, instruction execution units LU0, LU1, IU0, IU1, FU0, FU1, MU0, MU1, BU0, and BU1, and a register unit 102 connected to all the instruction execution units.

In the following, the parallel processor in accordance with the fifth embodiment of the present invention will be described by way of examples in which the maximum basic instruction word length contained in each instruction word is 4. In FIGS. 34 to 39, the maximum basic instruction word length being 4 is indicated by four arrows extending from the instruction issue unit 66-71 to the instruction issue unit 92-97.

It should be understood that the maximum basic instruction word length is not limited to 4 in this embodiment.

Example 1

Figure 34:
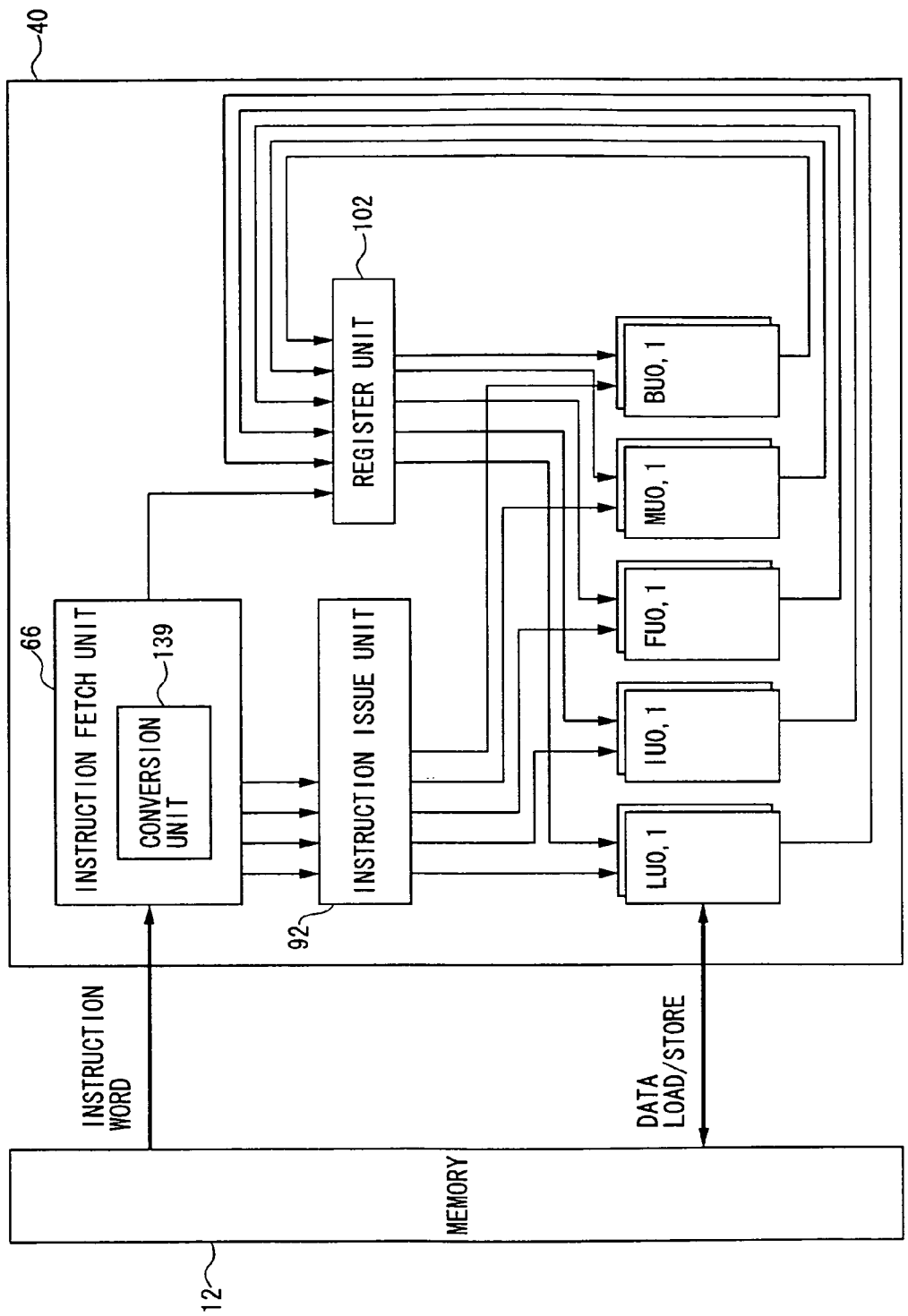
FIG. 34 shows the structure of a first example of a parallel processor in accordance with a fifth embodiment of the present invention.

FIG. 34 shows the structure of a first example of the parallel processor in accordance with the fifth embodiment of the present invention. As shown in FIG. 34, the parallel processor 40 comprises a conversion unit 139 in the instruction fetch unit 66. The structure and operation of the conversion unit 139 are the same as the structure and operation of the conversion unit 115 of Example 1 of the second embodiment of the present invention. The conversion unit 139 rearranges basic instructions contained in each fetched instruction word, in accordance with the arrangement of the instruction execution units, and then supplies the rearranged basic instructions to the instruction issue unit 92.

By the parallel processor 40 having the above structure, the same effects as obtained by the parallel processor 22 of Example 1 of the second embodiment can be obtained. More specifically, the issuance of basic instruction from the instruction issue unit 92 to the instruction execution units can be facilitated, and the operation speed can be increased accordingly.

Additionally, the circuit size of the parallel processor 40 may be reduced by restricting in advance the arrangement of basic instructions contained in each instruction word to be supplied to the instruction fetch unit 66, as in the foregoing embodiments.

Example 2

Figure 35:
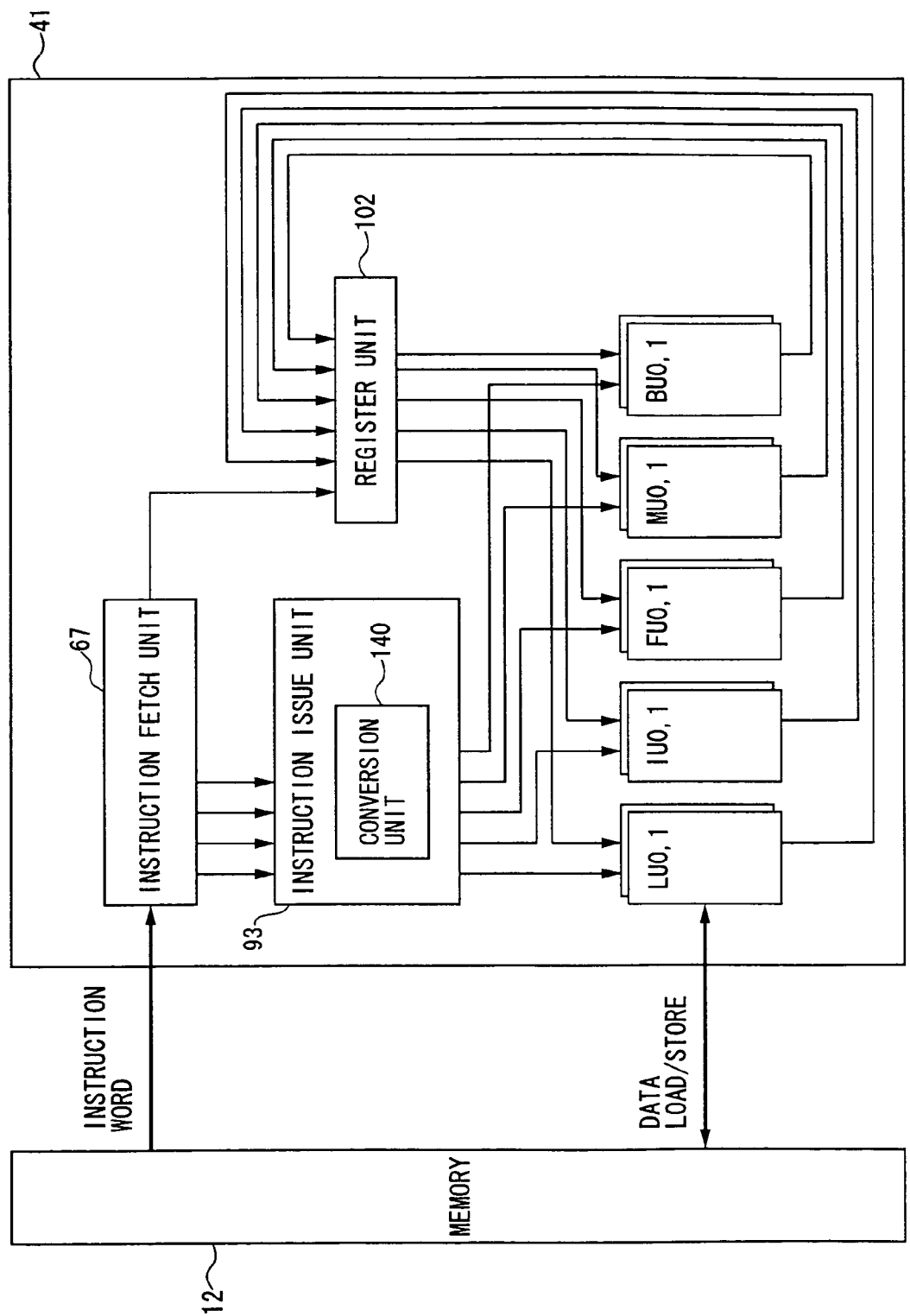
FIG. 35 shows the structure of a second example of the parallel processor in accordance with the fifth embodiment of the present invention.

FIG. 35 shows the structure of a second example of the parallel processor in accordance with the fifth embodiment of the present invention. As shown in FIG. 35, the parallel processor 41 has the same structure as the parallel processor 23 shown in FIG. 12, in that the instruction issue unit 93 includes a conversion unit 140. The structure and operation of the conversion unit 140 are the same as the structure and operation of the conversion unit 115 shown in FIGS. 10 and 11.

In the parallel processor 41 of this example, the instruction issue unit 93 rearranges basic instructions contained in each instruction word supplied from the instruction fetch unit 67, and then supplies the rearranged basic instructions to the instruction execution units. Thus, wires can be shortened as a whole, and the operation speed can be increased.

Additionally, the circuit size of the parallel processor 41 may be reduced by restricting in advance the arrangement of basic instructions contained in each instruction word to be supplied to the instruction fetch unit 67, as in the foregoing examples.

Example 3

Figure 36:
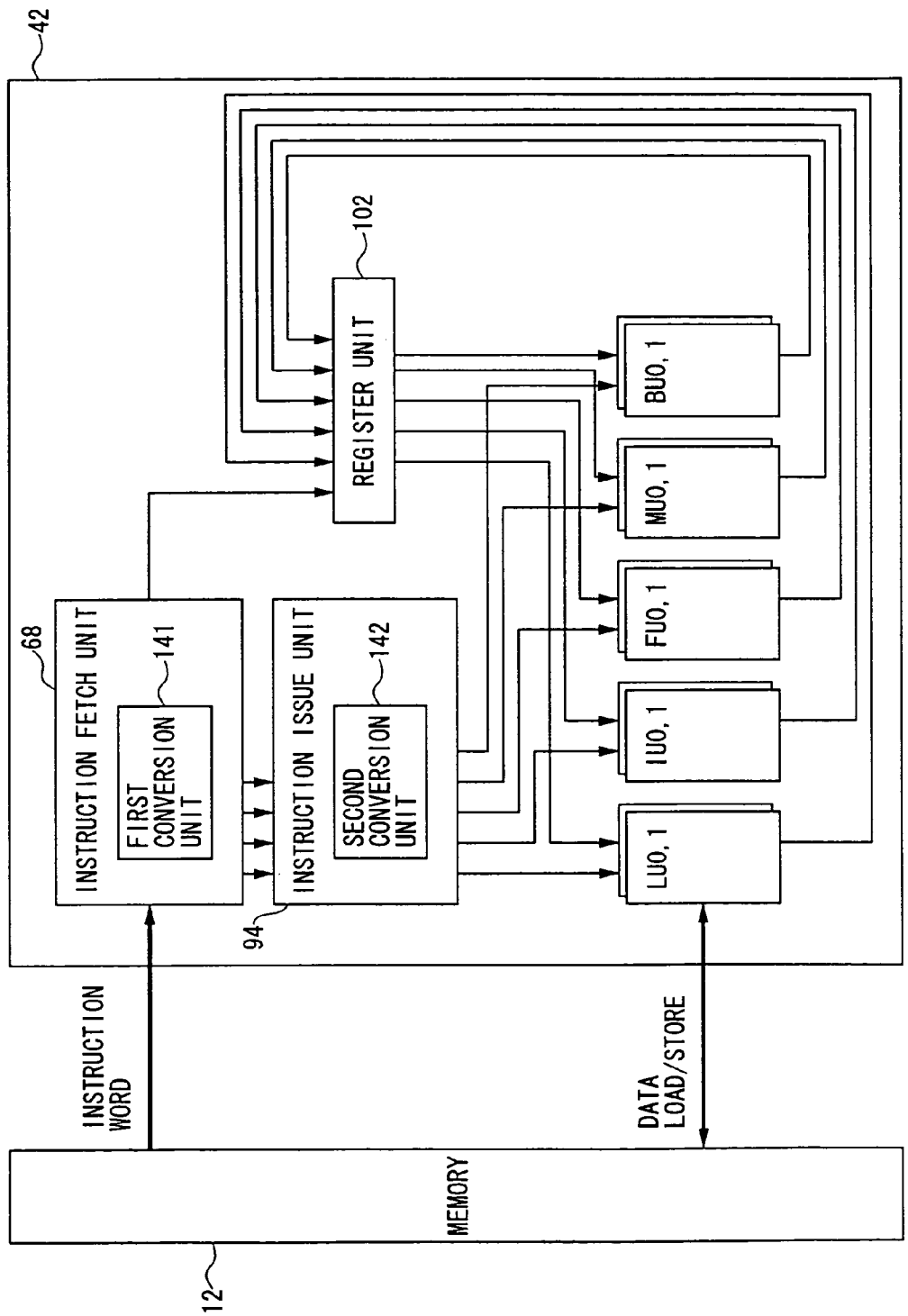
FIG. 36 shows the structure of a third example of the parallel processor in accordance with the fifth embodiment of the present invention.

FIG. 36 shows the structure of a third example of the parallel processor in accordance with the fifth embodiment of the present invention. As shown in FIG. 36, the parallel processor 42 of this example has the same structure as the parallel processor 24 shown in FIG. 14. The instruction fetch unit 68 of the parallel processor 42 includes a first conversion unit 141 that rearranges basic instructions contained in each fetched instruction word in accordance with the arrangement of the instruction execution units. The instruction issue unit 94 of the parallel processor 42 includes a second conversion unit 142 that further rearranges basic instructions contained in each instruction word supplied from the instruction fetch unit 68 in accordance with the arrangement of the instruction execution units.

The first conversion unit 141 performs "preprocessing" of the rearrangement of basic instructions, and the second conversion unit 142 performs "postprocessing" of the rearrangement of the basic instructions.

In order to improve the performance of the parallel processor in an actual circuit, the processes in the instruction fetch unit 68 and the instruction issue unit 94 are pipelined. Because of that, the difference in processing time between instruction fetch unit 68 and the instruction issue unit 94 should be as small as possible to optimize the pipeline effects. Therefore, the arrangement process is divided into the "preprocessing" and "postprocessing", so that the difference in processing time between the instruction fetch unit 68 and the instruction issue unit 94 can be small.

By the parallel processor 42 of this example having the above structure, wires can be shortened as a whole, and the operation speed can be increased.

Additionally, the circuit size of the parallel processor 42 may be reduced by restricting in advance the arrangement of basic instructions contained in each instruction word to be supplied to the instruction fetch unit 68, as in the foregoing examples.

Example 4

Figure 37:
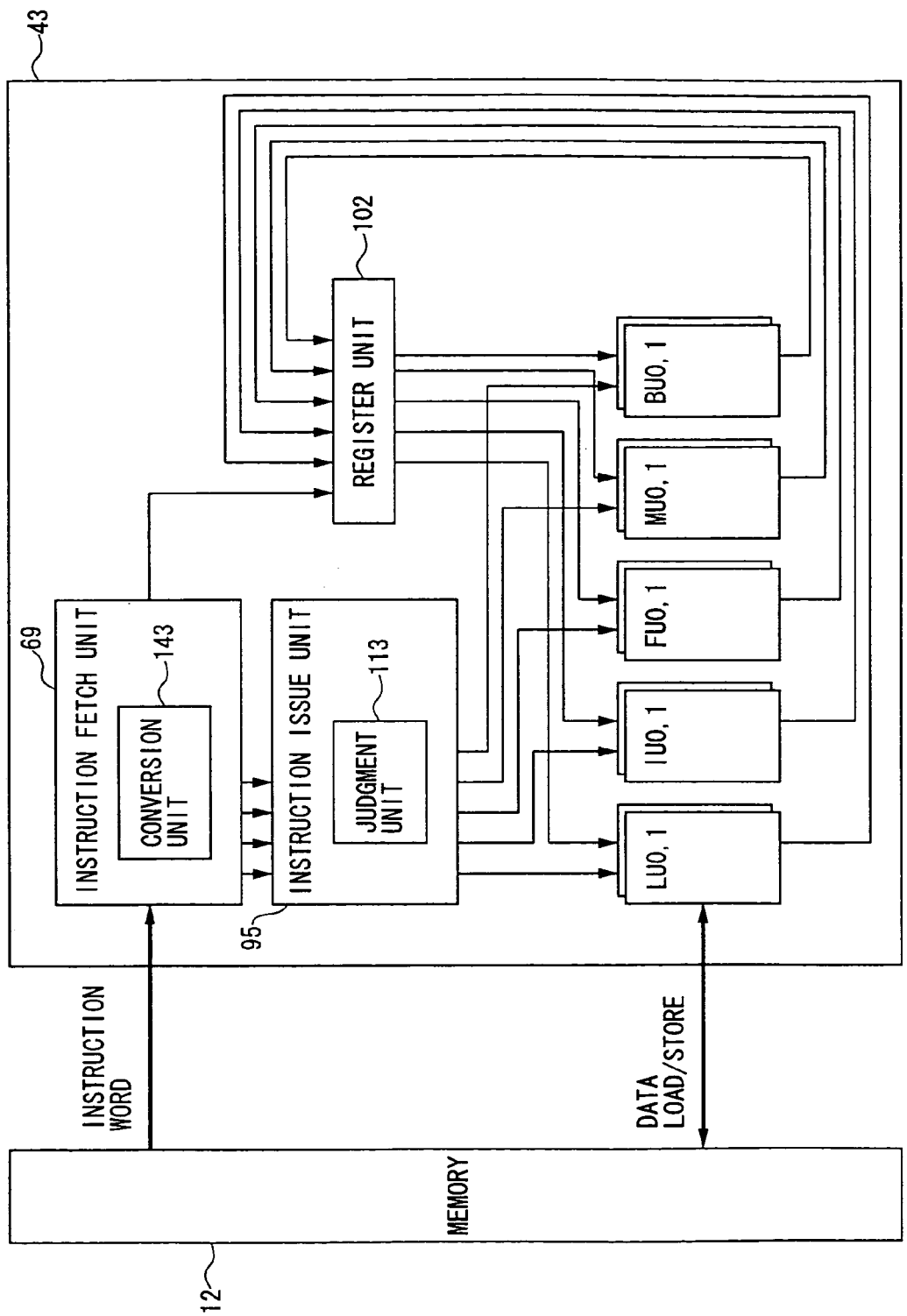
FIG. 37 shows the structure of a fourth example of the parallel processor in accordance with the fifth embodiment of the present invention.

FIG. 37 shows the structure of a fourth example of the parallel processor in accordance with the fifth embodiment of the present invention. As shown in FIG. 37, the parallel processor 43 has the same structure as the parallel processor 25 shown in FIG. 16, in that the instruction fetch unit 69 includes a conversion unit 143 and the instruction issue unit 95 includes a judgment unit 113.

The structure and operation of the conversion unit 143 are the same as the structure and operation of the conversion unit 115 shown in FIGS. 10 and 11. On the other hand, the structure and operation of the judgment unit 113 are the same as the structure and operation of the judgment unit 103 shown in FIG. 6.

By the parallel processor 43 of this example having the above structure, the same effects as obtained by the parallel processor 25 of Example 4 of the second embodiment can be obtained. More specifically, the instruction issue unit 95 including the judgment unit 113 enables accurate and efficient parallel processing of basic instructions, thereby increasing the reliability of the operation. The instruction fetch unit 69 including the conversion unit 143 facilitates the issuance of basic instructions from the instruction issue unit 95 to the instruction execution units, thereby increasing the operation speed.

Additionally, the circuit size of the parallel processor 43 may be reduced by restricting in advance the arrangement of basic instructions contained in each instruction word to be supplied to the instruction fetch unit 69, as in the foregoing examples.

Example 5

Figure 38:
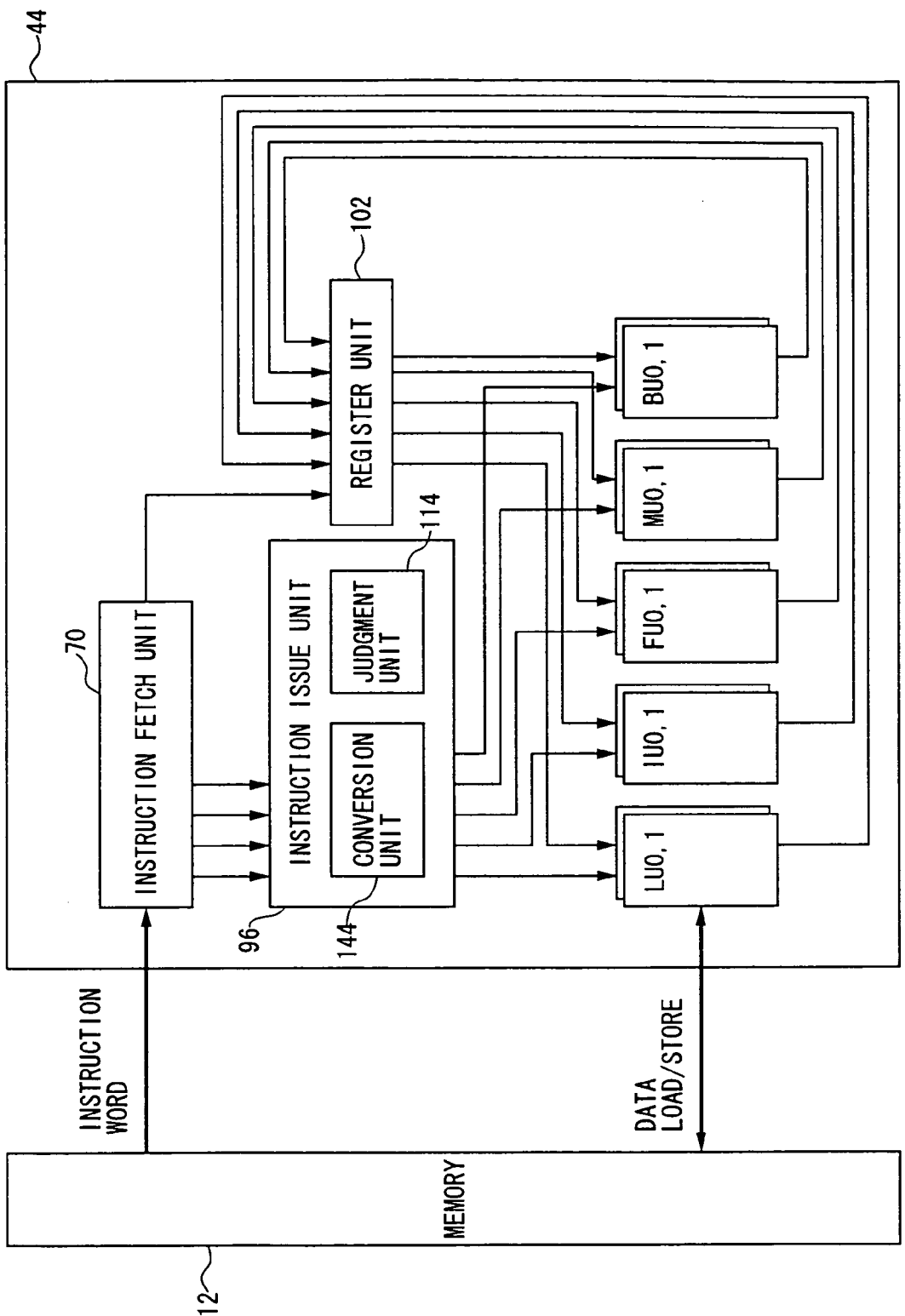
FIG. 38 shows the structure of a fifth example of the parallel processor in accordance with the fifth embodiment of the present invention.

FIG. 38 shows the structure of a fifth example of the parallel processor in accordance with the fifth embodiment of the present invention. As shown in FIG. 38, the parallel processor 44 of this example has the same structure as the parallel processor 26 of Example 5 of the second embodiment shown in FIG. 18, in that the instruction issue unit 96 includes a conversion unit 144 and a judgment unit 114.

The structure and operation of the conversion unit 144 are the same as the structure and operation of the conversion unit 115 shown in FIGS. 10 and 11. On the other hand, the structure and operation of the judgment unit 114 are the same as the structure and operation of the judgment unit 103 shown in FIG. 6.

By the parallel processor 44 of this example having the above structure, the same effects as obtained by the parallel processor 26 of Example 5 of the second embodiment can be obtained. More specifically, the instruction issue unit 96 including the judgment unit 114 enables accurate and efficient parallel processing of basic instructions, thereby increasing the reliability of the operation. The instruction issue unit 96 further including the conversion unit 144 facilitates the issuance of basic instructions to the instruction execution units, thereby increasing the operation speed.

Additionally, the circuit size of the parallel processor 44 may be reduced by restricting in advance the arrangement of basic instructions contained in each instruction word to be supplied to the instruction fetch unit 70, as in the foregoing examples.

Example 6

Figure 39:
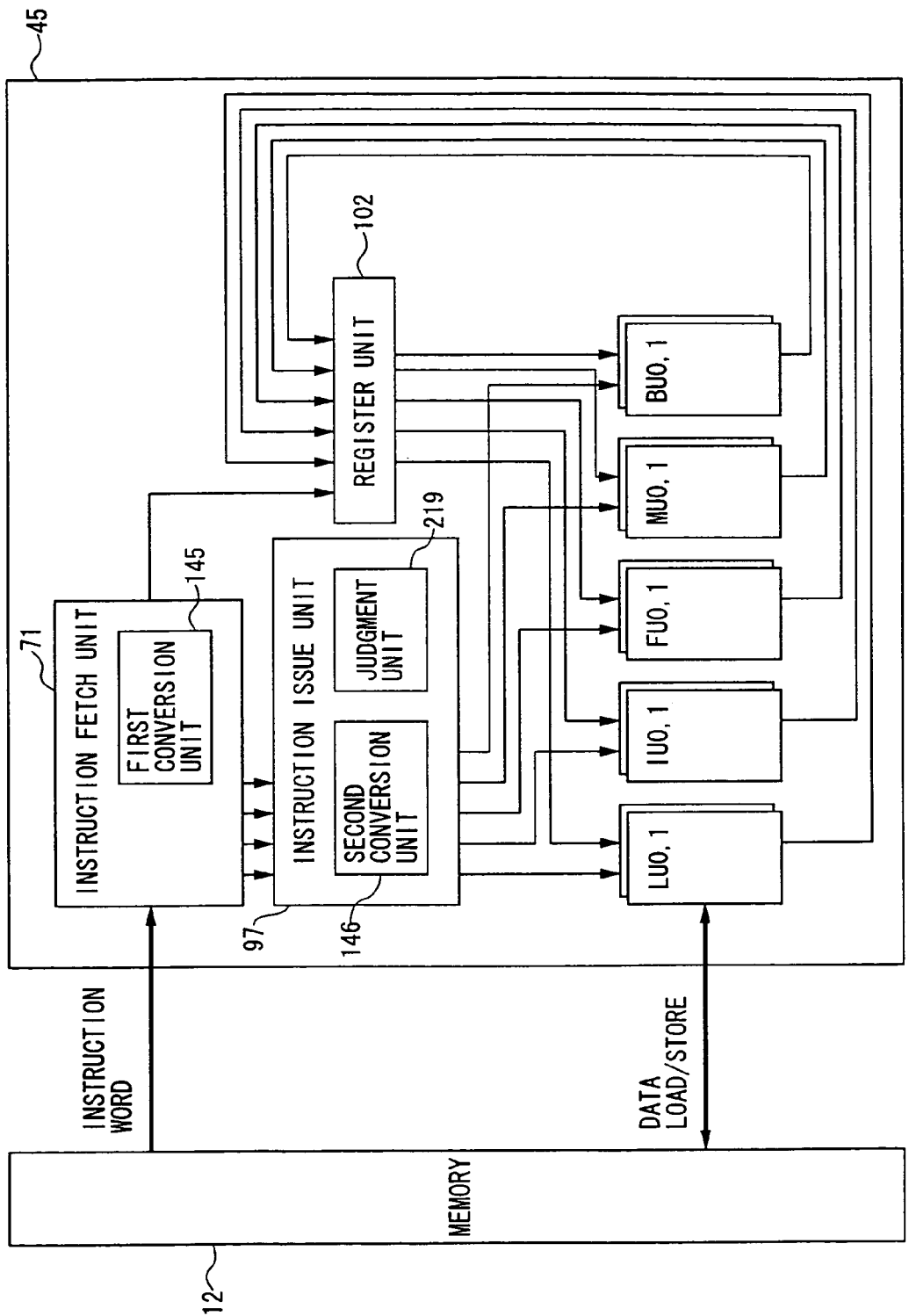
FIG. 39 shows the structure of a sixth example of the parallel processor in accordance with the fifth embodiment of the present invention.

FIG. 39 shows the structure of a sixth example of the parallel processor in accordance with the fifth embodiment of the present invention. As shown in FIG. 39, the parallel processor 45 of this example has the same structure as the parallel processor 27 shown in FIG. 20. The instruction fetch unit 71 includes a first conversion unit 145, and the instruction issue unit 97 includes a second conversion unit 146 and a judgment unit 219.

The structures and operations of the first conversion unit 145 and the second conversion unit 146 are the same as the structures and operations of the first conversion unit 117 and the second conversion unit 118 shown in FIG. 14. On the other hand, the structure and operation of the judgment unit 219 are the same as the structure and operation of the judgment unit 103 shown in FIG. 6.

By the parallel processor 45 of this example having the above structure, the same effects as obtained by the parallel processor 27 of Example 6 of the second embodiment can be obtained. More specifically, the instruction issue unit 97 including the judgment unit 219 enables accurate and efficient parallel processing of basic instructions, thereby increasing the reliability of the operation. The instruction fetch unit 71 including the first conversion unit 145 and the instruction issue unit 97 including the second conversion unit 146 facilitate the issuance of basic instructions from the instruction issue unit 97 to the instruction execution units, thereby increasing the operation speed.

Additionally, the circuit size of the parallel processor 45 may be reduced by restricting in advance the arrangement of basic instructions contained in each instruction word to be supplied to the instruction fetch unit 71, as in the foregoing examples.

The present invention is not limited to the specifically disclosed embodiments, but variations and modifications may be made without departing from the scope of the present invention.

The present application is based on Japanese priority application No. 11-281957, filed on Oct. 1, 1999, the entire contents of which are hereby incorporated by reference.

What is claimed is:

1. A parallel processor performing parallel processing of one or more basic instructions contained in each of a plurality of instruction words, wherein each of the instruction words consists of the one or more basic instructions to be executed by one or more instruction execution units and delimiting information delimiting the one or more basic instructions, said parallel processor comprising:
   N instruction execution units performing processes in accordance with corresponding, supplied basic instructions in parallel, wherein N is an integer greater than one;
   an instruction fetch unit fetching the instruction words one by one in accordance with the instruction delimiting information to supply at least one basic instruction contained in each instruction word; and
   an instruction issue unit issuing N instruction pairs in response to the at least one basic instruction supplied from said instruction fetch unit, the N instruction pairs being supplied to N respective instruction execution units for execution of the one or more basic instructions contained in the given instruction word,
   wherein each of the N instruction pairs supplied to a corresponding instruction execution unit includes a basic instruction and a single effective bit controlling whether the basic instruction is to be executed by the corresponding instruction execution unit.

2. The parallel processor as claimed in claim 1, wherein the plurality of instruction execution units all have the same structure.

3. The parallel processor as claimed in claim 1, wherein:
   at least two of the instruction execution units have different structures from each other; and
   the instruction fetch unit rearranges the basic instructions contained in each of the fetched instruction words, in accordance with arrangement of the plurality of instruction execution units, and then supplies the rearranged basic instructions to the instruction issue unit.

4. The parallel processor as claimed in claim 1, wherein:
   at least two of the instruction execution units have different structures from each other; and the instruction issue unit rearranges the basic instructions contained in each of the instruction words supplied from the instruction fetch unit, in accordance with arrangement of the plurality of instruction execution units, and then supplies the rearranged basic instructions to the instruction execution units.

5. The parallel processor as claimed in claim 1, wherein:

at least two of the instruction execution units have different structures from each other;

the instruction fetch unit rearranges the basic instructions contained in each of the fetched instruction words, in accordance with arrangement of the instruction execution units, and then supplies the rearranged basic instructions to the instruction issue unit; and the instruction issue unit further rearranges the basic instructions contained in each of the instruction words supplied from the instruction fetch unit, in accordance with the arrangement of the instruction execution units, and then supplies the rearranged basic instructions to the instruction execution units.

6. The parallel processor as claimed in claim 3, wherein:

at least two of the instruction execution units have different structures from each other; and the instruction fetch unit fetches an instruction word that contains basic instructions arranged in advance in accordance with the arrangement of the instruction execution units.

7. The parallel processor as claimed in claim 1, wherein, depending on the type of a basic instruction being currently executed by one of the instruction execution units, the instruction issue unit issues a next basic instruction before the execution of the basic instruction being currently executed is completed.

8. The parallel processor as claimed in claim 7, wherein, if a supplied basic instruction does not have data dependency or control dependency, or does not share resources with a basic instruction being currently executed by one of the instruction execution units, the instruction issue unit issues the supplied basic instruction before the execution of the basic instruction being currently executed is completed.

9. A parallel processor as claimed in claim 1, wherein a first instruction word format is converted into a second instruction word format, the first instruction word format indicating a first arrangement of instruction words from the instruction fetch unit, and the second instruction word format indicating a second arrangement of instruction words which corresponds to the instruction execution units.

10. A parallel processor as claimed in claim 1, further comprising a conversion unit, wherein the conversion unit converts a first instruction word format into a second instruction word format on the basis of the effective bit, corresponding to the instruction execution units, indicating whether the corresponding instruction execution unit is available.

11. A parallel processor as claimed in claim 10, wherein the first instruction word format indicates a first arrangement of instruction words from the instruction fetch unit, and the second instruction word format indicates a second arrangement of instruction words which corresponds to the instruction execution units.

12. A parallel processor as claimed in claim 1, wherein the instruction issue unit issues the basic instructions to the corresponding instruction execution unit based on the N instruction pairs.

* * * * *

UNITED STATES PATENT AND TRADEMARK OFFICE
CERTIFICATE OF CORRECTION

PATENT NO. : 7,401,204 B1
APPLICATION NO. : 09/654527
DATED : July 15, 2008
INVENTOR(S) : Hideo Miyake et al.

It is certified that error appears in the above-identified patent and that said Letters Patent is hereby corrected as shown below:

First Page, Column 2, under the heading "Foreign Patent Documents", Line 4, delete "JP    8-234978    9/1996" (Repeated Occurrence).

Signed and Sealed this

Ninth Day of December, 2008

JON W. DUDAS
*Director of the United States Patent and Trademark Office*